BIT COUNT CHECKING CIRCUIT

Original Filed Nov. 18, 1954 36 Sheets-Sheet 1

INVENTORS.
ORVILLE B. SHAFER
ANDREW C. REYNOLDS, JR.
BY J. K. Moser
AGENT

BIT COUNT CHECKING CIRCUIT

Oct. 27, 1959 O. B. SHAFER ET AL 2,910,234

BIT COUNT CHECKING CIRCUIT

Original Filed Nov. 18, 1954 36 Sheets-Sheet 4

BIT COUNT CHECKING CIRCUIT

Original Filed Nov. 18, 1954 36 Sheets-Sheet 7

BIT COUNT CHECKING CIRCUIT

Original Filed Nov. 18, 1954

Oct. 27, 1959 O. B. SHAFER ET AL 2,910,234

BIT COUNT CHECKING CIRCUIT

Original Filed Nov. 18, 1954 36 Sheets-Sheet 12

BIT COUNT CHECKING CIRCUIT

Oct. 27, 1959 O. B. SHAFER ET AL 2,910,234

BIT COUNT CHECKING CIRCUIT

Original Filed Nov. 18, 1954 36 Sheets-Sheet 19

Oct. 27, 1959 O. B. SHAFER ET AL 2,910,234

BIT COUNT CHECKING CIRCUIT

Original Filed Nov. 18, 1954 36 Sheets-Sheet 20

Oct. 27, 1959 O. B. SHAFER ET AL 2,910,234

BIT COUNT CHECKING CIRCUIT

Original Filed Nov. 18, 1954 36 Sheets-Sheet 23

Oct. 27, 1959 O. B. SHAFER ET AL 2,910,234

BIT COUNT CHECKING CIRCUIT

Original Filed Nov. 18, 1954 36 Sheets-Sheet 25

Oct. 27, 1959 O. B. SHAFER ET AL 2,910,234

BIT COUNT CHECKING CIRCUIT

Original Filed Nov. 18, 1954 36 Sheets-Sheet 26

Oct. 27, 1959 O. B. SHAFER ET AL 2,910,234

BIT COUNT CHECKING CIRCUIT

Original Filed Nov. 18, 1954 36 Sheets-Sheet 27

BIT COUNT CHECKING CIRCUIT

Oct. 27, 1959 O. B. SHAFER ET AL 2,910,234

BIT COUNT CHECKING CIRCUIT

Original Filed Nov. 18, 1954 36 Sheets-Sheet 33

Oct. 27, 1959 O. B. SHAFER ET AL 2,910,234

BIT COUNT CHECKING CIRCUIT

Original Filed Nov. 18, 1954 36 Sheets-Sheet 36

United States Patent Office 2,910,234

Patented Oct. 27, 1959

2,910,234

BIT COUNT CHECKING CIRCUIT

Orville B. Shafer, Owego, N.Y., and Andrew C. Reynolds, Jr., Waterbury, Conn., assignors to International Business Machines Corporation, New York, N.Y., a corporation of New York Original application November 18, 1954, Serial No. 469,592. Divided and this application October 15, 1956, Serial No. 616,047

17 Claims. (Cl. 235—153)

This invention relates to printing mechanisms and more particularly to printing mechanisms of the data processing type which are capable of processing data delivered from an external source.

This is a division of application Serial No. 469,592, filed November 18, 1954, entitled "Printer for Calculator Unit" and assigned to the assignee of the present invention.

In accordance with the invention, a differentially operable printing mechanism or machine of the type normally used for processing data recorded in tabulating cards is provided with a modified data processing means which receives the data to be processed a line at a time from an external source. Each line of data is divided into groups of words comprising a plurality of ordered positions, each having numeric characters 0 to 9, inclusive.

The data processing means includes a binary to decimal translator operated in timed relation wtih the normal machine digit cycle point positions. With a translator of this type, the entire line of data to be printed is serially delivered to the translator in binary code at each machine cycle point 9 through 0, however, only the binary coded pulses corresponding to the particular digit cycle point of the printing mechanism are accepted and serially transmitted from thte translator as single pulses. All pulses, when selected, pass from the translator over a single conductor which in turn is connected to a word data switch forming a part of a print matrix comprising a group or array of tubes arranged in rows and columns to represent words and ordered positions in the word, respectively. The timing of the matrix is controlled by shift pulses delivered from the calculator to a closed fast ring for driving the columns which in turn drive an open slow ring for driving the rows. These two are interconnected so that at any point where coincidence occurs therebetween with a pulse received by the word switch from the translator that tube is fired. Firing of the tube energizes a print magnet connected thereto which in turn, after a mechanical delay, results in actuation of printing apparatus to cause the selected order in the word to initiate printing the desired numerical data or digit. As the machine moves to its next digit cycle point, the entire line of binary data is again delivered to the translator and the binary code for that cycle point is translated to its decimal value and transmitted in a like manner to fire the proper tube. In this manner the entire line is delivered to the translator once for each digit cycle point 9 through 0 or a total of ten times. At the end of the ten delivery operations, all binary stored data will have been delivered to the print matrix from which the printing means is actuated.

The setting up of all like digits in each word of the entire line corresponding to the digit cycle point of the printing mechanism is delivered serially but occurs substantially simultaneously. Thus, with the various digit cycle points moved from point to point in a consecutive manner, the corresponding digits are set up. After the last machine cycle point digits are completely set up and the proper delay for checking has transpired, the printing operation for the entire line of numeric information occurs substantially simultaneously.

In order to properly time the delivery of data to the translator, a control digit cycle point pulse or row signal is transmitted from the printer to the calculator or external source of information at each cycle point.

A bit count checking circuit is provided in the printer to insure the printing of the proper numeric data for each order in each word. This checking circuit comprises a plurality of cascade connected relays disposed in a bit count network cicuit and includes relays for each order of each word which are energized upon actuation of the particular order in accordance with a preselected code and bit count. The interconnected relays are wired to provide a 4 modulus to cancel or cast out all bit counts divisible by four. The bit count value from the checking circuit representing the remainder is compared with a similar bit count delivered from the external source over the binary input lines to the translator along with each word. If the numeric bit count generated in the printer and the delivered bit count from the external source agree, the actual printing of the data takes place and continued operation of the printer is permitted, if not, an error is indicated and the printing mechanism is stopped and further information from the calculator will not be received until the error has been corrected. If desired, the bit count checking means may be shunted to permit printer operation even though an error is detected.

Accordingly, it is one of the objects of this invention to provide a data processing line printing mechanism operated on machine digit cycle points 9 through 0 with a binary to decimal translator synchronized therewith which serially transmits all like numeric values at each cycle point 9 through 0 to operate the printing mechanism.

It is another object to provide a line printer having ordered positions with a circuit responsive to numeric data at each order which operates on some modulus to provide a bit count for the orders.

It is yet another object to provide a printer for numeric data with a bit count generator based on a predetermined modulus for the numeric values in which the bit count remainder is compared with a second bit count based on the same modulus received from an external source.

It is another object to provide a line printer for receiving data to be printed and bit count of the data from an external source with a bit count circuit operated by the data printed which is compared with the bit count of the data received.

It is another object to provide a line printer for receiving data to be printed and the bit count of the data from an external source with a bit count circuit operated by the data printed which permits continued operation of the printer if the received and printer bit counts agree.

It is still another object to provide a line printer for receiving data to be printed and bit count of the data from an external source with a bit count circuit operated by the data printed which interrupts further printing operation if the received and printer bit counts disagree.

It is another object to provide a relay network circuit with a plurality of relays connected in cascade to provide a modulo 4 having output lines over which the bit count remainder test pulse may be conducted.

Other objects of the invention will be pointed out in the following description and claims and illustrated in the accompanying drawings, which disclose, by way of examples, the principle of the invention and the best mode, which has been contemplated, of applying that principle.

Figure 3A:
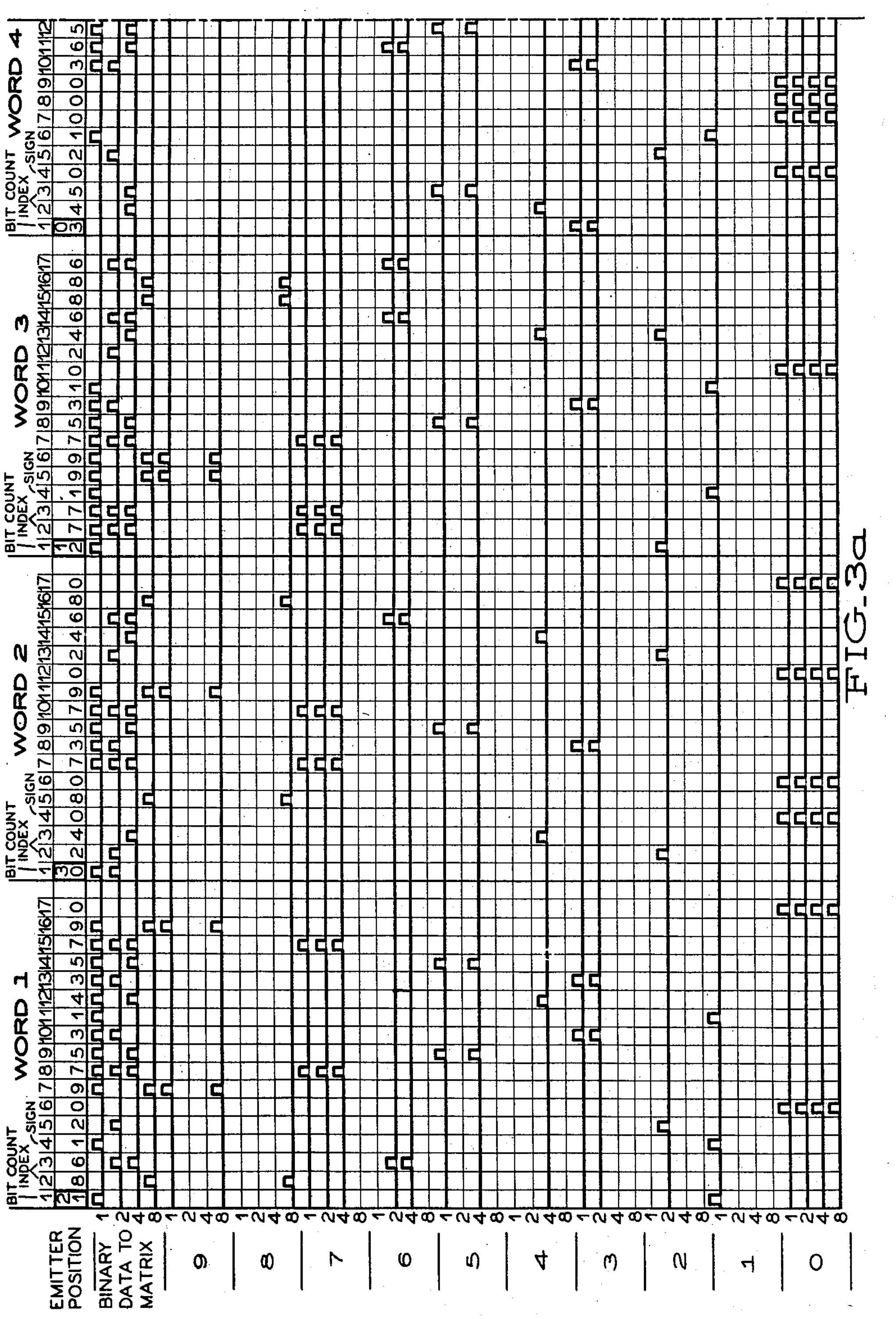
Figure 3B:
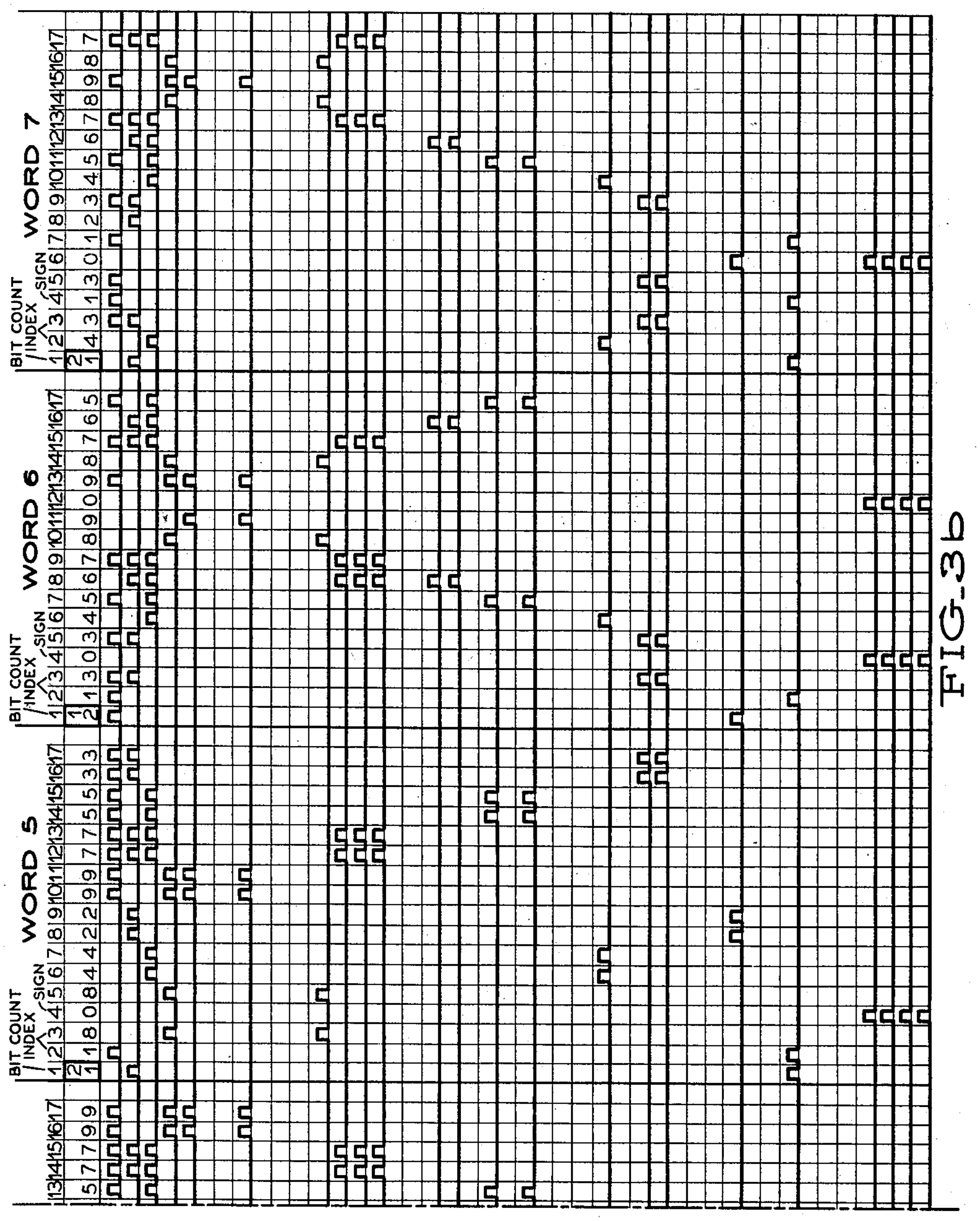

Figs. 3*a* and 3*b* taken together, with Fig. 3*a* to the left of Fig. 3*b*, comprise a timing diagram showing a group of words and ordered positions which comprise a line of numeric data or information.

Figures 4A, 4B:
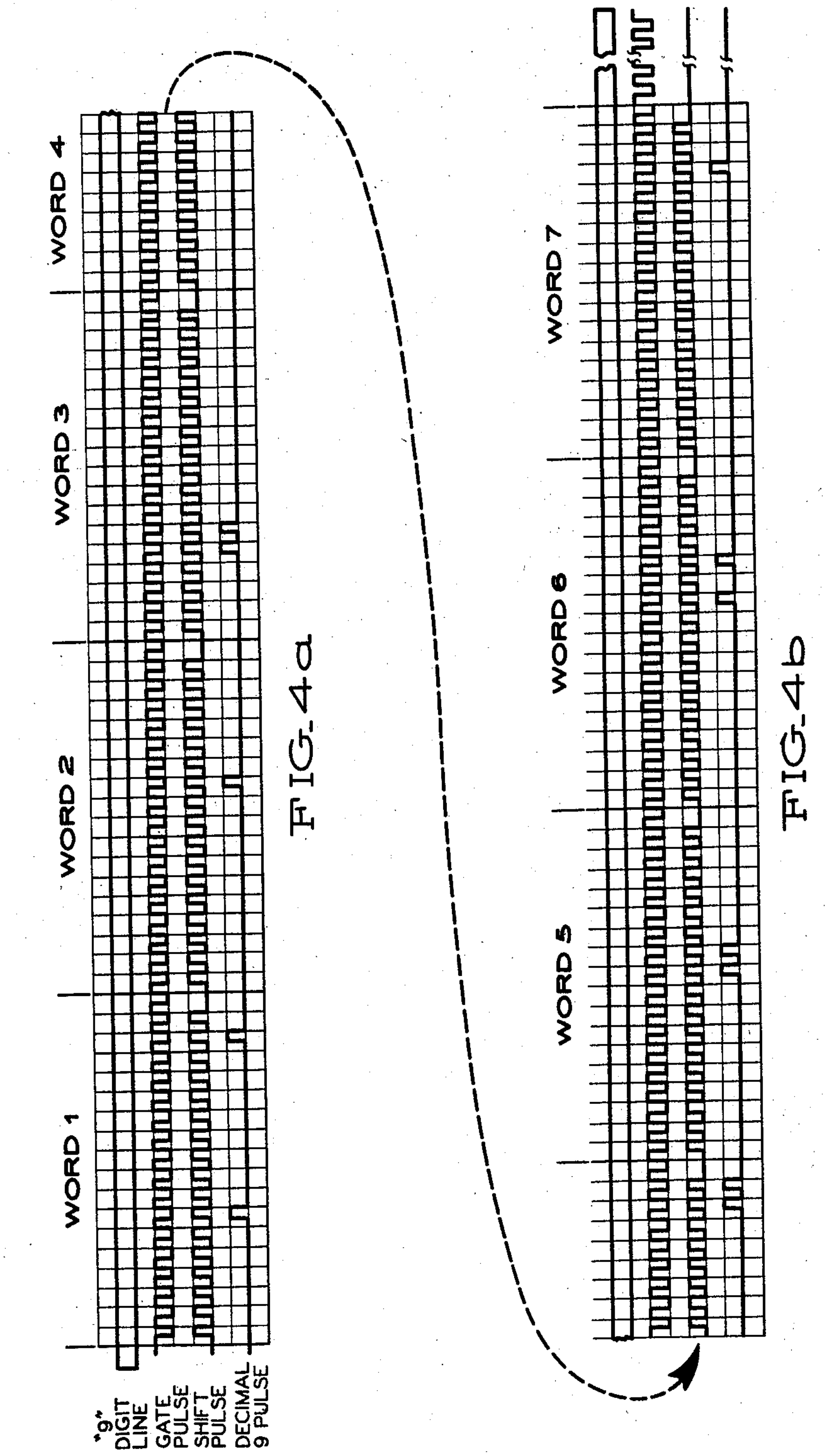

Figs. 4*a* and 4*b* taken, with Fig. 4*a* to the left of Fig. 4*b*, comprise a timing chart of a single machine cycle point of the printer with the relative position of the translated data at that cycle point in the form of serially spaced pulses delivered by the translator.

Figure 5:
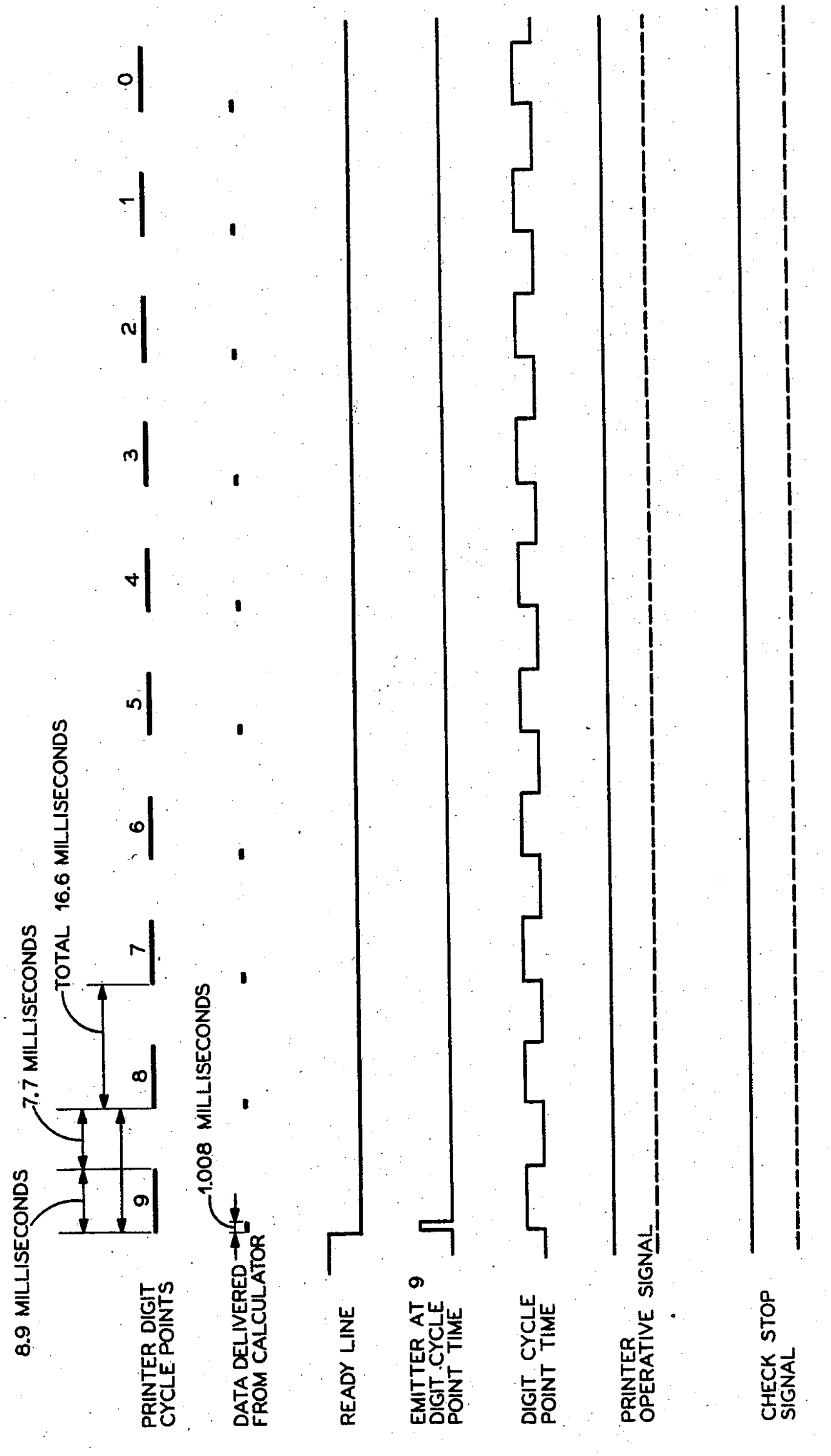

Fig. 5 discloses a timing diagram showing the various cycle points 9 through 0 and the pulses generated to indicate the printer is ready to accept data from the external source.

Figs. 6*a*, 6*b*, 7*a*, 7*b*, 8*a* and 8*b* diagrammatically show various types of diode coincidence switches or "and" circuits and diode mixes or "or" circuits used in the printer control circuit.

Figs. 9*a*, 9*b* through 24*a* and 24*b* are schematic representations of tube circuit elements which are shown in the various block diagrams as used in the printer control circuit.

Figure 25A:
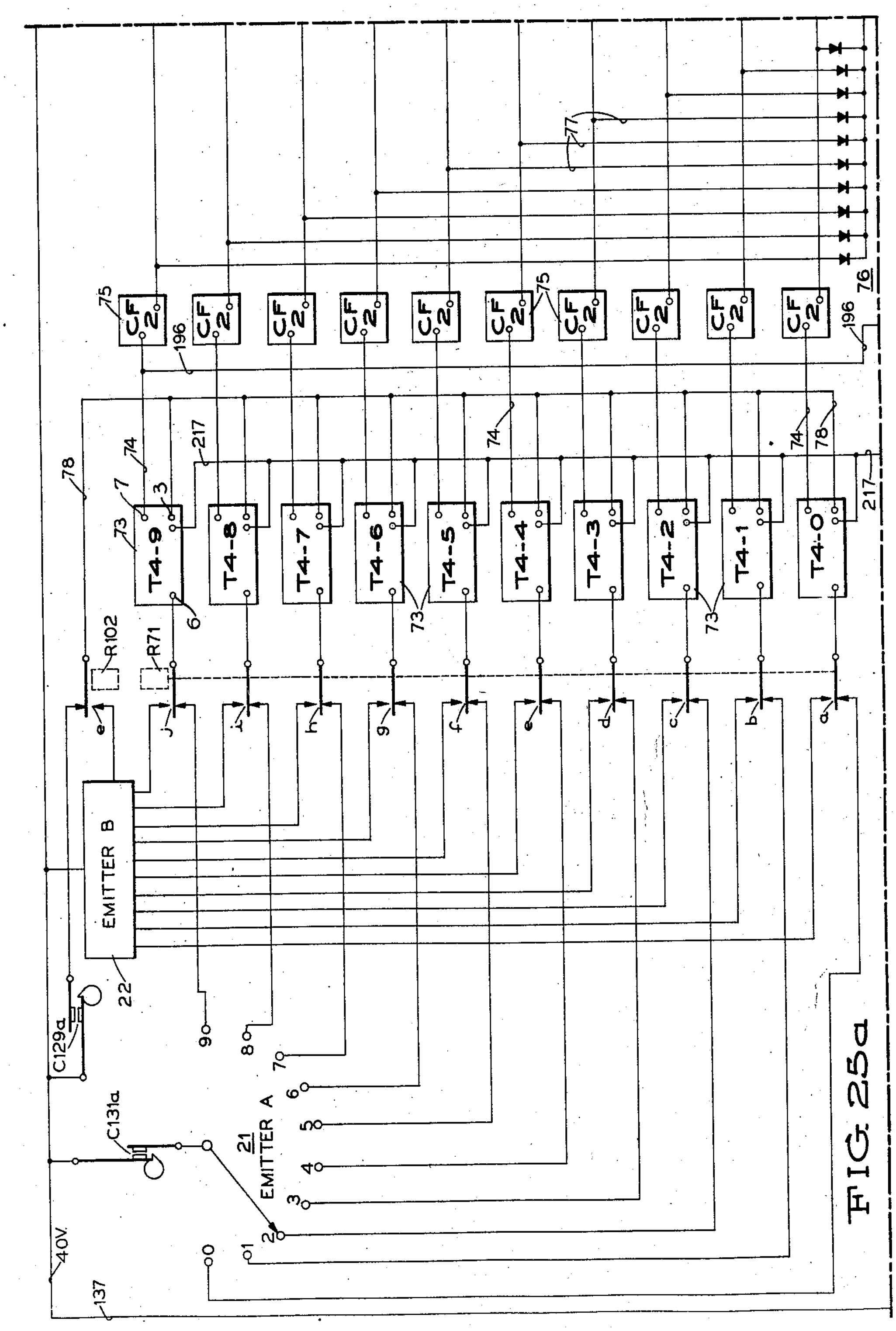
Figure 25B:
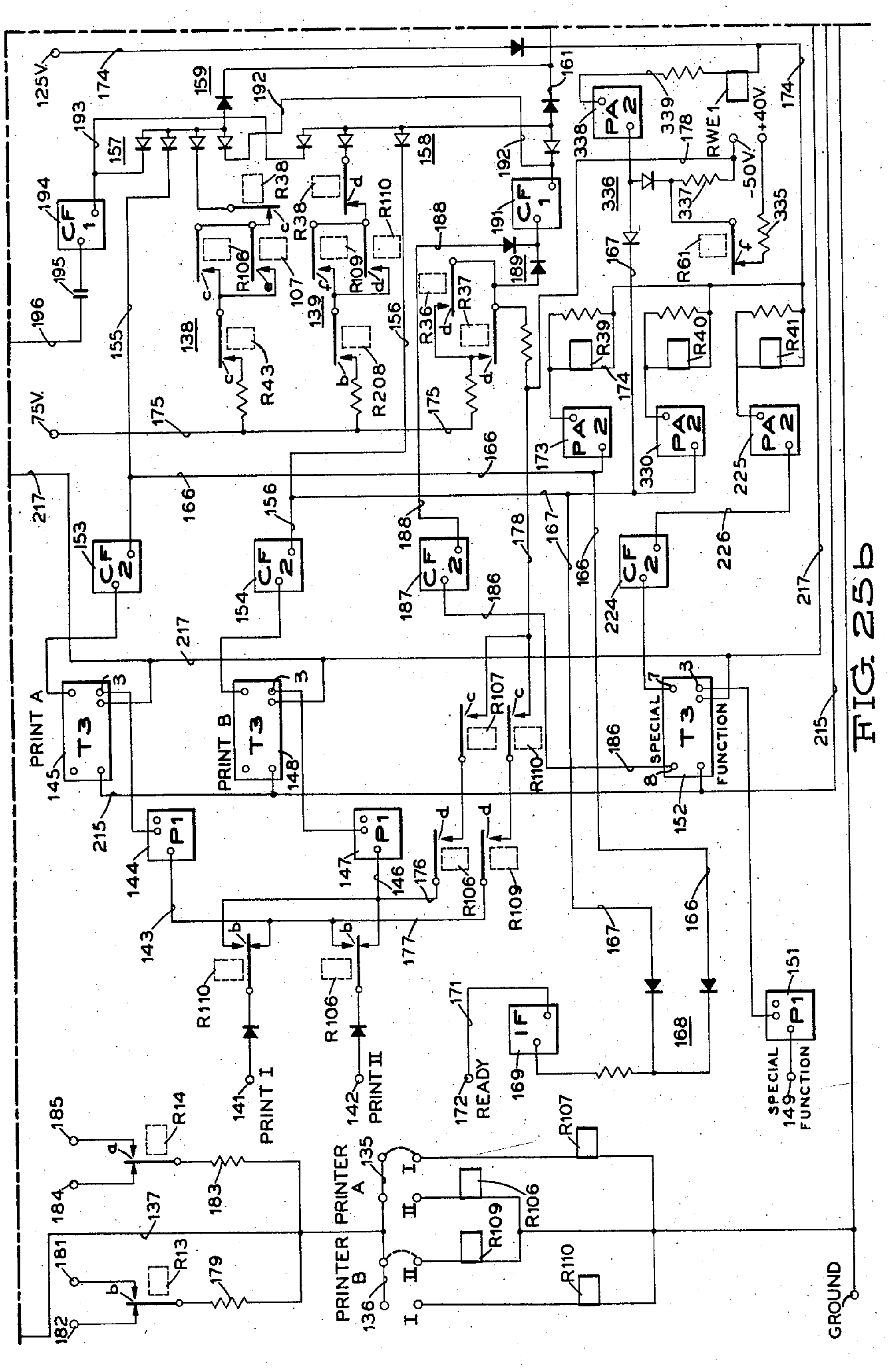
Figure 25C:
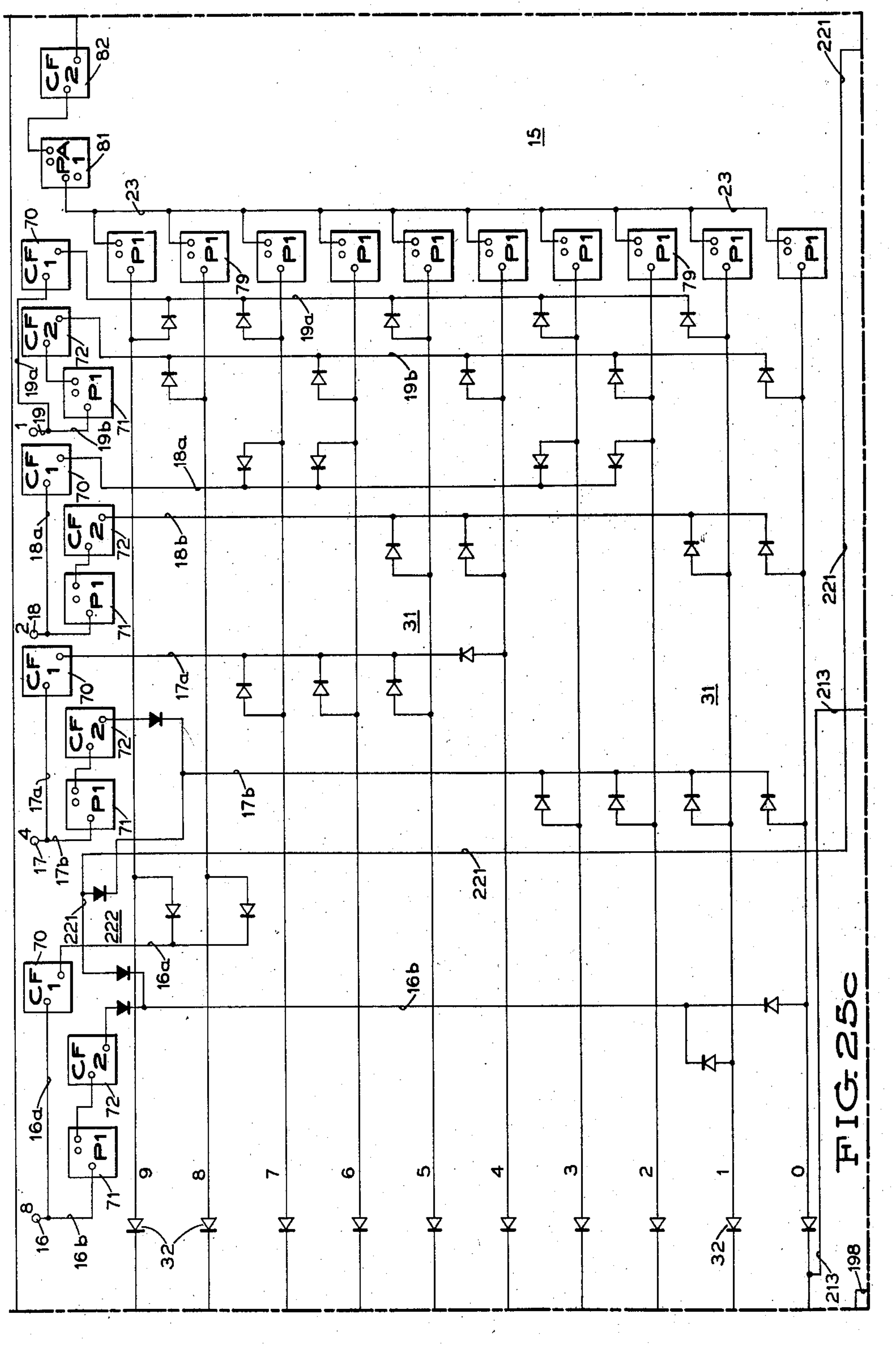
Figure 25D:
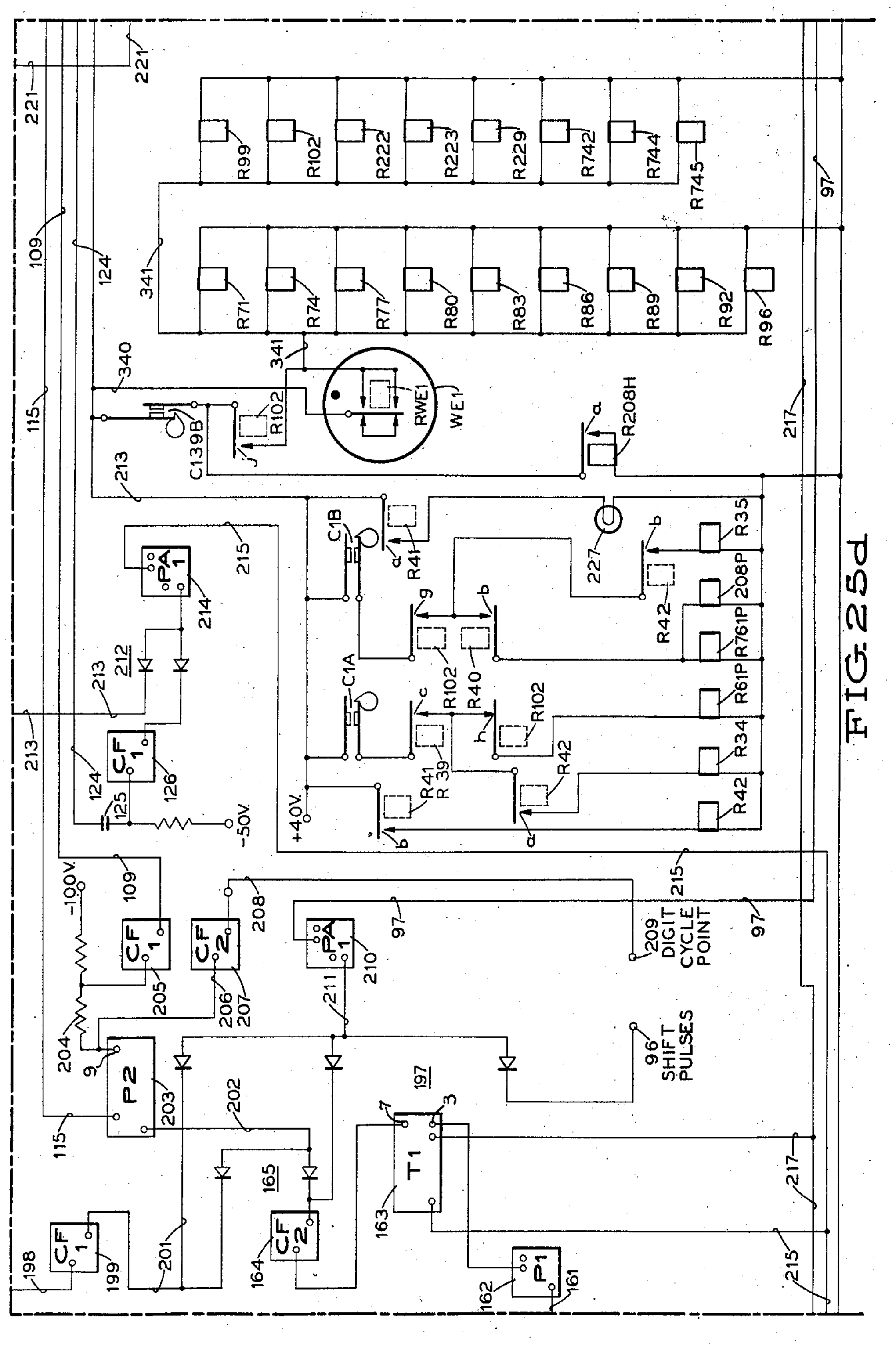
Figure 25E:
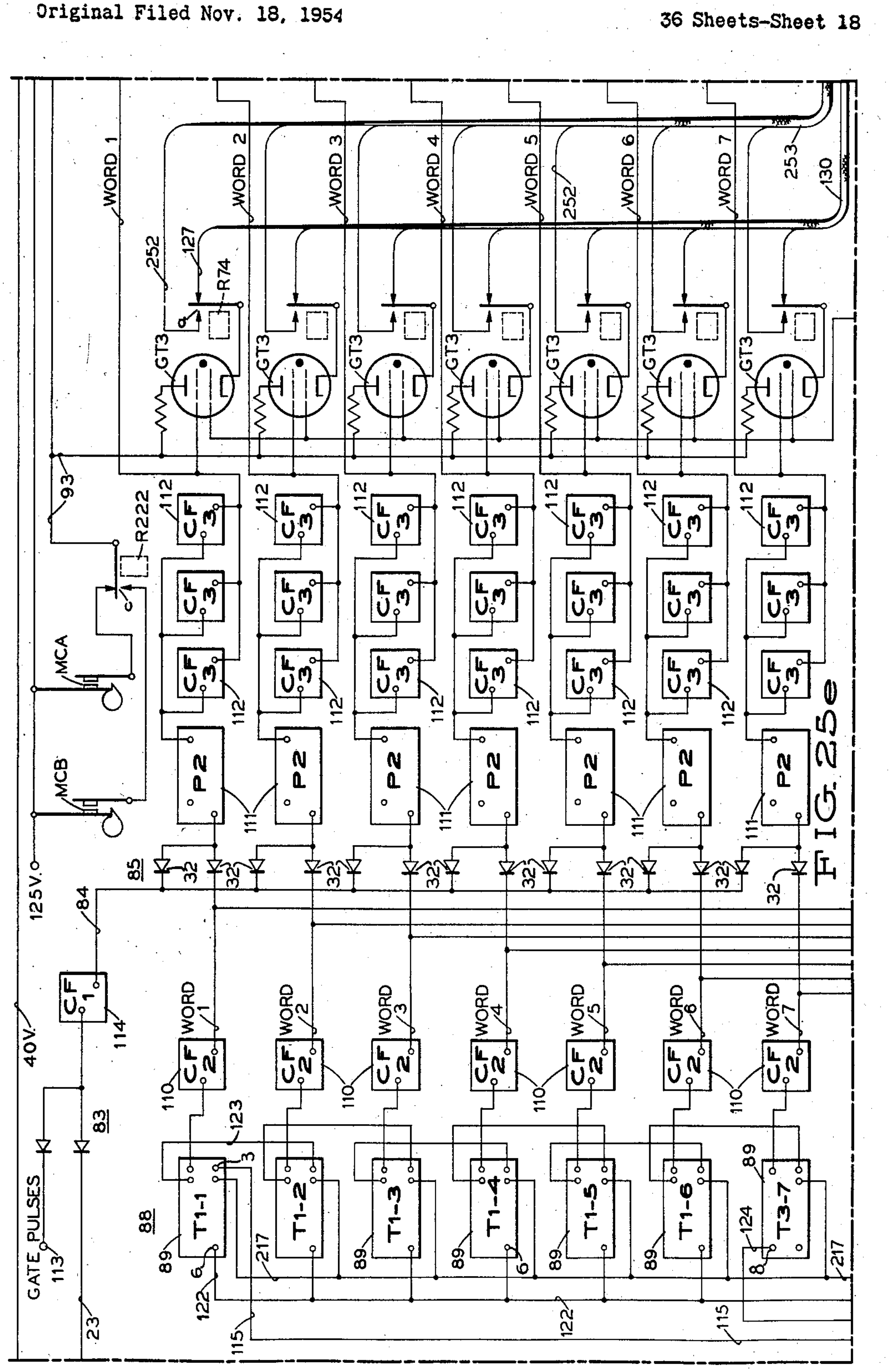
Figure 25F:
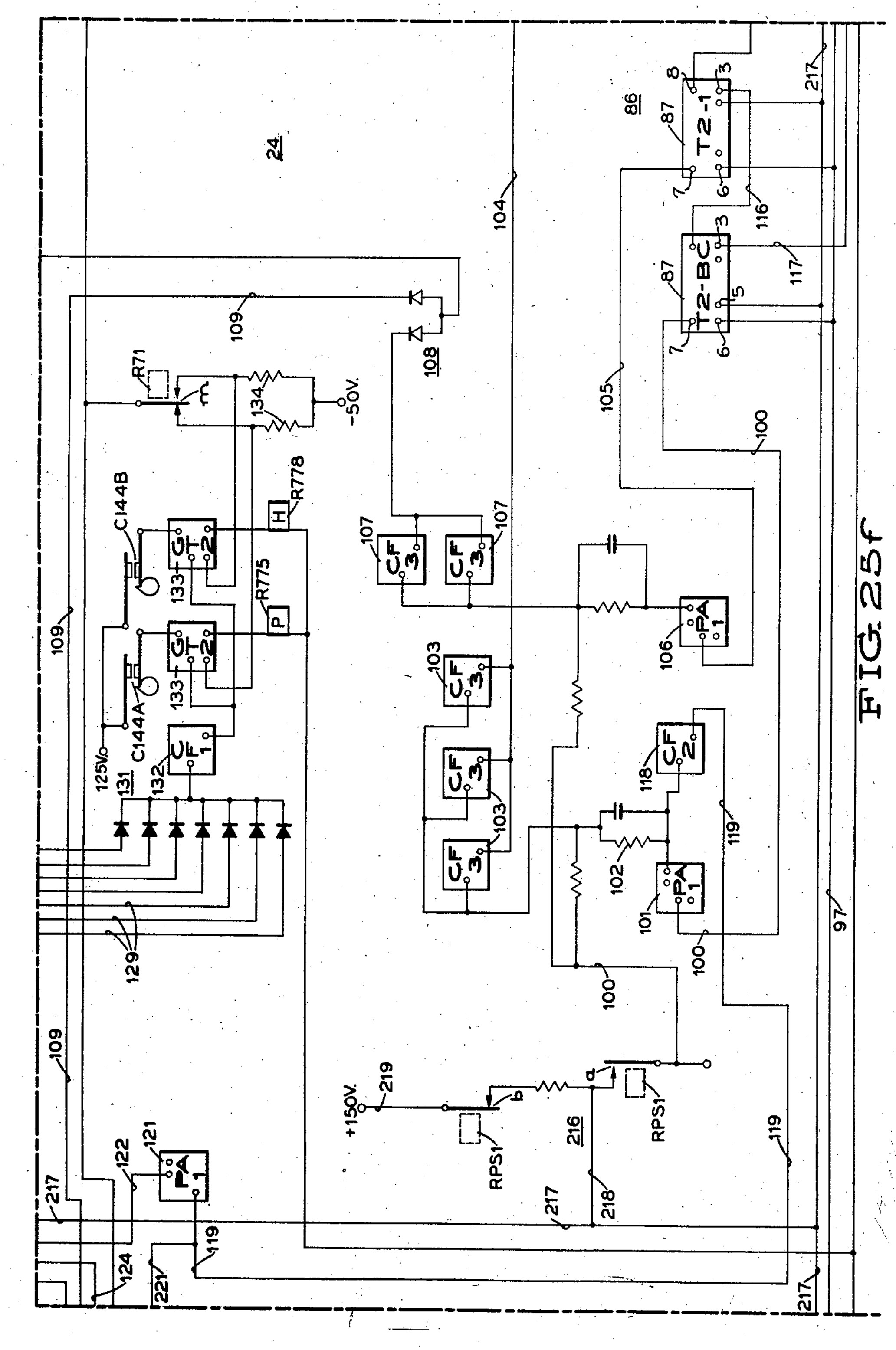
Figure 25G:
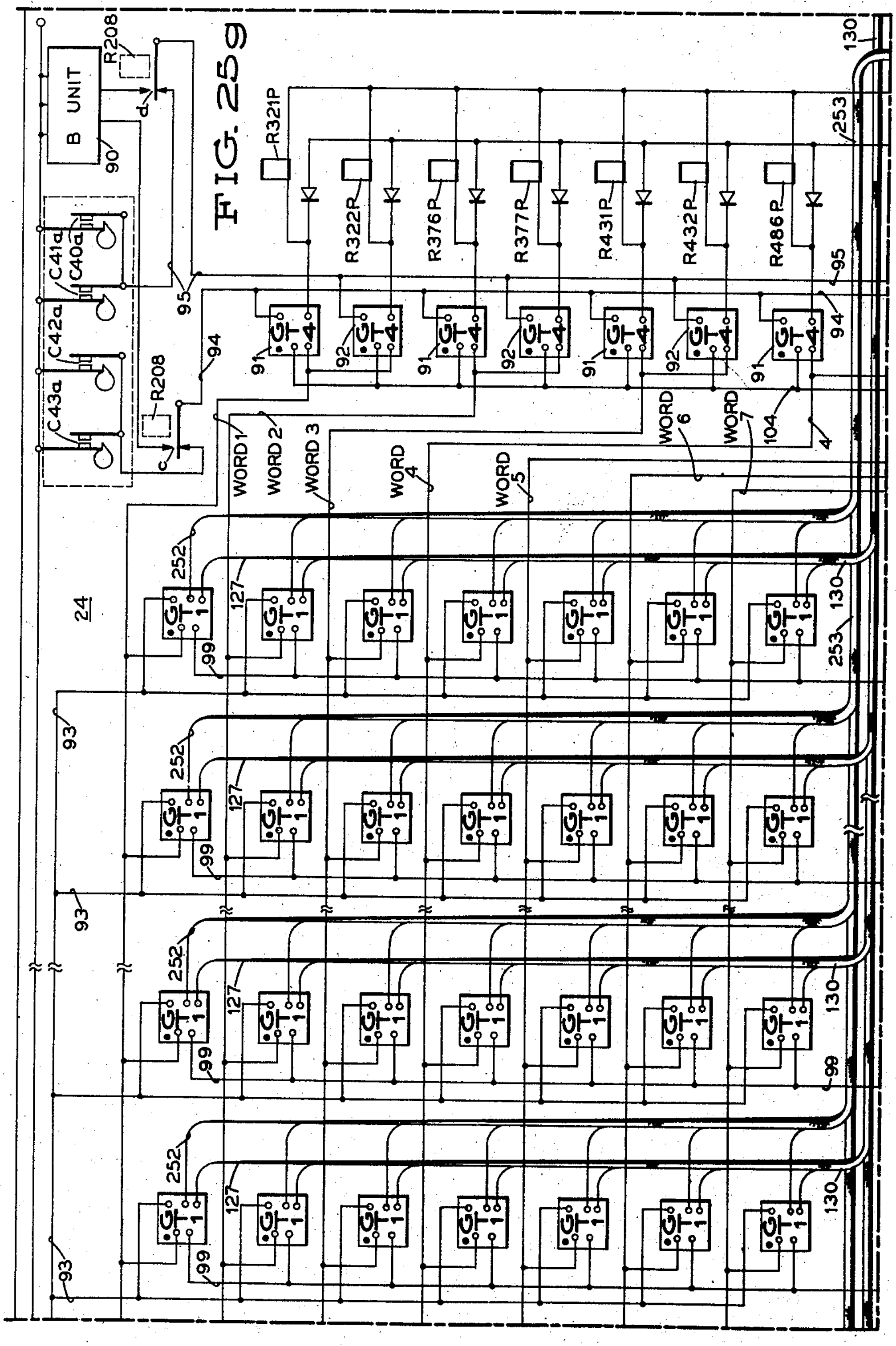
Figure 25H:
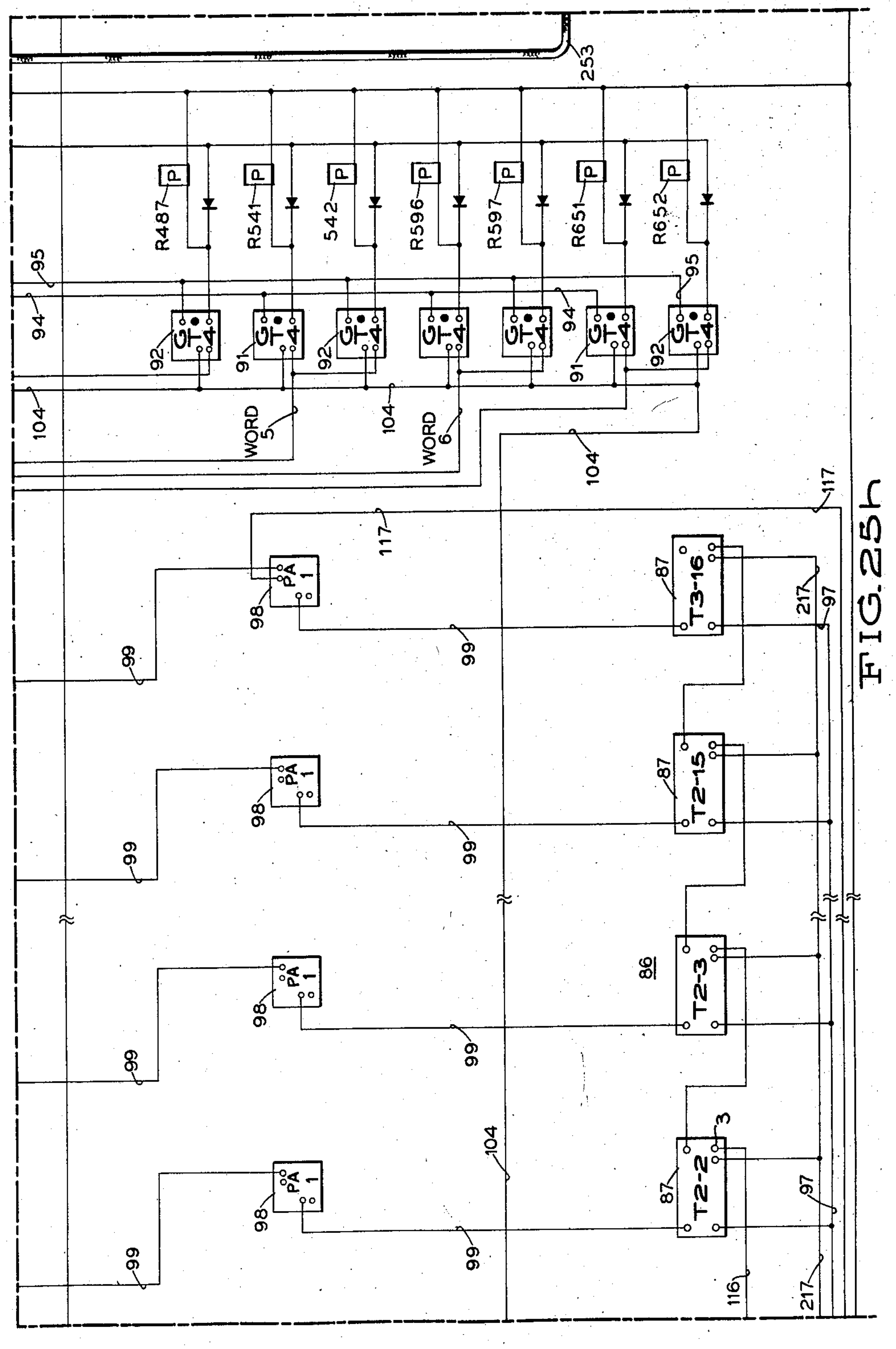
Figure 25I:
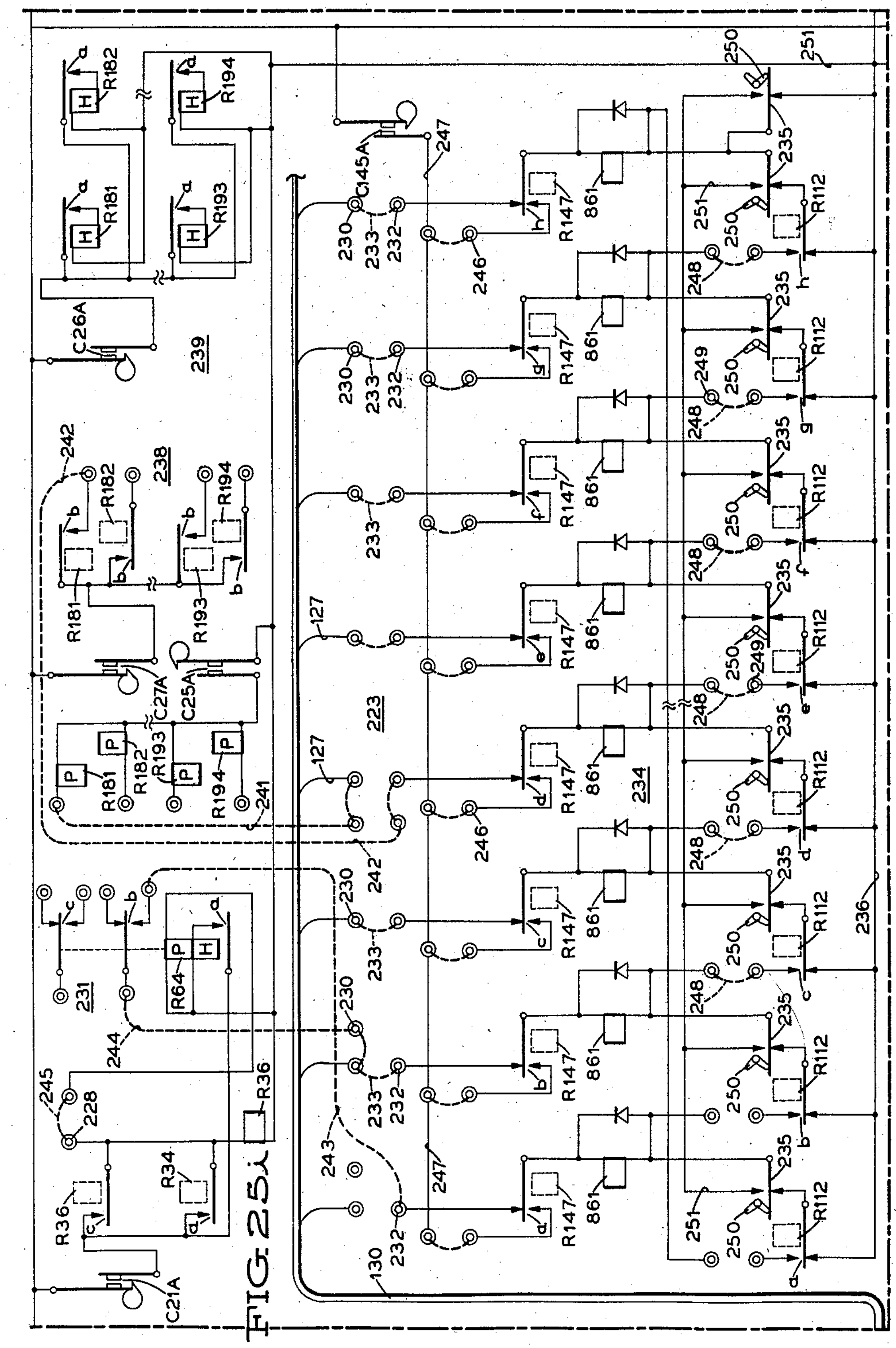
Figure 25J:
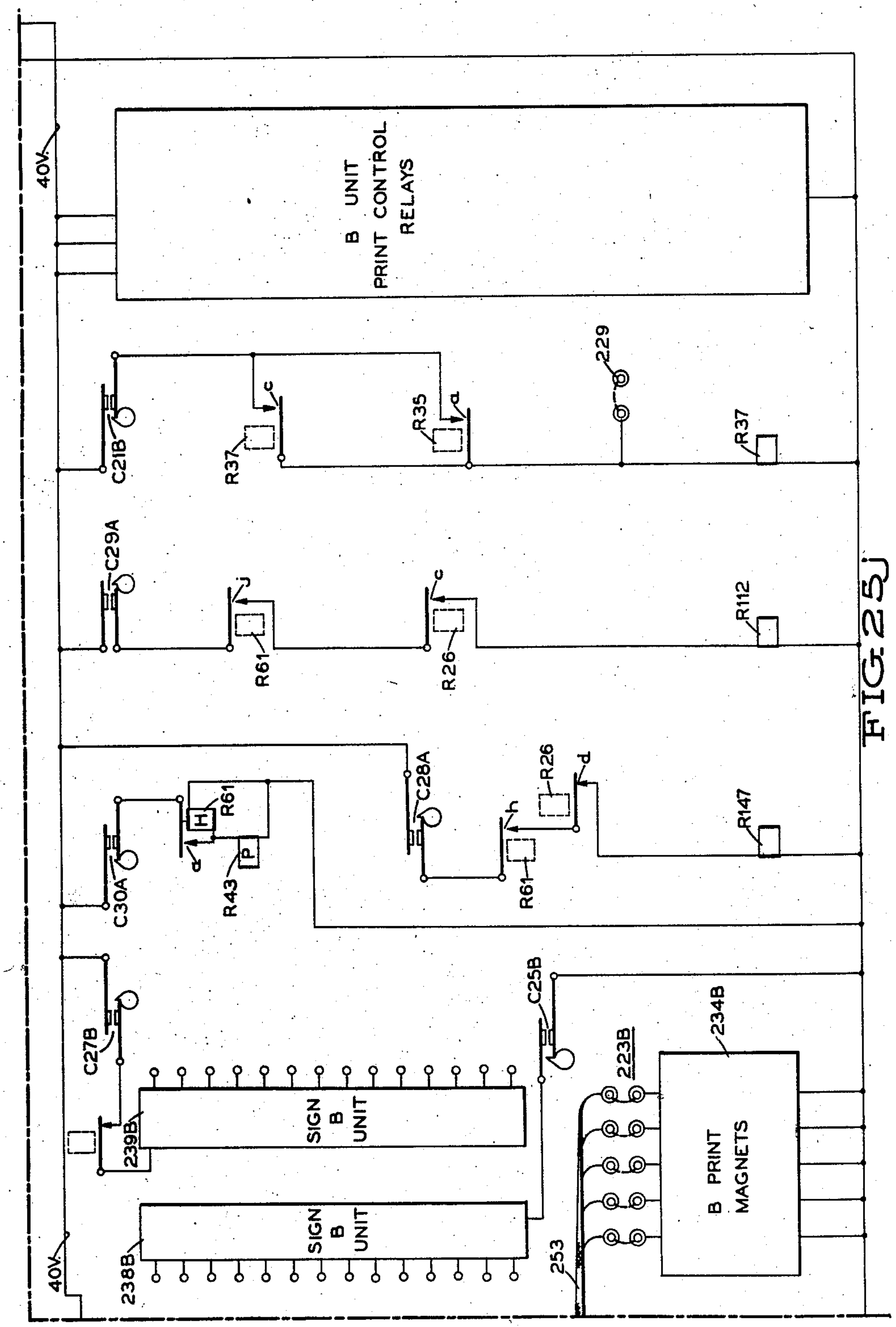
Figure 25K:
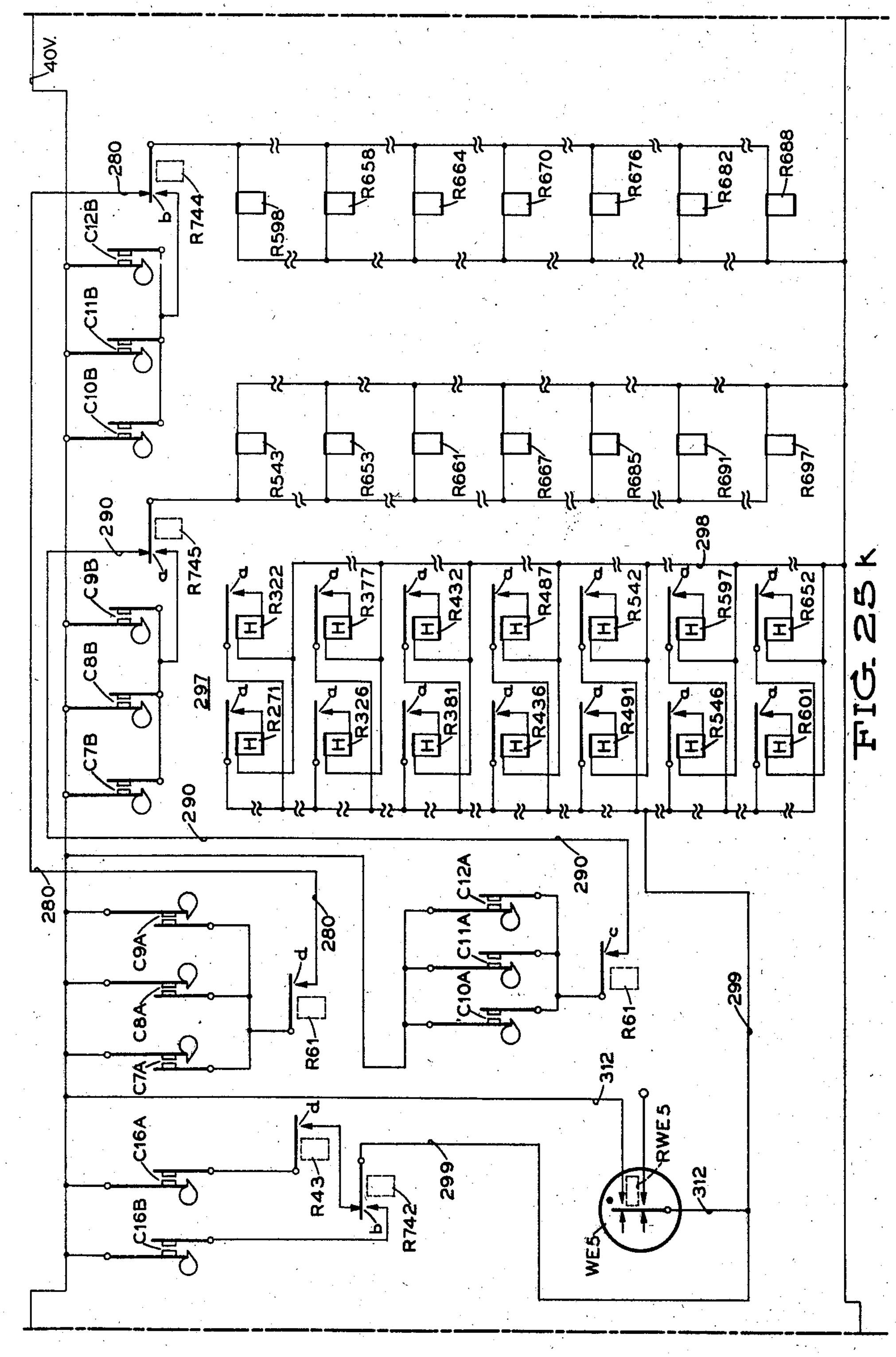
Figure 25L:
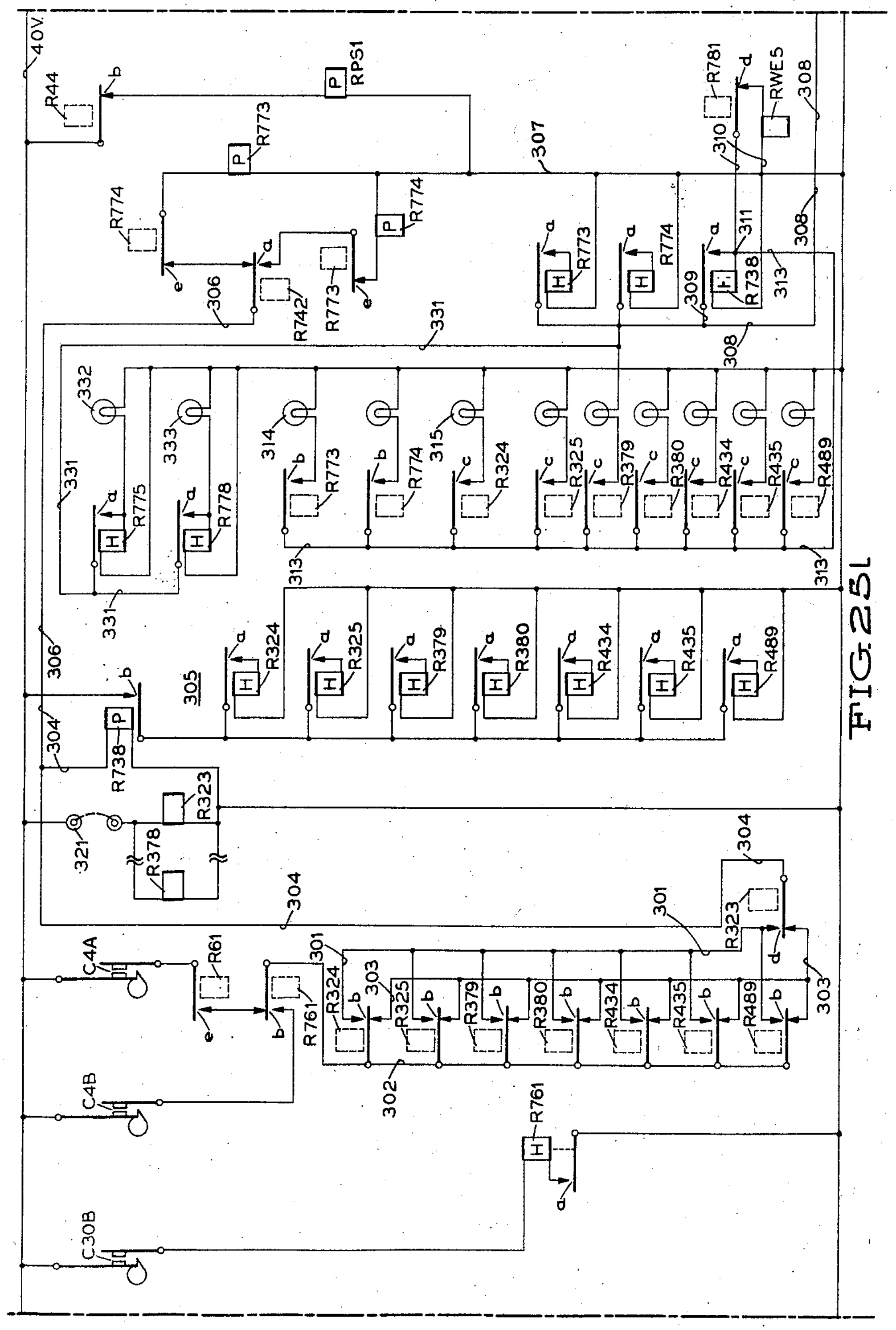
Figure 25M:
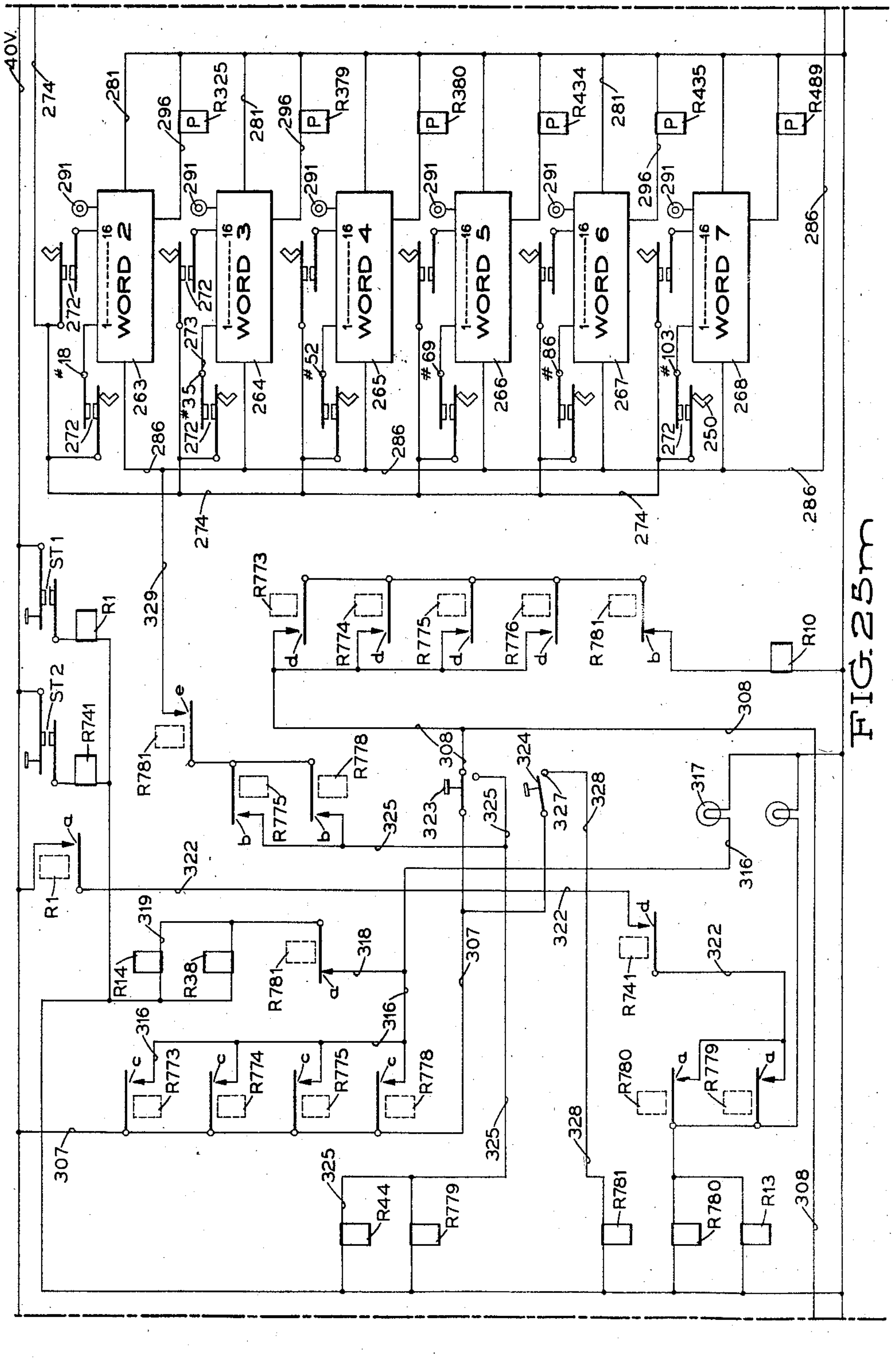
Figure 25N:
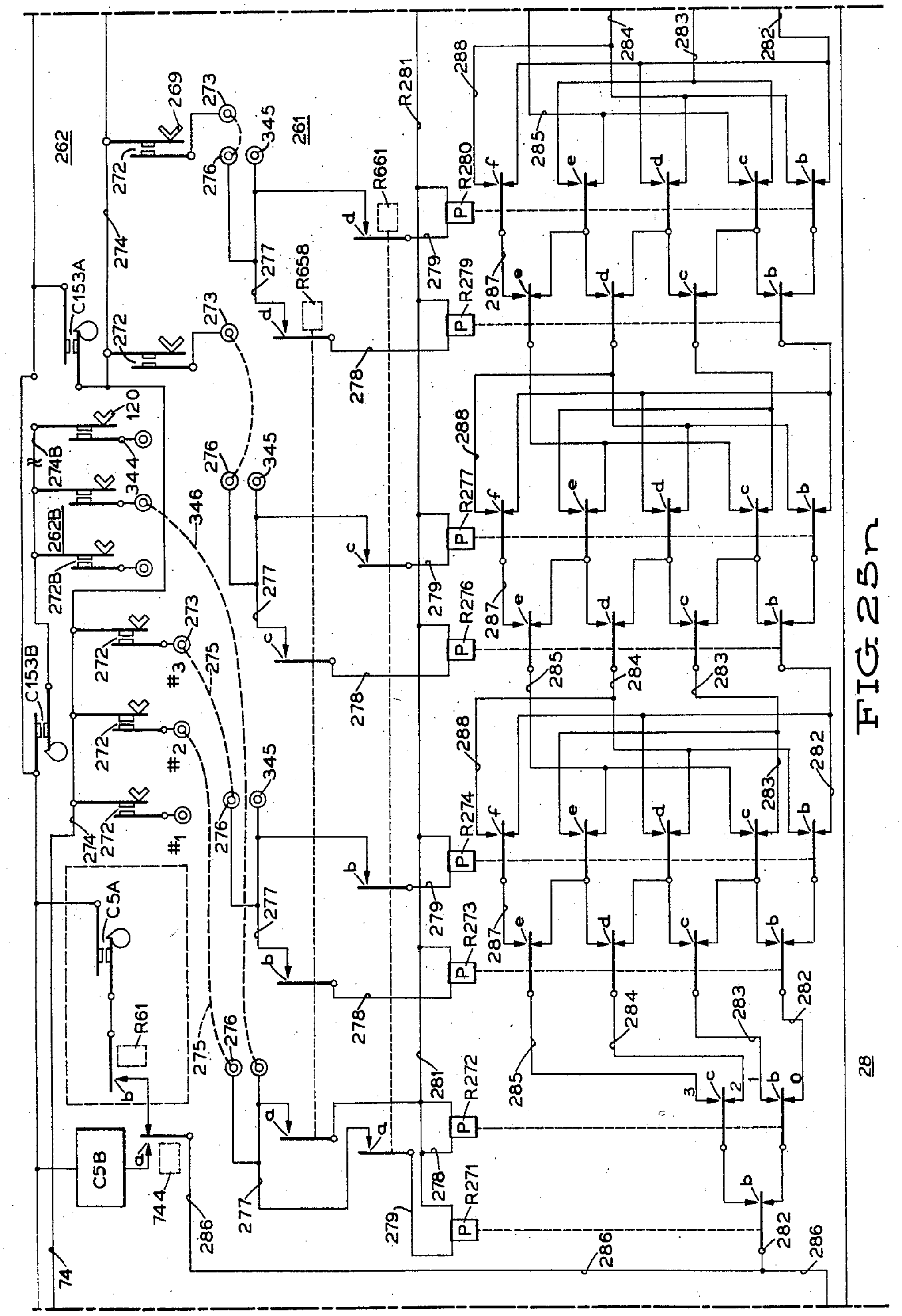
Figure 25O:
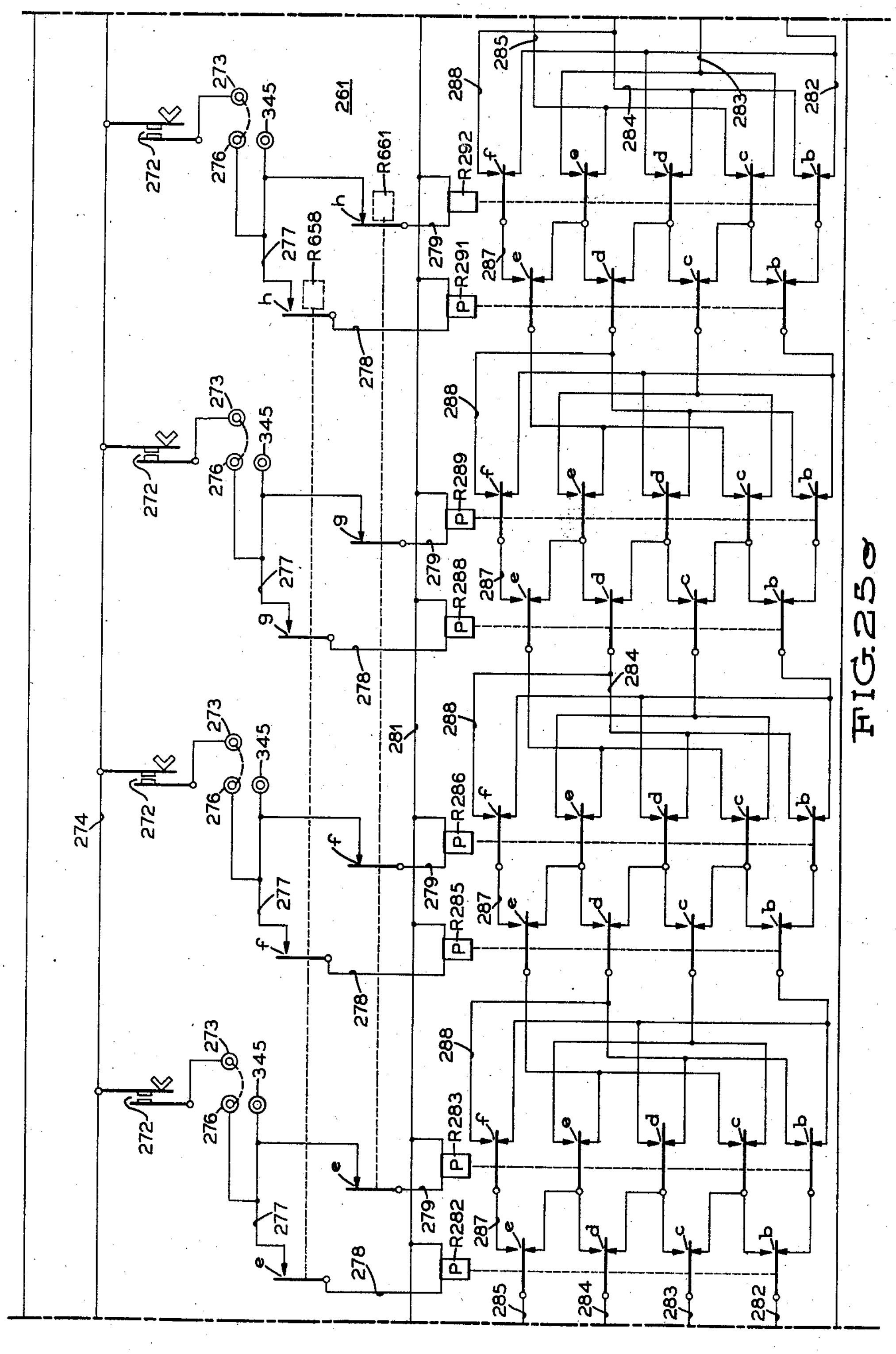
Figure 25P:
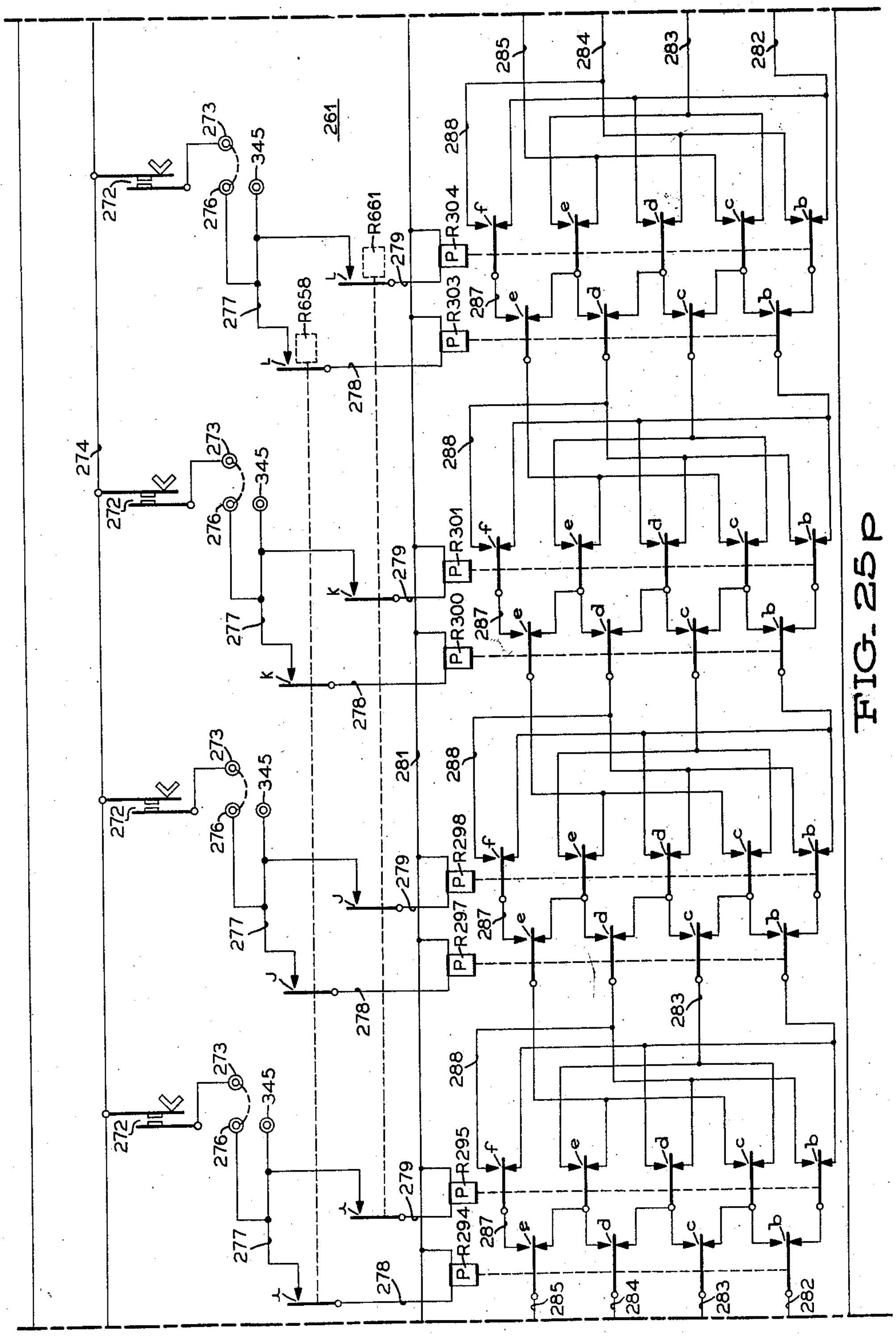
Figure 25Q:
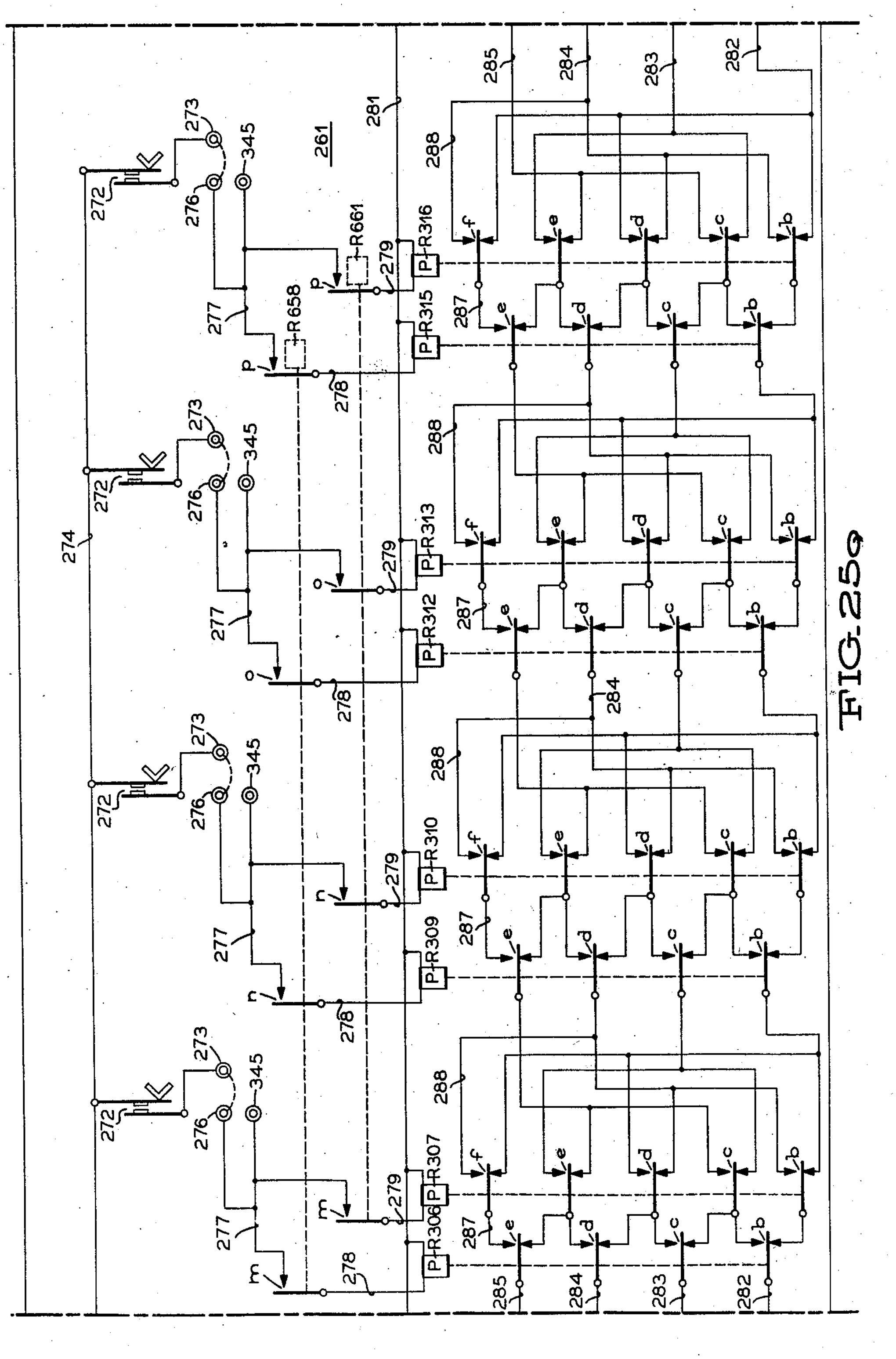
Figure 25R:
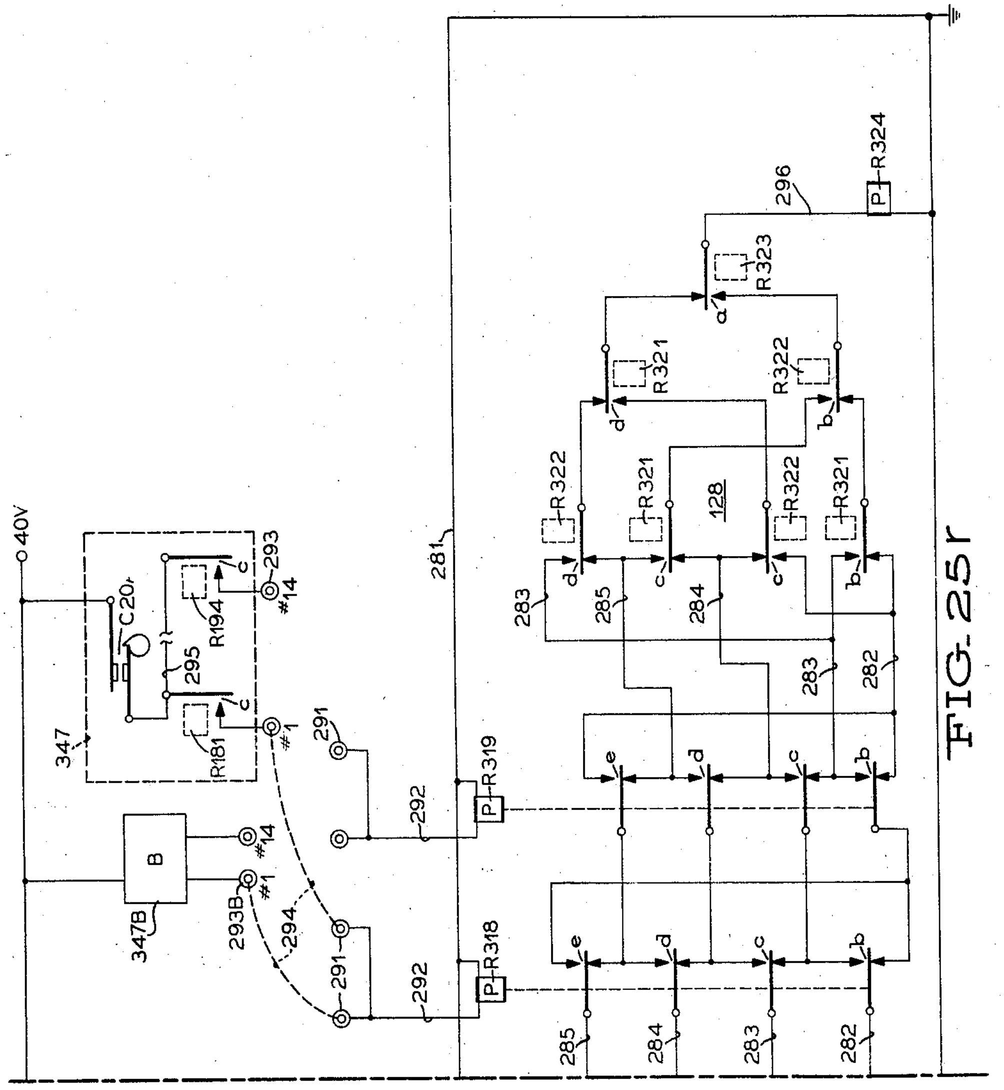

Figs. 25*a* to 25*r*, inclusive, taken together comprise a wiring diagram for processing the data delivered from the calculator and controlling the printer including the control of the bit count generated by the printer.

Figure 26:
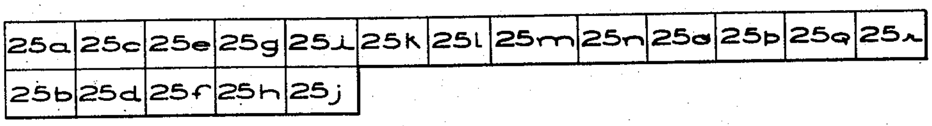

Fig. 26 is a block diagram showing the manner in which Figs. 25*a* through 25*r* are arranged.

Figure 27:
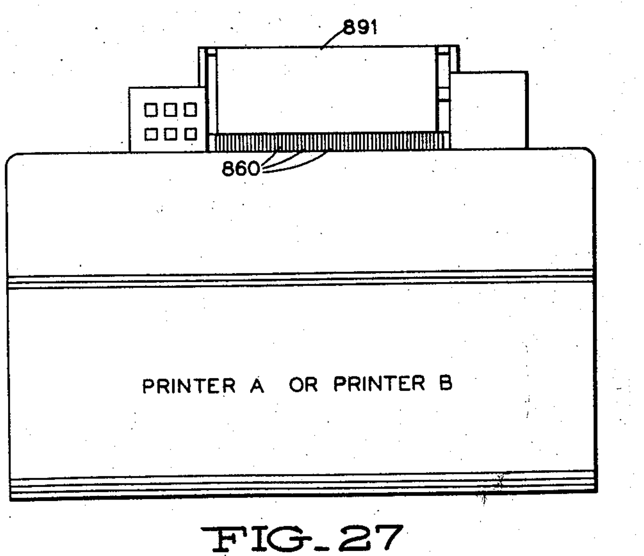

Fig. 27 is a schematic view of the line printer incorporating the improved control.

Figure 28D:
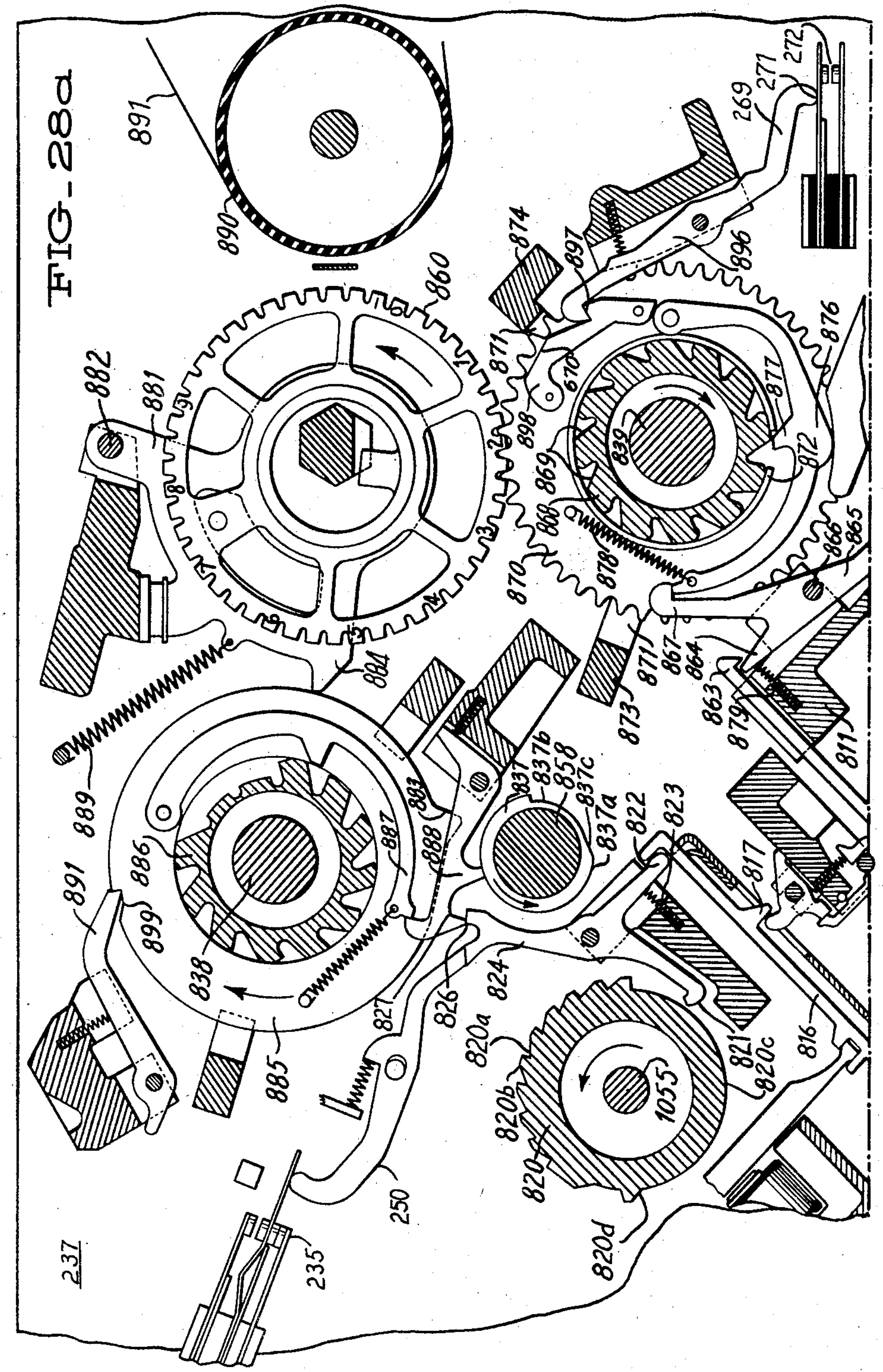
Figure 28B:
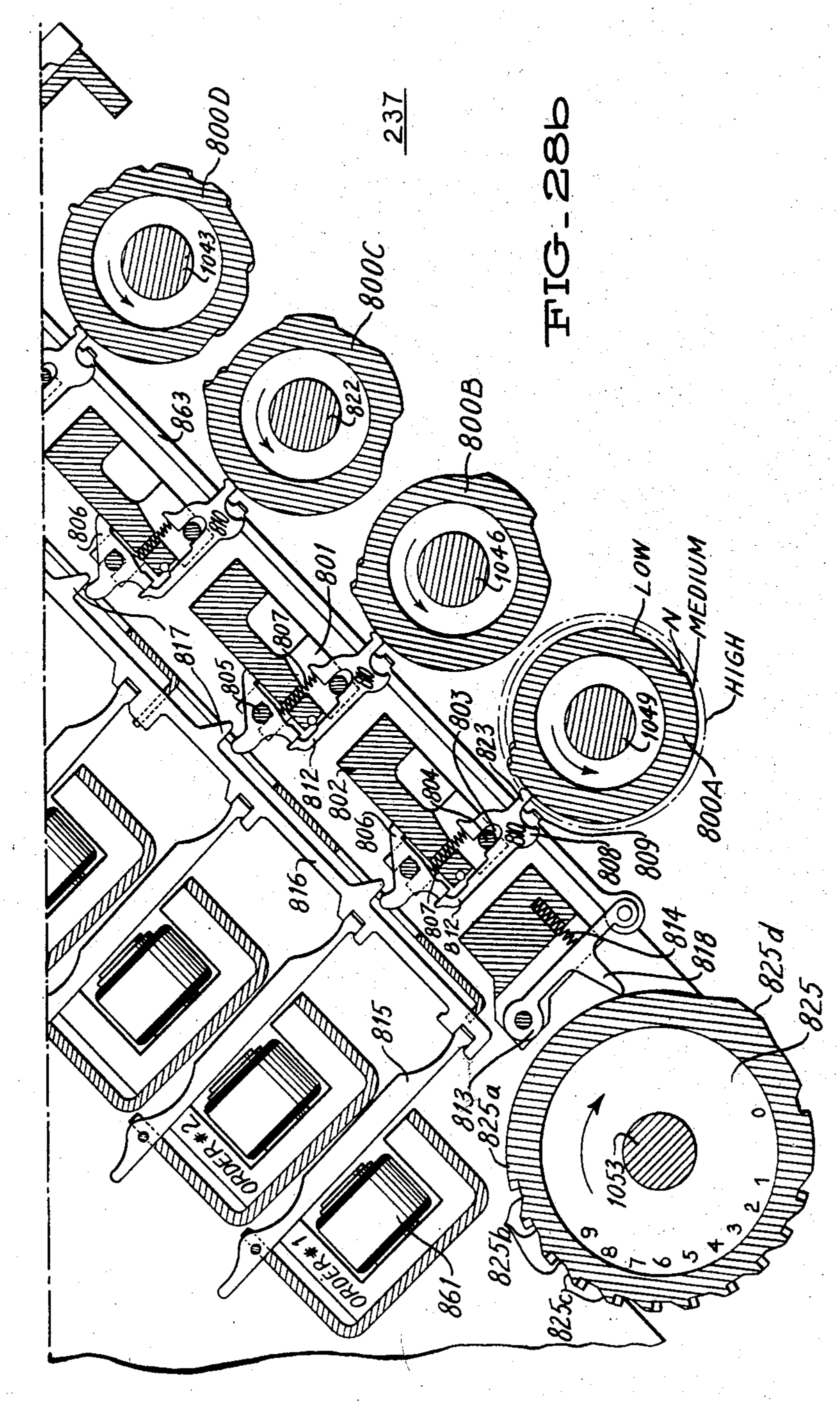

Figs. 28*a* and 28*b*, with Fig. 28*a* joined on top of 28*b*, represent a sectional view showing one order of the printing mechanism employed therein for printing the numeric data received from the external source.

Figure 29:
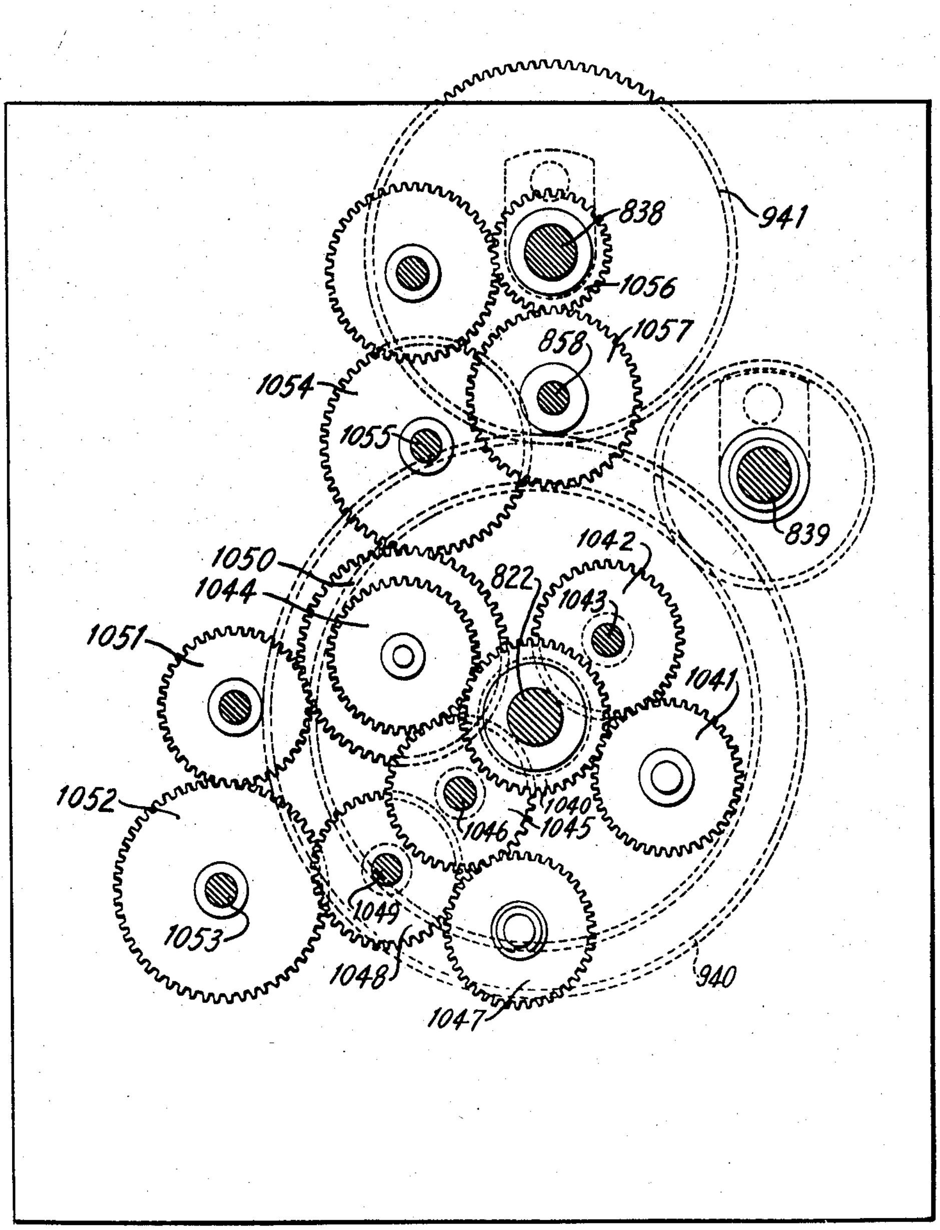

Fig. 29 is a view in side elevation of the gear drive for the drive shafts of the printing mechanism.

Figure 30:
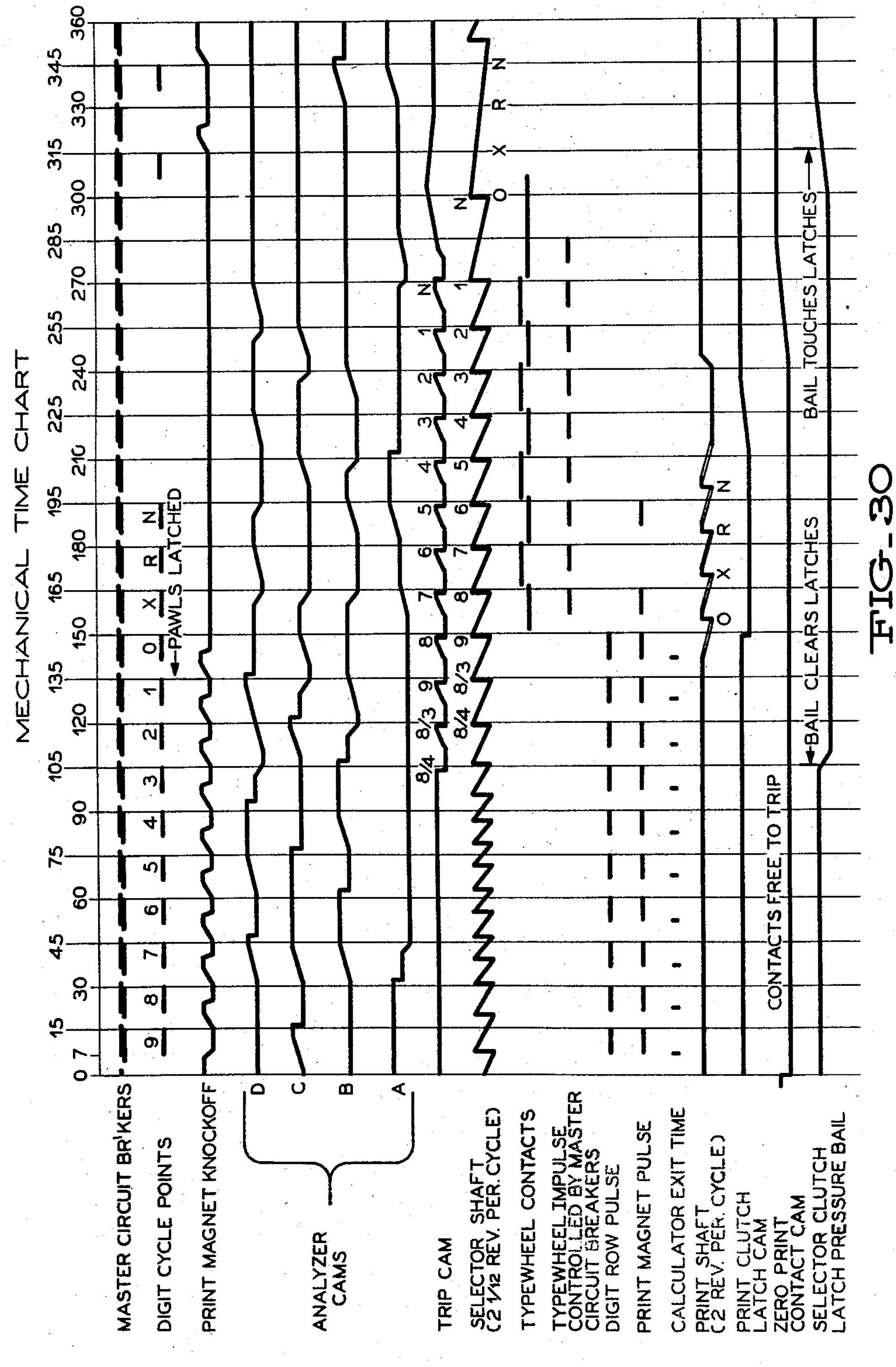
Figure 31:
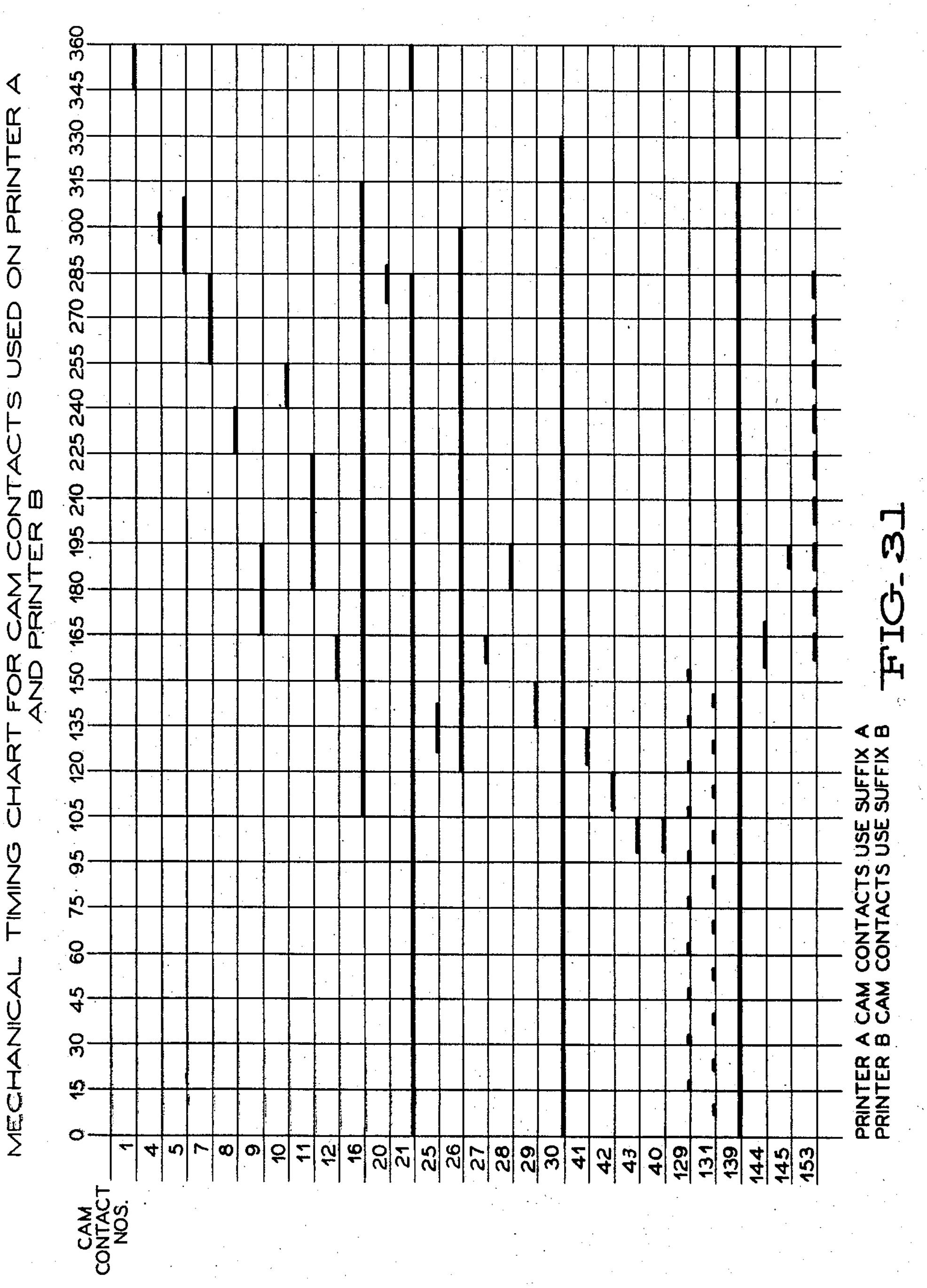

Fig. 30 is a mechanical timing chart for the various printing operations; and,

Fig. 31 is a timing chart for the cam operated contacts or circuit breakers used for the printing operations.

*General description*

A pair of printers, hereinafter referred to as printer A and printer B, are designed to print data received from a storage device in a calculator or the like (not shown) and to generate a bit count from the data printed and compare it with the bit count transmitted from the storage device.

The printers are mechanically alike and comprise two separate electromechanical print units, each with its own print control and carriage circuits. The electronic circuits for the control of the printing circuits and the bit count circuitry is common to both machines. This arrangement is possible because simultaneous printing is not a requirement of the printers.

Figure 1:
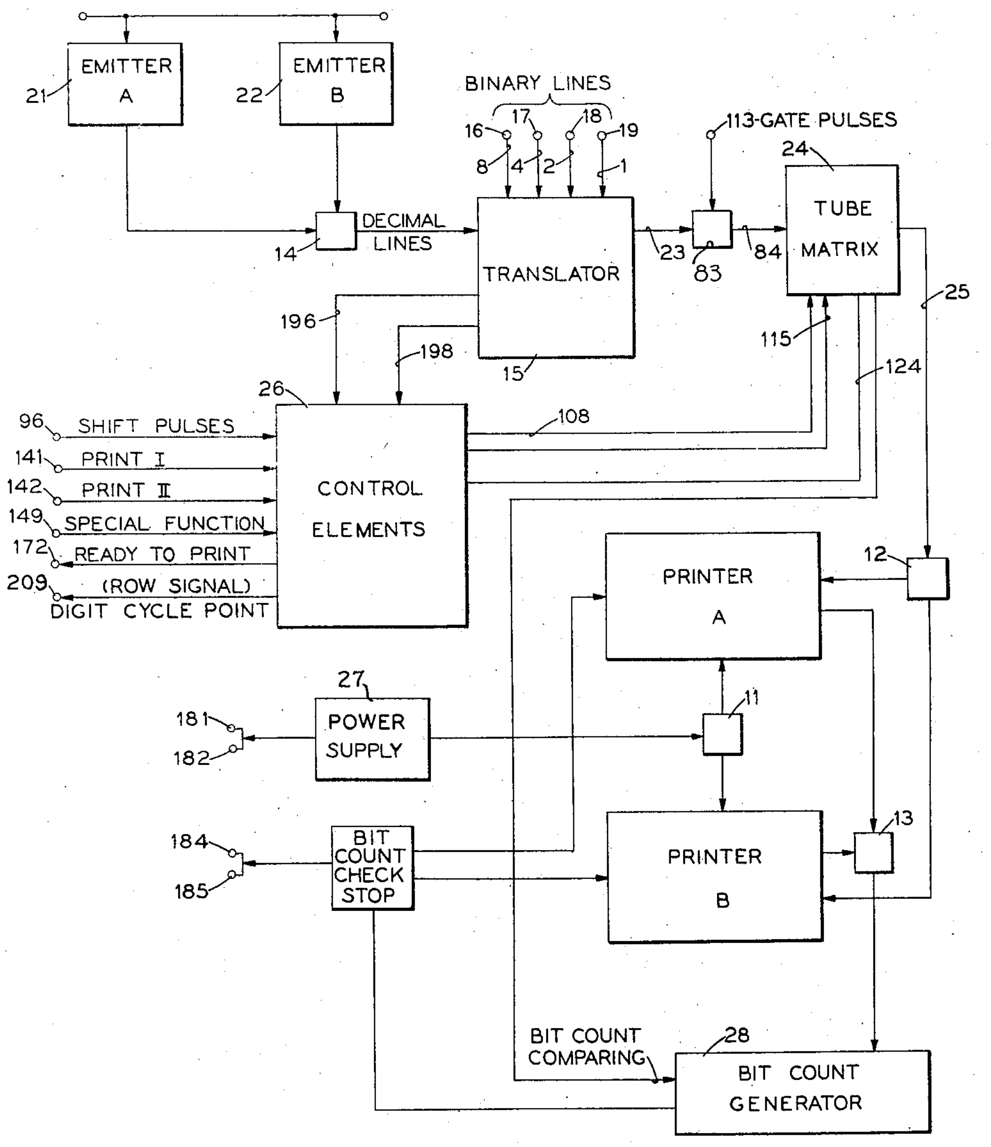
Fig. 1 shows an over-all block diagram of the line printers and the improved control means therefor.

Referring now to the drawings, there is shown in Fig. 1 a schematic block diagram of the general arrangement and interconnections of the various units comprising the improved printer control. The direction of flow of numeric information or data and various control signals between the units is indicated by arrowheads on the interconnecting conductors. Since Fig. 1 comprises a simplified representation of the improved printer control, it will be appreciated that a single conductor may represent a multiple number of conductors and allied circuitry.

As shown, there is represented the pair of printer mechanisms or units A and B, respectively, which, in this instance, are line printers of the type capable of printing an entire line at each machine cycle, interconnected by switch means 11, 12, 13 and 14 which are selectively actuated to channel information or signals to and conduct signals from the selected printing unit A or B.

In order to direct the proper signal or data to the printer, there is provided a combinational code translator capable of translating from one code to another. In this embodiment a binary to decimal translator unit 15 of the serial type is provided which receives a full line of information in the form of electrical pulses over binary 8—4—2—1 input lines 16, 17, 18 and 19, respectively. These lines are connected to a suitable storage device which may form a part of a calculator (both of which are not shown).

The translation of this binary information or data into decimal form is under the control of print A or print B emitters 21 or 22, respectively, which are selectively connected to the translator by the switch means 14. The emitters are mechanically connected (not shown) to their respective printers A or B and moved in synchronism with the cycle points in the printer cycle as will be hereinafter more fully described. These emitters, when operated, function to selectively cooperate with the translator to translate the proper binary pulses to a corresponding decimal value and permit the flow of all information or data serially in the nature of electrical pulses along a single line 23 to a suitable matrix 24. This matrix, as will be hereinafter fully described, includes a pair of rings and a group of gas tubes arranged in rows and columns. Each row represents a group of ordered positions defined as a word with each word forming a part of a line of typed numeric information and each column represents an ordered position in each word. The sum of the rows or words represents an entire line of typed information. Whenever coincidence of pulses occurs between a particular row and column and the translator, the gas tube at this point is fired which in turn operates mechanism in the selected printer A or B through line 25 to set up the printing of the numeric value selected.

The emitters 21 and 22 are so arranged as to move consecutively from a 9 machine digit cycle point through a 0 cycle point in accordance with the printer operating characteristics. At each cycle point the entire group of words forming the line are serially transmitted to the translator 15 from the storage device. However, only the decimal value of the binary code corresponding to the cycle point position of the emitter (if any) is transmitted to the matrix 24. As the emitter reaches each different cycle point and is ready to again receive the same information, a row or digit cycle point signal is transmitted to the storage device or calculator advising that the printer is now ready to receive the same information; however, at this time the numeric value to be separated and translated is of the next lower digital value.

Various pulses both received and delivered from a group of control elements or means 26 are provided to properly time the operation of the printer and delivery of data in a manner to be hereinafter described. A suitable source of power 27 is provided to operate the printer and other necessary apparatus.

In order to insure a checking means between the numeric information received by the translator 15 and that printed, a printer bit count generator and comparing device 28 is provided. This device is so arranged as to respond to the printing mechanism and operates on a suitable modulus corresponding to the bit count transmitted with each word over the binary code 1 and 2 lines 19 and 18, respectively. If the bit count generated for each word is correct, it will compare with the bit count transmitted by the storage device and this correct bit count permits operation of the printer and the delivery of the next line of numeric data to the printer. However, if the bit counts do not compare, which represents an error of some type, the printer is stopped and a signal is transmitted to the storage device or source of information that such a condition exists and interrupts the flow of further information to the selected printer until the error has been checked and corrected.

*Tubes and control switches*

In each of the drawings of the various control devices, the individual components or units making up that device are indicated merely as a box or block. The detailed circuitry of each such block will be presently described as applied to various typical forms of tubes and diode circuits which are shown diagrammatically in Figs. 6*a* to 24*b*.

Figure 6A:
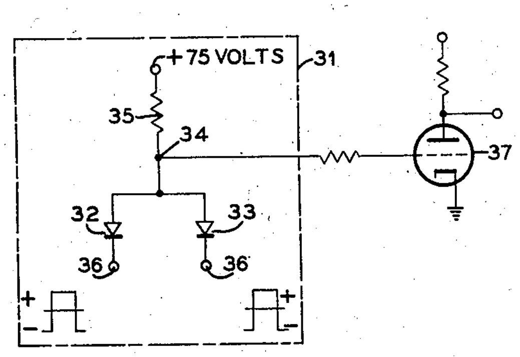
Figure 6B:
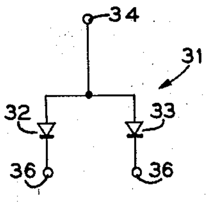

In Fig. 6*a*, for example, there is shown a typical coincidence switch, otherwise known as a logical "and" circuit or diode switch 31 comprising a pair of germanium crystal diodes 32 and 33. A common terminal 34 of the diodes 32 and 33 is connected through a voltage-dropping resistance 35 to a positive 75 volt source (not shown). The diodes 32 and 33 each include an individual input terminal 36, both of which are normally biased negatively so that the common terminal 34 is normally at a negative potential with respect to ground. If coincident positive pulses are applied to both input terminals 36, the potential of the terminal 34 is raised. However, if only one of the input terminals is pulsed positively, the potential of the common terminal 34 is not raised appreciably. A voltage responsive device, such as a suitable electron tube amplifier 37, is controlled by the potential of the terminal 34 to furnish a usable output voltage pulse whenever a coincidence of positive input pulses is detected. For simplicity in the drawings, the portion of the coincidence switch shown in the broken line rectangle 31 in Fig. 6*a* is generally represented as shown in Fig. 6*b*. This representation omits the dropping resistor 35 and the connection to the positive voltage source. While in the diagram only two germanium crystal diodes and input terminals 36 are shown, it is to be understood there are frequently more than two diodes incorporated in the diode switch. With any suitable number, the switch operation is identical when positive coincidence occurs at each input terminal.

Figure 7A:
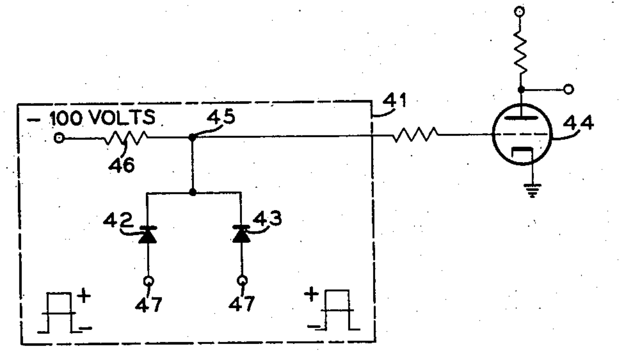
Figure 7B:
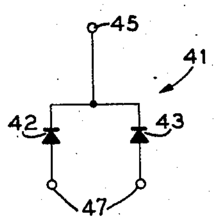

In Fig. 7*a* there is shown a typical mixer, otherwise known as a logical "or" circuit or diode mix 41, comprising a pair of germanium crystal diodes 42 and 43. The diodes which are employed in mixers are shaded and the direction reversed in the present drawings to distinguish them from the diodes which are employed in the switches. A voltage responsive device, represented by an electron tube amplifier 44, is controlled by the potential of a common output terminal 45 of the diodes 42 and 43, which terminal is connected by a suitable resistor 46 to a negative 100 volt source (not shown) to normally maintain a negative bias in the grid of the tube 44. Each diode is connected to an individual terminal 47 which in turn are connected in the electrical circuit. If either one (or both) of the diode input terminals 47 is pulsed positively, the potential of the terminal 45 is raised which permits the tube associated therewith to conduct. For convenience, the portion of the diode mix or "or" circuit shown in the broken line rectangle 41 in Fig. 7*a* is generally represented in the drawings as shown in Fig. 7*b*. This representation omits the resistor 46 and the connection to the negative voltage source. As in the diode switch diagram, it is to be understood the diagram representation of the diode mix 41 may involve more than the two diodes and input terminals 47 and that each additional input terminal 47 will be provided with an additional diode, such as the diodes 42 and 43 of Fig. 7*a* and that the cathode of each of these additional diodes will be connected to the common terminal 45.

Figure 8A:
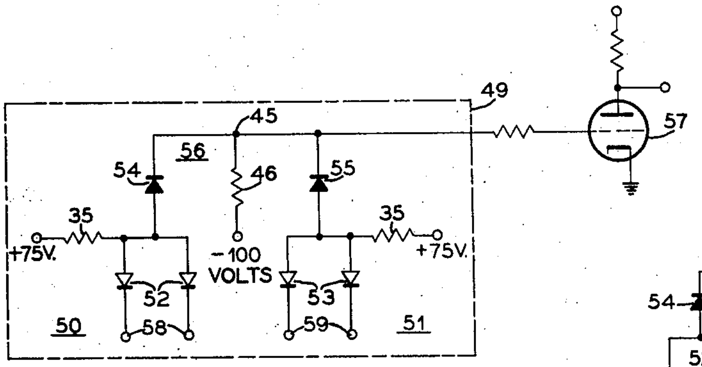
Figure 8B:
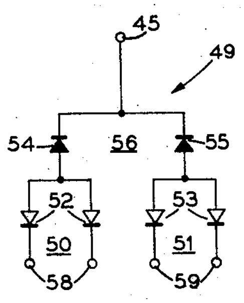

In Fig. 8*a* there is shown a typical circuit arrangement 49 wherein a pair of separate diode switches 50 and 51, respectively, each comprising a pair of germanium crystal diode switches or "and" circuits 52 and 53, respectively, feed through their respective diode mixer diodes 54 and 55 forming part of a diode mix circuit 56 to the voltage responsive device represented by the electronic amplifier 57. A coincidence of positive voltage pulses at input terminals 58, or at input terminals 59 causes the grid voltage of the tube 57 to rise to permit the tube to conduct. Fig. 8*b* illustrates the simplified showing of the diode network as used in the drawings. As in the previous diode arrangements, any number of diodes in both the diode switches or diode mixes may be incorporated in the switching circuit.

Figure 12A:
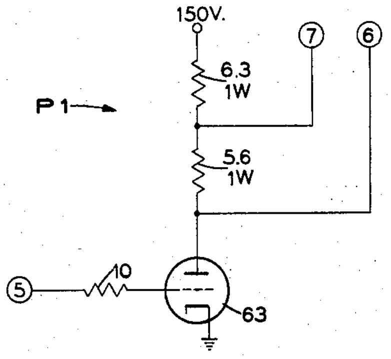
Figure 13A:
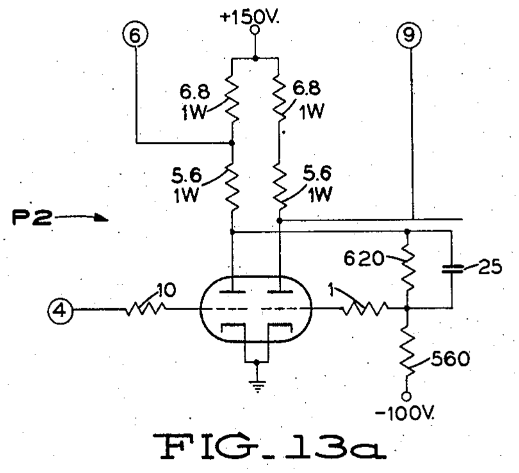
Figure 14A:
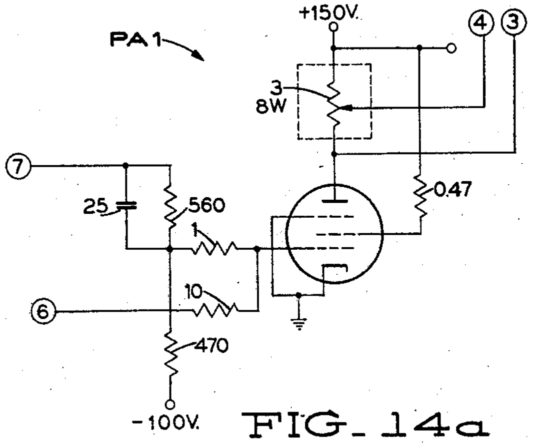
Figure 14B:
Figure 15A:
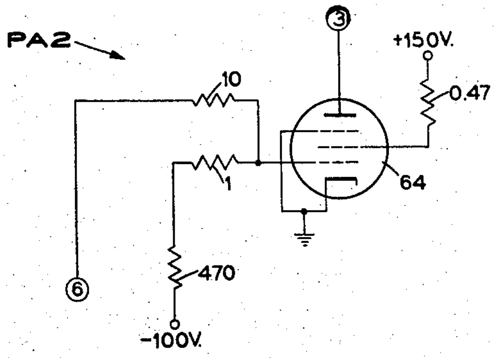
Figure 24A:
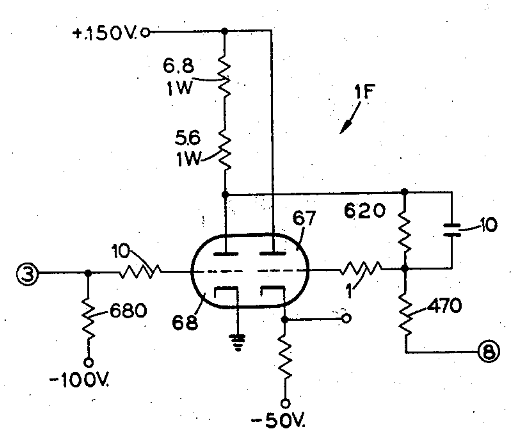

Referring momentarily to Figs. 25*a* to 25*j*, inclusive, which represents the diagram of the control circuit, each of the component blocks or units, comprising a particular tube circuit, is labeled with a letter in combination with a number. By referring to Figs. 9*a* to 24*a*, inclusive, the respective detailed circuitry of any component block may be determined by identifying the letter-number block designation. Each of the particular letter combinations, in the component block, in addition to acting as a reference designation, also denotes the function of the component. Thus, all the units shown in Figs. 9*a* through 11*a*, for example, are cathode followers, and are accordingly labeled with the prefix letters CF; the units shown in Figs. 12*a* and 13*a* are power units or inverters and are accordingly labeled with the prefix letter P; the units shown in Figs. 14*a* and 15*a* are power amplifier units and are accordingly labeled with the prefix letters PA; all the units shown in Figs. 16*a* through 19*a* are trigger units and are accordingly labeled with the prefix letter T; all the units shown in Figs. 20*a* through 23*a* are heated cathode type gas tube units or thyratrons and are accordingly labeled with the prefix letters GT; and the unit shown in Fig. 24*a* is an inverter follower unit and is accordingly labeled with the prefix letters IF.

Before proceeding with a description of the various control circuits or devices of the printer, a brief description of representative ones of the detailed circuit units or components, Figs. 9*a* through 24*a*, utilized in these control circuits will be given. In each of the unit diagrams and other circuit diagrams, the values of the various resistors utilized therein are labeled in thousands (K) of ohms, while the values of the various capacitors are indicated in micro-microfarads. Hereinafter, in this specification wherein a conductor or a circuit terminal or the like is referred to as being shifted positive or negative in potential, this does not necessarily mean that the point, in question, is positive or negative in an absolute sense, but only more positive or more negative, relative to its previous state. This principle also applies to any description wherein positive and negative pulses are mentioned.

Figure 10A:
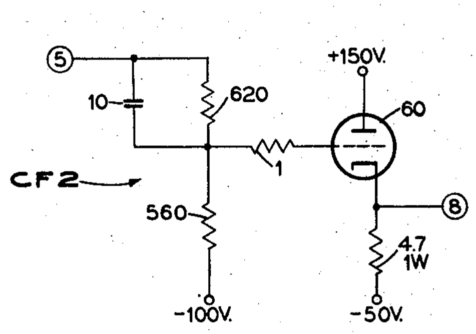
Figure 10B:
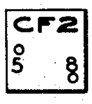

Referring now to Figs. 10*a* and 10*b*, the unit CF2 comprises a triode vacuum tube 60. In actual practice this may be of a dual triode—Type 5965. The grid of the triode is connected through a 1K and a series 560K ohm resistor to a negative 100 volt supply. The cathode of each triode is respectively connected through a 4.7K ohm 1 watt resistor to a negative 50 volt supply and the anode or plate of the triode section is connected to a positive 150 volt supply. The 1K resistor of the triode is also connected, via a 620K resistor, in parallel with a 10 micro-microfarad condenser, to an input terminal 5. The output of the triode is taken from terminal 8 connected to the cathode side of the 4.7K resistor. The input terminal 5 is connected to a switching potential, which is either at a potential of positive 150 volts or positive 50 volts. With positive 150 volts on terminal 5, the associated grid is maintained at such a potential that the tube current is at a maximum and accordingly the cathode terminal 8 is at a maximum positive potential of plus 25 volts. With a positive 50 volts on terminal 5, the associated grid is maintained at such a potential that the tube current is at a minimum and accordingly the cathode terminal 8 is at a minimum negative potential of approximately 18 volts. Thus, a shift of potential on the terminal 5 effects a corresponding in-phase shift of potential of the output terminal 8. This well-known type of tube action is referred to as cathode follower action.

It will be noted that the cathode resistor of the triode is of relatively low value. As a result, the cathode output terminal serves as a low impedance signal source. A low impedance signal source may be "loaded" appreciably without substantially affecting the magnitude of the signals supplied therefrom. This is the main purpose of a cathode follower unit. The capacitor, shunting the 620 input resistor, is to rapidly apply the voltage shift of the input terminal 5 to the grid, so that the resultant shift in potential, of cathode terminal 8 does not appreciably lag the input voltage.

Figure 9A:
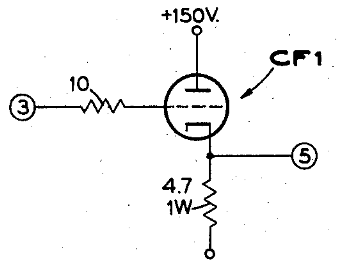
Figure 9B:
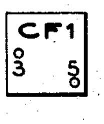
Figure 11A:
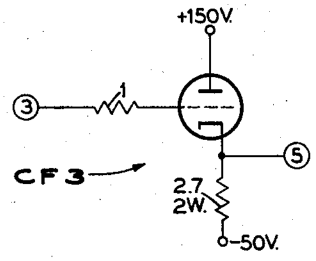
Figure 11B:

The cathode follower units CF1 and CF3, shown in Figs. 9*a*, 9*b* and 11*a*, 11*b*, respectively, function in essentially the same manner as cathode follower unit CF2, although they do not include the 100 volt negative bias on the grid and the magnitude of the switching voltages may differ. The differences in resistor values is to provide proper power for different requirements. In the drawings the blocks shown in Figs. 9*b*, 10*b* and 11*b* are shown for simplification of the wiring diagram and represent the tubes, 9*a*, 10*a* and 11*a*, respectively.

Figure 12B:

Referring now to Figs. 12*a* and 12*b*, an inverter or amplifier unit P1 comprises a triode 63, Type 5965, having its cathode connected to ground. An inverter, as its name implies, is adapted to simply invert a signal. Thus, if the grid terminal 5 shifts positive, the triode conducts more heavily and the associated plate output terminals 6 and tap 7 shift negative. Similarly, if the grid terminal 5 shifts negative, the terminals 6 and 7 shift positive.

Figure 13B:
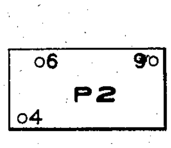

In Figs. 13*a* and 13*b* an amplifier or double inverter P2 is provided. In this instance a dual triode, Type 5965, is arranged so that the grid on the left-hand triode is connected to a variable voltage source at the terminal 4 and the grid on the right-hand triode is biased positive by the left-hand plate voltage. Thus with the right side conducting the plate voltage at the No. 9 terminal is low while the voltage at the terminal 6 connected to the left-hand plate is high. When a positive potential is received at the left-hand grid over the terminal 4 that side of the tube conducts, which by dropping its plate voltage cuts off the right-hand side of the tube. Upon cutoff, the voltage at the terminal 9 rises while the voltage at the terminal 6 on the conducting side of the dual triode drops. Thus, it can be seen that the terminal 9 on the right-hand triode directly follows the potential of the left-hand grid voltage, while the voltage at the terminal 6 is inverted.

Power amplifiers or units effect 180° signal inversion of an applied signal so that they may also be classified as inverters. However, they differ from the inverter units, which are primarily voltage devices, in that they can supply considerable power to the circuits to which they are connected. In Figs. 14*a* and 14*b*, a unit PA1 comprises a pentode tube, Type 6AQ5, wherein the application of a positive signal to the grid input terminals 6 or 7 through the related resistors results in an inverted output signal on the plate terminal 3 and the variable tap 4.

Figure 15B:
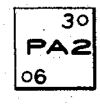

Figs. 15*a* and 15*b* represent a PA2 power amplifier unit comprising a pentode, Type 6AQ5, which is similar to power amplifier PA1, with the exception that plate terminal 3 is connected to a different source of positive potential than the positive 150 volt source applied to the screen 64 at the terminal 5. In all other respects the amplifier functions in the same manner when a positive pulse is applied to the grid through its terminal 6.

Figure 16A:
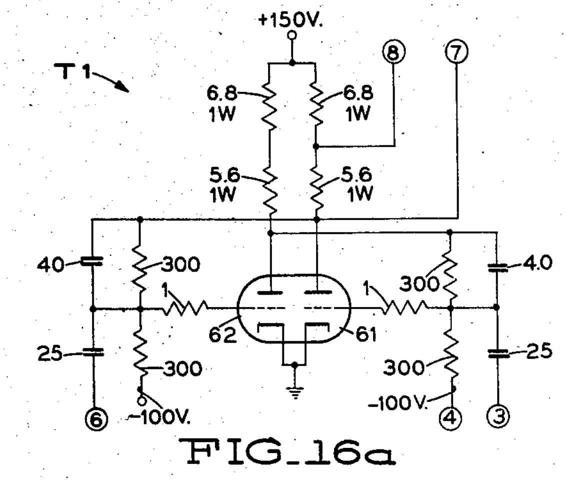
Figure 16B:
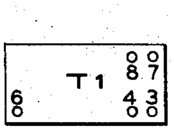

Referring now to Figs. 16*a* and 16*b*, a trigger unit T1 is shown which is conventional in construction and comprises two retroactively coupled triode sections 61 and 62, respectively, of a Type 5965 vacuum tube. By proper selection of circuit components, the unit T1 is so arranged that only one of the triode sections is conductive, at a time, in accordance with well-known trigger operation. With the right-hand triode 61 conducting, the trigger is defined as being in an Off position. With the trigger Off, the plate terminal 8 and tap terminal 7 of the right-hand triode 61 are at some potential below the supply positive potential of 150 volts due to the current being drawn through the right-hand triode. As a result, voltage sensitive circuits which may be connected to terminals 8 and 7 are accordingly controlled. With the trigger Off, as assumed, the plate of the nonconducting left-hand triode 62 is at the positive supply potential of 150 volts.

If a negative going waveform or pulse is applied to input terminal 3, the grid of the right-hand triode 61 starts to shift negative. As a result, this triode is rendered less conductive. The resultant positive shifting of its plate is applied, through a 40 micro-microfarad condenser, to the grid of the left-hand triode 62 and renders this triode conductive. The resultant negative shifting of the plate of the left-hand triode is then applied, through its associated 40 micro-microfarad condenser, to the grid of the right-hand triode 61 and renders it less conductive. With the right-hand triode less conductive, the left-hand triode is rendered more conductive. This retroactive action between the left and right-hand triodes continues until the left-hand triode 62 is fully conductive and the right-hand triode 61 is nonconductive. This retroactive action is very rapid, so that in effect, the application of the negative shift to terminal 3 almost instantaneously initiates the "flipping" of conduction from the right to the left-hand triode. With the left-hand triode 62 conducting, the trigger is defined as being in an On condition. With the trigger On, the plate of the left-hand triode 62 is at a low potential, while the plate terminals 8 and 7 of the right-hand triode are at a positive 150 volts. With the shift of potential of terminals 8 and 7, associated circuits are accordingly controlled.

The trigger T1 is flipped from its On to its Off position by applying a negative voltage shift to grid input terminal 6 of the left-hand triode. The trigger unit is insensitive to positive voltage shifts applied to the terminals 6 and 3. Thus, if the trigger is On, it can not be shifted Off by positively pulsing the grid of the right-hand or nonconductive triode 61, but only by negatively pulsing the grid of the left-hand or conductive triode 62. This selective response to only negative pulses is effected by proper choice of bias potential.

Figure 17A:
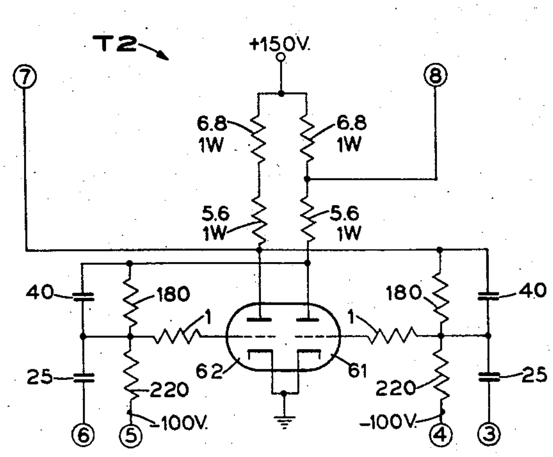
Figure 17B:
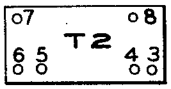

The trigger unit T2, as shown in Figs. 17*a* and 17*b*, functions in essentially the same manner as trigger unit T1, except terminal 7 is connected and responds to the plate of the left-hand triode 62 rather than to the plate of the right-hand triode 61.

Figure 18A:
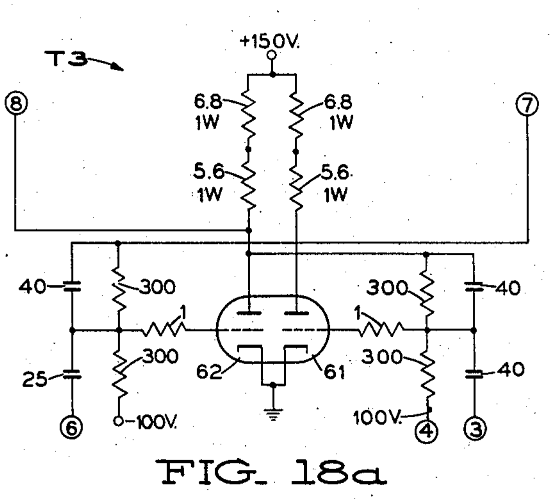
Figure 18B:
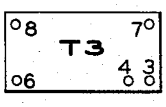

The trigger unit T3, shown in Figs. 18*a* and 18*b* is generally similar to the other trigger units, except that the terminal 8 has been shifted to respond to the plate voltage of the left-hand triode 62, while the terminal 7 responds to the plate voltage of the right-hand triode 61.

Figures 19A, 19B:
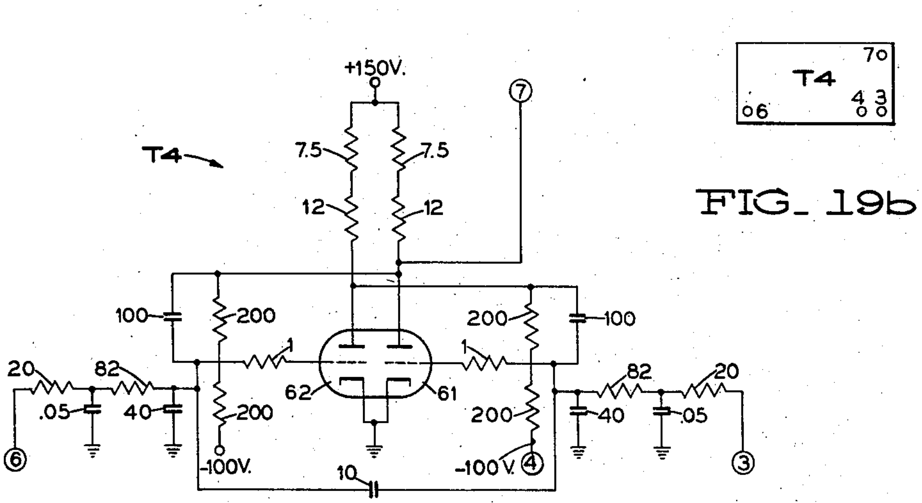

The trigger T4, shown in Figs. 19*a* and 19*b*, is of Type 5844, however, its operation is similar to the previously discussed triggers. This trigger is designed for control by cam contacts in the printer and is desensitized inasmuch as it is always operated with independent inputs. Triggering is accomplished by applying a positive 40 volts to the trigger grids through 20K and 82K coupling resistors. A .05 mfd. bypass capacitor is placed at each of the inputs of this trigger between the 20K and 82K resistors. With the external bypass capacitor between pins 3 and 6 and ground, this trigger will not recognize a pulse of less than approximately two milliseconds duration. However, once the triggering action starts, triggering is very rapid. The time constant of the resistor-condenser combination consisting of a 20K resistor and .05 mfd. capacitor determines the minimum pulse duration which will be recognized by the trigger. The reason for this bypass is to prevent operation of the triggers by transient voltages. Also, a 10 mmfd. capacitor connected across the grids between the 82K and 1K resistors eliminates any tendency for trigger operation by transient conditions which may develop in the system.

In order to provide a reset for all triggers, the 4 terminal, with one exception to be described later, is momentarily connected to a positive potential.

Hereinafter in this specification wherein a trigger is mentioned, the trigger is defined as being Off if the right side triode 61 is conductive, or On if the left side triode 62 is conductive.

Figure 20A:
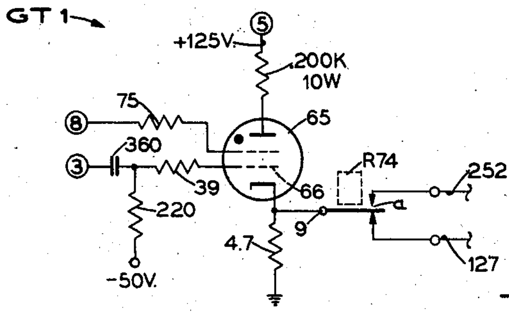
Figure 20B:
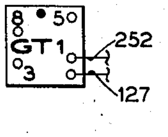
Figure 21A:
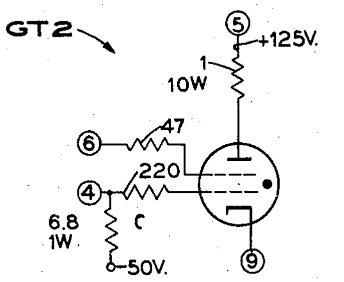
Figure 21B:
Figure 22A:
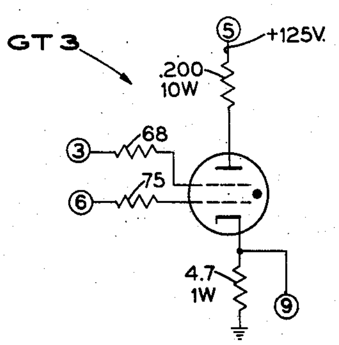
Figure 22B:
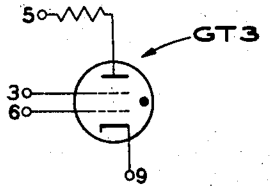
Figure 23A:
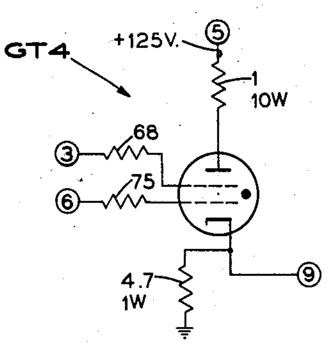
Figure 23B:

Referring now to Figs. 20*a* and 20*b*, a heated cathode type tube unit or thyratron GT1 comprises a Type 2D21 tetrode tube, the plate of which is connected in series with a .200K 10 watt dropping voltage resistor to a positive 125 volt supply. The cathode is connected in series with a 4.7K resistor to ground and the output treminal 9 is connected between the cathode and resistor. This gas filled tube includes a pair of grids 65 and 66, respectively. The grid 65 is connected in series with a 75K resistor to the terminal 8 and the grid 66 is in series with a 39K and a 360 mmfd. capacitor to the terminal 3. This latter grid is further biased to negative 50 volt supply through a 220K resistor which is connected between the capacitor and grid resister. Thus, under normal operating conditions the grid 66 is biased negative and the tube is cut off or nonconducting. If both grids are biased positive, the tube fires and conducts through the terminal 9 for reasons to be hereinafter explained, and continues to conduct in the standard manner until such time as the positive 125 volt supply is interrupted. For simplicity in the main wiring diagram, each GT1 block also includes a normally closed and a normally open contact and a relay operated transfer operating point therefor which is utilized for printer A or printer B operation for reasons to be later described.

Heated cathode gas tube units GT2, GT3 and GT4 shown in Figs. 21*a*, 21*b*, 22*a*, 22*b*, 23*a* and 23*b* are the same type of tubes, however, the resistor values have been changed to meet operating conditions and the capacitor in the grid circuit has been eliminated.

Figure 24B:
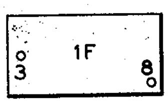

Figs. 24*a* and 24*b* disclose an inverter follower IF and comprises a dual triode tube Type 5965. In this instance, the right-hand side 67 of the triode normally conducts which maintains a positive output or potential at the terminal 8. This conduction being assured by the potential applied to the grid from the left-hand side 68 of the plate circuit through the divider. The left-hand side 68 of the triode is normally nonconducting, however, when the left-hand grid is biased positive this side of the tube conducts and in so doing drops the grid potential on the right-hand side 67 to cut off conduction at this point. Upon cutoff, the 8 terminal following the negative 50 volt potential at the cathode will be reduced in value. Thus, with a positive pulse applied to the left-hand grid, a corresponding negative pulse is transmitted from the terminal 8.

In the foregoing description of the tubes, it is to be understood the resistors and capacitors may be varied within limits or even different type tube circuits employed. These figures are presented as a means for accomplishing the desired result.

*Binary to decimal translator*

Figure 2:
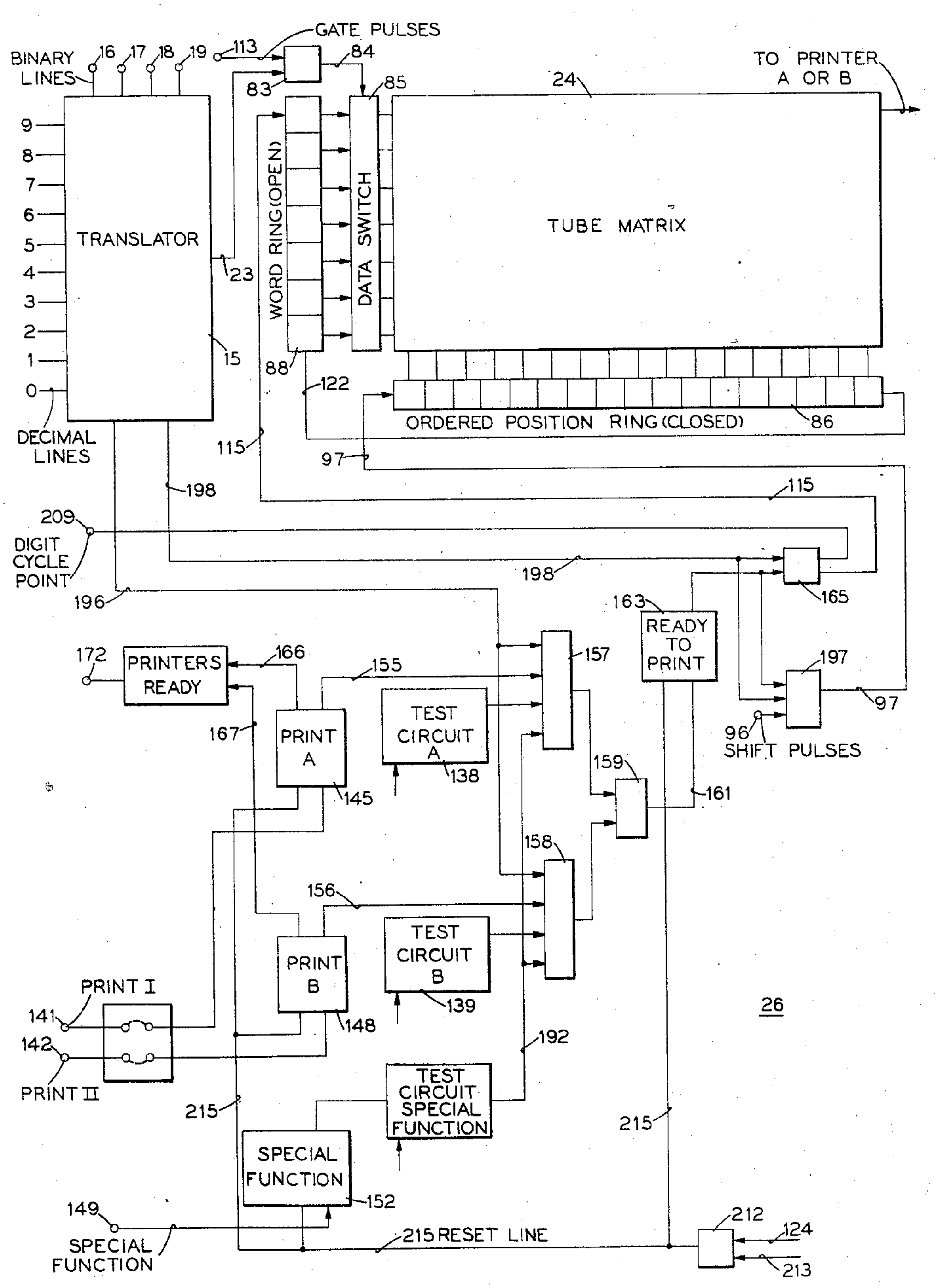
Fig. 2 is a block diagram of the control section for the printers in more detail.

Referring now to Figs. 2, 25*a* and 25*c*, there is shown a data receiving and processing arrangement or circuitry for serially receiving a group of words in binary 1—2—4—8 code. Each word comprises a plurality of ordered positions, 16 in the embodiment disclosed, each having numeric values 9 through 0, and a group of seven words when combined form a line of numeric data or information to be printed, Figs. 3*a* and 3*b*. The complete line of data of seven words is serially transmitted from a suitable storage source in a calculator or the like (not shown) to the binary to decimal translator 15 over the binary code 8—4—2—1 lines 16, 17, 18 and 19, respectively. Each of the binary lines includes a CF1 cathode follower 70, Fig. 25*c*, whose output, along lines 16*a*, 17*a*, 18*a* and 19, respectively, provides an increase in positive potential whenever the associated binary line is rendered positive. Any positive output from the cathode followers is impressed on a plurality of parallel decimal value lines 9 through 0 through appropriate germanium crystal diodes forming a part of diode switches or "and" circuits 31. The decimal 9 through 0 lines represent the numeric or digit value of each order. As shown, the output side of the cathode follower CF1 in binary line 16*a* is connected to the 9 and 8 decimal lines; the output of CF1 in the binary line 17*a* is connected to the 7, 6, 5 and 4 decimal lines; the output of CF1 in the binary line 18*a* is connected to the 7, 6, 3 and 2 decimal lines; and the output of CF1 in the binary line 19*a* is connected to the decimal 9, 7, 5, 3 and 1 lines.

Connected in parallel with each cathode follower CF1 line is a second line 16*b*, 17*b*, 18*b* and 19*b*, respectively, connected to the decimal 9 through 0 lines in a suitable manner and each line includes a P1 amplifier tube 71 and a CF2 cathode follower 72 connected in series. The last-mentioned lines are rendered positive by the P1 tube whenever the associated binary line is negative and may, for the purpose of this description, be called the No. 8, No. 4, No. 2, and No. 1 lines, respectively. These lines are connected to the decimal 9 through 0 lines in the following manner. Line 16*b* is connected to the decimal 1 and 0 lines; line 17*b* is connected to the decimal 3, 2, 1 and 0 lines; line 18*b* is connected to the decimal 5, 4, 1 and 0 lines; and line 19*b* is connected to the 8, 6, 4, 2 and 0 decimal lines. These lines extending from the P1 power tubes provide a continuous positive potential to the diodes in their respective lines whenever the potential at their respective binary lines is negative.

In series with the 9 through 0 decimal lines are the pair of printer A and B emitters 21 and 22, respectively, Fig. 25*a*. These emitters are mechanically driven (not shown) by the printer in synchronism with the machine digit cycle points. Thus, by referring to Fig. 30, the emitters are moved from the 9 through 0 digit cycle points once for every machine cycle of 360°, and in this embodiment this takes place from 0° to 150° of the machine cycle.

As the emitter 21, Fig. 25*a*, moves from 9 to 8 through 0 consecutively, a cam operated contact C131A timed with the machine index provides timed positive pulses to each line consecutively. The B printer emitter 22 represented by the box is identical in operation as the A emitter 21 and involves the same elements.

The decimal lines 9 through 0, extending from both emitters are selectively connected to the operating points *a* through *j* of a relay R71. Under normal conditions the 9 through 0 lines from the emitter 21 connect with the operating points of relay R71 at the normally closed contacts R71*a* to R71*j*, inclusive. Extending in series with each operating point of these switches is a normally Off T4 trigger 73, the output terminal 7 of each being connected by a conductor 74 to the grid of a related CF2 cathode follower 75 whose output in turn leads to a diode 32, Fig. 25*c*, forming a part of the diode switch unit 31 for each decimal line 9 through 0. Thus, it can be seen that with the emitter 21, Fig. 25*a*, located at any digit cycle point, when the circuit is completed by the cam contact C131A the related trigger T4 is turned On by the emitter pulse of 40 volts pulsing the left-hand grid at the 6 terminal and the opposite side of the trigger goes positive. This drives the related cathode follower 75 to apply a positive voltage to the related diode 32 in the switch and conditions that line for the reception and transmission of a binary line pulse when received from the external storage source. At the time any of the above cathode followers CF2 go positive, this positive pulse is also supplied to a diode mix or "or" circuit 76 through a plurality of lines 77 for reasons to be hereinafter explained.

As mentioned, when the emitter reaches the beginning of any cycle point, the appropriate trigger T4 is turned On. After the emitter moves from this cycle point and before it reaches the next digit cycle point, a second timed pulse supplied by a cam contact C129A is transmitted through the normally closed point *e* of a relay R102 via a conductor 78 to the 3 terminal of the On trigger to turn the same Off. Thus this line is no longer positive and no further data will be accepted. As the emitter moves to the next cycle point position the next trigger T4 is turned On and the same sequence of events occur. All operations from 9 through 0 occur consecutively.

The output or opposite side of the 9 through 0 decimal lines are each supplied with a P1 amplifier 79, Fig. 25*c*, the output of each being connected to the common line 23. This line carries a PA1 power amplifier 81 connected to the grid of a CF2 cathode follower 82 to provide a positive pulse at a diode switch 83, Fig. 25*e*, when positive pulses are applied to any of the amplifiers 79 in the decimal lines 9 through 0, for reasons to be hereinafter described.

From the foregoing, it can be seen only the decimal line the emitter is contacting is rendered partially positive, and it is thus the only line capable of transmitting or gating a pulse to the line 23 when the proper pulse or combination of pulses are delivered from the external source or storage device.

With the above arrangement, assuming the emitter is at the decimal 9 line, it requires simultaneous positive pulses over the 8 and 1 binary code lines, corresponding to a decimal 9 to cause the entire 9 line to go positive at its diode switch 31 and operate its respective amplifier 79 to provide a negative pulse at the line 23. Since the binary values are delivered in parallel for each digit but serially for successive digits over various combinations of the 4 binary lines, all pulses, except those arriving simultaneously on the binary 8 and 1 lines 16 and 19, respectively, do not pass beyond the translator. With the emitter at the next or 8 digit cycle position only those pulses arriving singly on the binary 8 line permit the decimal 8 line to rise in potential beyond its diode switch 31.

It is to be noted that in order to avoid the interception or reading of a binary 8 and 1, which is a decimal 9, as a decimal 8, the amplifier 71 in the absence of a positive pulse in the binary 1 line **19*b* maintains this line and thus a portion of the decimal 8 diode switch positive to permit the decimal 8 line to go positive whenever a single pulse is received on the binary 8 line. However, the amplifier 71 in the line 19*b* will drive the 8 line negative when a simultaneous binary 8 and 1 pulse is received. This rejects both pulses at the decimal 8 line. The decimal 8 line will stay down until the positive value drops on the binary 1 line 19**, after which the absence of a binary 1 pulse automatically raises the potential at the diode in the decimal 8 line. The same procedure is followed for all of the other digit cycle points involving the use of more than one binary line for conducting information. Decimal lines 9 and 7 are the only two which are not provided with a negative blocking pulse.

At 0 digit cycle point time, the decimal 0 line is rendered positive in the absence of a binary 1, 2, 4 or 8 pulse by means of the four power amplifiers 71, thus a pulse representing a zero is applied to the line 23.

*Word chart*

Referring now to Figs. 3*a* and 3*b*, there is diagrammatically shown a complete line of numeric data which is stored in a storage device of a calculator or the like. In this instance, the line includes 119 ordered positions which are to be transmitted to one of the printing units A or B to print the identical numeric values, with the exceptions to be described later, in the identical ordered positions.

For convenience each line is shown divided into seven words, each having sixteen ordered positions plus an order position at the beginning of each word for the bit count of its respective word and includes a space between each word to provide seventeen numeric spaces plus a blank. This is more clearly shown at the top of Figs. 3*a* and 3*b* where each space of each word is numbered 1 through 17. It will be noted the first position or space of each word is labeled Bit Count, the next two are labeled Index and the fourth is labeled Sign, which will be described later. With the bit count spacing removed, this leaves a total of 16 different ordered positions for each word or a total of 112 positions.

The second row of information represents numeric values 0 through 9 for each position which are arbitrarily established to more clearly describe the invention. At the beginning of each word there is a pair of numbers enclosed in a box. Each lower number represents the actual bit count remainder for the numeric values of that word based on a 4 modulus. The bit count is based on the following binary code:

| Decimal Digit | Binary Equivalent | Number of Bits |
|---|---|---|
| 0 | 0000 | 0 |
| 1 | 0001 | 1 |
| 2 | 0010 | 1 |
| 3 | 0011 | 2 |
| 4 | 0100 | 1 |
| 5 | 0101 | 2 |
| 6 | 0110 | 2 |
| 7 | 0111 | 3 |
| 8 | 1000 | 1 |
| 9 | 1001 | 2 |

Thus in the words 1 to 7 illustrated, the following total bit count would be involved:

| Word | Total Binary Bit Count | Binary Bit Count Remainder Modulo 4 | Bit Count Remainder Modulo 4 | Bit Count Complement |
|---|---|---|---|---|
| 1 | 25 | 0001 | 1 | 2 |
| 2 | 20 | 0000 | 0 | 3 |
| 3 | 26 | 0010 | 2 | 1 |
| 4 | 23 | 0011 | 3 | 0 |
| 5 | 25 | 0001 | 1 | 2 |
| 6 | 26 | 0010 | 2 | 1 |
| 7 | 25 | 0001 | 1 | 2 |

Taking the total bit count of the numeric values of each word and dividing on a 4 modulus dropping all values divisible by 4 and retaining the remainder, it can be seen that the remaining bit count in each of the words 1 through 7 is 1, 0, 2, 3, 1, 2, 1, respectively. Hereafter, when bit count is referred to, it is meant the remainder after the removal of all bit counts divisible by 4. However, in this particular example and for the use to which this improved printer is intended, it has been found desirable to transmit the 3's complement of the bit count from the storage device. Thus, the 3's complement of the above bit count is 2, 3, 1, 0, 2, 1, 2, respectively and these values are located directly above the actual bit count values. The bit count complements are the actual values transmitted for the bit count check to be later described, however, it is to be understood the actual bit count could be used, if desired.

While the numeric values of each word are actually stored in a suitable storage device in binary 1—2—4—8 code in any suitable manner and are serially delivered in the form of pulses along the binary 1—2—4—8 lines to the translator 15, the machine digit cycle point time of the printer determines the earliest the data can be delivered to the translator. At the proper machine signal, the entire group of words or entire line of numeric data leaves the storage source as a series of pulses or combination of pulses parallel by bit, serial by digit as shown below the numeric values. These pulses represent the binary value for the numeric value directly above.

Assuming the printer is ready to receive the numeric data, the emitter 21, Fig. 25*a*, will be on the decimal 9 line and as all the pulses of the entire line of data pass to the translator, Fig. 25*c*, only those involving simultaneous pulses on the binary 8 and 1 lines, representing a decimal 9, raise the decimal 9 line to operate its related amplifier 79 to provide a negative pulse on the single line 23 and a resultant positive pulse at the diode switch 83, Fig. 25*e*. As shown in Figs. 3*a* and 3*b*, the binary 9's at 9 cycle point time are separated in the form of positive pulses in definite timed relation corresponding to the ordered position of the numeric value. Since these pulses are not uniformly spaced, the line 23, Fig. 25*c*, when responding to the 9 position, is correspondingly varied at identical time intervals. The output from the line 23 conditions the diode switch 83, Fig. 25*e*, in a predetermined manner to feed a series of positive pulses over a conductor 84 to a plurality of parallel diode word switches 85 in the matrix 24 to be described later.

At 8 digit cycle point time, the decimal 8 line is ready and a signal is transmitted to the storage device and the entire line of data or group of words is again delivered to the translator 15, however, in this instance only the binary 8 pulses are transmitted over the line 23. The same operation occurs at each machine digit cycle point to 0 with pulse blocking occurring where necessary, as previously described.

It can be seen that at 3, 2 and 1 digit cycle point time the bit count, if any, for each word is transmitted over the binary 2–1 lines and the line 23 along with the numeric data.

Thus, to read and process an entire line of numeric data, the entire line of data must be delivered to the translator ten times, once for each machine digit cycle point. Likewise, it is to be observed that using the numeric data given in the example, Figs. 3*a* and 3*b*, the line 23 is serially pulsed at each decimal cycle point in a manner which starts at the left-hand portion of the diagram and following to the right serially from the 9 through 0 digit cycle point positions.

Figs. 4*a* and 4*b* illustrate the time feature of a machine digit cycle point with respect to the time required to supply the entire line of numeric data from the storage device. The 9 machine cycle point is shown and this represents a time interval of 8.9 milliseconds of active time at the cycle point or a total of 16.6 milliseconds between machine cycle digit points. The time required to transmit the entire line of numeric data to the translator is 1.0008 milliseconds. Thus it can be seen that as far as sending data from the storage device precise timing is not necessary because the printer is capable of receiving information at any time during 8.9 millisecond interval. However, the pulse should be received early in the cycle point in order to allow time for an inductive use in the print magnets.

Also shown on this diagram are three groups of pulses which are 4 micro-seconds in duration. The second group represents shift pulses which are used to step the matrix 24 in a predetermined manner. These shift pulses are also divided into groups of seventeen pulses each group separated by a space and are equivalent to the pulses representing the numeric data as shown in Figs. 3*a* and 3*b*, one pulse for each ordered position in the line. Directly above the shift pulses is a line of gate pulses which are 180° out of phase. These gate pulses are supplied to the diode switch 83, Fig. 25*e*, continuously during the entire machine operation and permit the positive pulsing of the word switches 85 in the matrix 24 whenever the line 23 is pulsed by data leaving the translator 15, Fig. 25*c*. Below the shift pulses and in the ordered positions as shown in Figs. 3*a* and 3*b*, a single pulse is represented to show when the decimal 9 line is rendered positive by the binary 8–1 lines to pulse the output line 23.

The upper portion of Fig. 5 diagrammatically shows the machine cycle points 9 through 0 along with the time intervals between points and a relative representation of the time intervals between points and a relative representation of the time required to receive the numeric information from the storage source. From this diagram it can readily be seen that the numeric information is supplied serially to the translator once for each machine cycle point. After the data has been delivered at any digit cycle point, the calculator has approximately 15 milliseconds before the next cycle point, therefore, it is free to continue calculator operation during this interval, plus the entire time the printing operation is taking place. The printer and calculator are interlocked so that calculations are discontinued during transfer of data or values to the printer.

*Matrix*

Referring to Figs. 2, 25*e*, 25*f*, 25*g* and 25*h*, the matrix 24 includes a plurality of heated cathode type gas filled tubes or print thyratrons GT1, GT3 and GT4, which are arranged in seven horizontal rows and seventeen vertical columns, a 17 position closed or fast ring 86, Figs. 25*f* and 25*h*, of sixteen T2 and one T3 triggers 87 for driving the vertical columns, an open or slow 7 position ring 88, Fig. 25*e*, of six T1 and one T3 triggers 89 for driving the horizontal rows and the combination word switch 85 connected to each row. Only six of the vertical columns and their related triggers in the closed vertical ring 86 are shown because the intermediate vertical columns are identical to vertical columns 2 to 16, inclusive.

Each horizontal row, Figs. 25*e* and 25*g*, represents a word 1 through 7 in the example given and each vertical column represents an ordered position 1 through 17 in each word at the points of intersection. Thus all 112 ordered positions of the entire line of data are represented, plus the 7 bit count positions. With this arrangement, there is provided one gas tube for each ordered position in the line to be printed. To provide the proper bit count information for each word, each horizontal row includes a pair of GT4 heated cathode type gas filled tubes 91 and 92, respectively, which are arranged in a vertical column, Figs. 25*g* and 25*h*. The gas tubes 91 are fired for a digit 1 or 1 bit count, the tubes 92 for a digit 2 or 2 bit count, and both are fired for a digit 3 or 3 bit count.

The remaining gas tubes, except for the first column which are GT3 tubes, are GT1 tubes and all have their plates connected to a positive 125 volt source by a conductor 93 under the control of master circuit breakers or cams MCA or MCB, Fig. 25*e*, operated in timed relation to the machine digit cycle points. The plates for the 1 bit GT4 tubes 91 are under control of cam contacts C43A and C42A or similar contacts in the B unit, Fig. 25*g*, through a conductor 94 and the plates for the 2 bit GT4 tubes 92 are under control of cam contacts C41A and C40A through a conductor 95 or similar contacts in the B unit. With printer A operating, the above A cam contacts provide the plate potential and cut off for all gas tubes in the tube matrix through the normally closed transfer contacts R222*c*, Fig. 25*e*, R208*c* and R208*d*, Fig. 25*g*, respectively. Under printer B operation, a similar unit 90 provides the cam control through the normally open points of the last-named transferred contacts.

In order to supply the positive drive to the control grids of the print magnet operating gas tubes, the 17 position closed drive ring 86, lower portion Figs. 25*f* and 25*h*, is driven by the previously-mentioned shift pulses supplied to a terminal 96, Fig. 25*d*, from the external source along a shift pulse line 97 in definite timed relation under the control of suitable control means to be later described.

When turned On, the negative output of each trigger in the closed vertical ring 86, Figs. 25*f* and 25*h*, except the first two, is fed through a related PA1 power amplifier tube 98 in a line 99 directly to the control grid of each gas tube in its related column. The reset position for the first or bit count trigger T2–BC, Fig. 25*f*, in the closed ring is On while all of the other triggers are reset Off. During normal operation, the bit count for each word is the first data received, therefore, the first trigger T2–BC must be On ready to receive the bit count data. The negative output of this trigger at the 7 terminal is fed over a line 100 through a PA1 power amplifier tube 101 and gating device 102 to a plurality of parallel CF3 cathode followers 103 whose outputs lead over a conductor 104 to one of the control grids of each of the bit count heated cathode gas tubes GT4, Figs. 25*g* and 25*h*. The negative output at the 7 terminal of the second trigger T2–1 is fed over a line 105 through a PA1 power amplifier 106 and a pair of CF3 cathode followers 107 to one side of a diode switch 108. Thus the application of a positive pulse to the first column of tubes is dependent upon both the trigger T2–1 being On and a predetermined condition in the initial timing means transmitted over a conductor 109 in a manner to be later described.

The drive for the seven horizontal rows of gas tubes includes the open ring 88, Fig. 25*e*, with the seven triggers T1–1 through T3–7, which when turned On, feed through related CF2 cathode followers 110 to provide a positive level to its respective word line 1–7 and provide a negative level when the related trigger is turned Off. The output of each cathode follower 110 on each word line is in series with a P2 double inverter amplifier 111 and three cathode followers 112, the output of the latter being tied to the second or shield grid of the gas tubes arranged in the related word row. In addition, each word line conditions the shield grid of the 1 and 2 bit count gas tubes 91 and 92 for that word, Figs. 25*g* and 25*h*.

Between the cathode follower 110 and amplifier 111, Fig. 25*e*, of each line is a diode 32 which cooperates with the previously-mentioned diodes to complete the word switch 85 for each word line. Thus, when any two diodes in a line are positive due to one of the triggers being turned On and a positive pulse coming from the diode switch 83, a positive bias is applied to all the gas tube shield grids in that row.

The means for providing the positive pulses to the word switches includes the previously-mentioned diode switch 83, Fig. 25*e*, which has one terminal connected to the single line 23 coming from the translator 15, Fig. 25*c*, and another terminal 113, Fig. 25*e*, connected to the source of previously-mentioned gate pulses shown in Fig. 4. As mentioned, these gate pulses are inverted shift pulses of 4 microsecond duration and are continuously supplied to the diode switch 83 during the entire operation of the printer. Thus with continuous gate pulses applied to one portion of the diode switch 83 whenever a pulse is transmitted from the translator along the line 23, the combination applies a pulse to a CF1 cathode follower 114 whose output provides a positive pulse along the line 84 to the word switches 85 to condition one diode of each word line.

In operation of the matrix, the word ring 88, Fig. 25*e*, is normally reset with all triggers Off and the vertical drive ring 86, Figs. 25*f* and 25*h*, is reset with all triggers Off, except the first trigger T2–BC which is reset On. Upon the application of a negative control pulse along a conductor 115 which is dependent upon the proper operating conditions to be later explained, the slow ring trigger T1–1 is turned On and this provides a positive level to the related diode 32 in word line 1 at the first word diode switch, while the remaining word lines remain negative. At a pulse after the word trigger T1–1 is turned On, the first shift pulse on the shift pulse line 97 is gated to the vertical ring 86, Fig. 25*f*, to shift the normally On first trigger T2–BC to its Off position at its 6 terminal. This shifting to Off position provides a negative pulse to terminal 3 of trigger T2–1 through a conductor 116 to turn the same On and such action feeds a negative level to its related power amplifier 106 to supply a positive pulse to the diode switch 108 in the first column. It will be assumed that the other portion of this switch has also been rendered positive along the line 109. Thus, a positive pulse is applied to all of the control grids in the first column of gas tubes GT3, Fig. 25*e*, and under the conditions specified, the first thyratron in row 1 is the only one capable of firing if a pulse leaving the translator 15 is applied to the diodes of the word switch 85.

As the next shift pulse is applied to the shift pulse line 97, the trigger T2–1, Fig. 25*f*, is turned Off at the 6 terminal and in so doing feeds a negative pulse from its 3 terminal to the 3 terminal of trigger T2–2, Fig. 25*h*, to turn the same On. This action acts to apply a positive potential to the control grids of the gas tubes GT1 in the second vertical column, Fig. 25*g*. Of course, as this occurs, the potential on the first column of control grids is dropped and they are incapable of operation or response to a pulse arriving on the word lines. As each 4 microsecond shift pulse is applied to the vertical ring 86, Figs. 25*f* and 25*h*, it will turn the particular trigger which is On to its Off position and such action in turn turns the next succeeding trigger On in a stepping manner. After the seventeenth shift pulse is applied to the vertical drive ring 86 to turn the trigger T3–16 Off, the negative going output from its related power amplifier PA1 is conducted by means of a line 117 to the 3 terminal of the bit count trigger T1–BC, Fig. 25*f*, to turn the same to its normally On position. This completes the loop.

As the bit count trigger goes negative at its output 7 terminal, the power amplifier 101 associated therewith applies a positive potential through the cathode followers 103 to the control grids of the bit count gas tubes 91 and 92, Figs. 25*g* and 25*h*, in the vertical column through the conductor 104. At the same time a CF2 cathode follower 118, Fig. 25*f*, in series with the same power amplifier 101 applies a positive potential through a conductor 119 to the grid of a second PA1 power amplifier 121 whose negative output, by means of a parallel conductor 122, is connected to the 6 terminals of the word triggers, Fig. 25*e*, to turn the first word trigger T1–1 to its normally Off position.

Upon shifting of the trigger T1–1 to its Off position, a negative pulse through an interconnected line 123 triggers the second row word trigger T1–2 to its On position to render the second row positive upon the reception of a positive pulse through the second word diode switch 85. When the second row is rendered positive, the vertical drive ring 86, Figs. 25*f* and 25*g*, after a 4 microsecond delay, steps along in the same manner as previously described, in that the next group of seventeen shift pulses will move the triggers from the bit count's trigger T2–BC normally On position back to the point where it is turned On again.

At the end of the second complete sweep of the vertical ring, the second row word trigger T1–2, Fig. 25*e*, is turned Off in a like manner and such action will turn On the third row trigger T1–3 to repeat the same process.

Thus it can be seen that in the matrix disclosed when any row trigger T1–1 through T3–7 is On, it stays in this On position until the vertical drive ring 86, Figs. 25*f* and 25*h*, has completed a complete loop, which represents seventeen shift pulses of 4 micro-seconds up and 4 micro-seconds down and that each pulse represents an ordered position in the word.

At the end of the seventeenth pulse in the seventh word, with the emitter 21, Fig. 25*a*, in its 9 digit cycle point position, the complete scan of numeric values in the storage device has been completed and all 9's have been separated from each word and the corresponding gas tubes in the identical ordered positions for each word have been fired. As the seventh word trigger T3–7, Fig. 25*e*, is turned Off, a positive potential is applied to a line 124 which in turn charges a condenser 125, Fig. 25*d*, to pulse or drive a CF1 cathode follower 126 in a manner to be later described. The open word ring triggers 88 are now all Off and no further information is received from the storage device until the emitter 21, Fig. 25*a*, moves to its next or 8 machine digit cycle point. When this occurs, a positive potential is supplied from the diode mix 76, Fig. 25*a*, to control apparatus, to be later described, to turn On the word trigger T1–1, Fig. 25*e*, over the line 115 and the above operation is repeated for each machine cycle point.

From the foregoing it should be understood that the operation of the horizontal and vertical drive rings 88 and 86, Figs. 25*e*, 25*f* and 25*h*, respectively, for the matrix 24, Figs. 25*e* and 25*g*, is timed in synchronism with the delivery of information to the translator over the 1—2—4—8 binary lines by means of the shift and gate pulses. By way of example, assume the first binary value of the first word supplied to the translator is a 9 and that the emitter 21, Fig. 25*a*, is in its 9 digit cycle point position, indicating the start of a line of information, a negative pulse is developed on the line 23, Fig. 25*c*, which is rendered positive by the power amplifier 81 and is timed with the gate pulses applied to the diode switch 83, Fig. 25*e*. This provides a positive pulse applied to the first word switch over the conductor 84 and results in a positive pulse being applied to all grids of the first row of gas tubes including the associated bit count tubes 91 and 92, Fig. 25*g*. Under these conditions, with the trigger T2–1, Fig. 25*f*, turned On, the output at terminal 7 is negative, thus all of the control grids in the first column of gas tubes have positive values applied thereto. It can be seen that under these conditions only the first tube GT3, Fig. 25*e*, in the first word row and first column has applied thereto two positive pulses, while the other tubes mentioned have only one positive value each. Thus the first tube is fired and will conduct while the other tubes remain inactive. As soon as this tube begins to conduct, a current flows from the plate to the cathode through a normally closed contact R74A which, in this instance, leads directly by means of a conductor 127 and a cable 130 to the number 2 terminal of a group of matrix exit hubs, Fig. 25*i*, whose function will be hereinafter described.

With both the translator 15 and matrix 24 synchronized, Figs. 25*c*, 25*e* and 25*g*, respectively, it can be further seen that with the emitter 21, Fig. 25*a*, at its 9 machine cycle point position and the consecutive sweeping of the gas tubes with the positive pulses, at any point where a binary 9 pulse is picked up at the decimal 9 line in the translator 15, Fig. 25*c*, the gas tube, Figs. 25*e* and 25*g*, where positive coincidence occurs with the vertical sweep is fired. This acts to set up the printing of a numeral 9 in the selected printer. With the emitter 21, Fig. 25*a*, at the 9 machine digit cycle point, the matrix 24, Figs. 25*e* and 25*g*, completes one cycle, that is, each ordered position of each word has been consecutively scanned and all 9's in each word result in firing of the related gas tube in its proper ordered position.

The same procedure is followed when the emitter 21, Fig. 25*a*, is in its 8 machine cycle point position and the matrix is again operated in the same sequence starting with word line 1 column 1 and all of the gated 8's act to fire the related gas tubes in a like manner.

As the emitter moves to its 3 machine cycle point position, it is at this time the bit count for each word, if a total of a 3 bit, is transmitted to the matrix. From Figs. 3*a* and 3*b* it can be seen the bit count arrives prior to the first ordered position of each word and while the bit count trigger T2–BC, Fig. 25*f*, is On. The firing of the bit count heated cathode gas filled tubes is operated in identically the same manner, however, the circuit breakers C41A, C42A, C43A and C40A, Fig. 25*g*, which are closed in predetermined sequences at 3, 2 and 1 machine cycle point time have control of the various plates. C43A and C42A apply a 125 volt potential to the tubes 91 at 3 and 1 machine cycle point time and C41A and C40A apply the same potential to the tubes 92 at 3 and 2 machine cycle point time. Thus at 3 machine digit cycle time all bit count tubes are capable of conducting if a 3 bit count pulse is received over the horizontal lines, however, at 2 cycle point time only the tubes 92 are energized and only the tubes 91 at 1 machine cycle point time. As each bit count gas tube is energized, it operates a related relay which in turn operates associated switching in a bit count comparing circuit 28, Figs. 25*n* to 25*r*, to be hereinafter described.

*Incomplete scan*

After complete scanning of all words in the line of data to be printed, an incomplete scan test is made. This test involves a plurality of lines 129, Figs. 25*e* and 25*f*, one for each word row which is connected to a diode mix 131, Fig. 25*f*, whose output is connected to a CF1 cathode follower 132 leading to a shield grid in a pair of GT2 heated cathode gas filled tubes 133. The control grid of one tube is connected to a 40 volt supply through normally closed contacts R71*m* during printer A operation and the control grid of the other is connected to the supply when normally open contacts R71*m* are transferred during printer B operation.

At 155° to 170° of respective machine cycle time, cam contacts C144A and C144B are closed and apply 125 volts to the plates of both tubes. If neither grid is positive, the tubes do not conduct, therefore, relays R775P and R778H remain de-energized and permit further machine operation. However, should one of the word triggers T1–1 through T3–7 in the word ring 88 be left On, due to improper operation, the related line 129 with a positive potential conducts through the diode mix 131 and both grids of the selected tube are biased positive. Thus, upon closure of the cam contacts C144A or C144B the biased tube will conduct to pick the related relay R775 or R778 to stop printer operation and indicate an incomplete scan signal, Fig. 25*l*, to be described later. In order to insure operation of the selected tube, the control grid of the nonselected tube is biased negative by connecting the same through resistors 134 to a negative 50 volt supply.

*Control for translator, matrix and printer*

For the purpose of this description, it will be assumed that the printers are in full operation and that the various potentials necessary for machine operation are all supplied from suitable sources. Under these conditions the manually operated start switches ST1 and ST2, Fig. 25*m*, are both closed and maintained in such condition in any suitable manner. When closed, these switches operate relays R1 and R741 to close various contacts in the control setup, to be described later, to maintain printer operation, assuming other controlling factors are satisfactory. When open, they cause opening of various circuits to stop the printing operation.

Fig. 2 shows in block diagram form the conditioning circuitry for printer operation and the controlling circuits for entry of data into the print thyratron matrix.

In order for the printers to receive the data from the storage device over the binary 1—2—4—8 lines, the printers must be in their proper cycle point positions to receive such data, and other conditions must be met; that is, the printers must be operative, a ready signal must be sent to the calculator, a selection for printer A or B must be made and the proper circuit checking must be accomplished which operates with a control pulse when the machine is at its proper machine digit cycle point to transmit a digit cycle point or row signal to the calculator to indicate that everything is in order to receive the data. When all these conditions are satisfactorily met, the data from the storage device is transmitted to the translator 15, Fig. 25*c*, groups of shift pulses are delivered to the shift pulse terminal 96, Fig. 25*d*, and gate pulses to the terminal 113, Fig. 25*e*.

The following table shows the various plugging arrangements at the control panel taps 135 and 136, Fig. 25*b*, that can be made and the printer operation that results from a print I or a print II signal:

| Control Panel Plugging | Relays Picked Up by Plugging | Calculator Signal | |
|---|---|---|---|
| | | I | II |
| | | Causes Printing in— | |
| A Print I<br>A Print II | R106 R107 | Printer A | Printer A |
| B Print I<br>B Print II | R109 R110 | Printer B | Printer B |
| A Print I<br>B Print II | R107 R109 | Printer A | Printer B |
| A Print II<br>B Print I | R106 R110 | Printer B | Printer A |

For the purpose of this description, it will be assumed that the control panel is plugged so that a print I instruction will cause operation of printer A and a print II instruction will cause operation of printer B. With this type of plugging the relays R107 and R109 are energized by a line 137 extending from the 40 volt source and in so doing closes contacts R107*e* and R109*f*, Fig. 25*b*, disposed in a print test A circuit 138 and a print B test circuit 139, respectively. Since the control panel wiring is as mentioned, the relays R106 and R110 remain de-energized, therefore, the contacts R106*c* and R110*d* in the test circuits remain open. Also, the contacts R106*b* and R110*b* in the printer instruction lines remain in their normally closed position as shown.

As shown, the print I and print II signals are applied to terminals 141 and 142, respectively, and these terminals are connected to the operating point (o/p) of the contacts R110*b* and R106*b*, respectively. From the normally closed contact R110*b* a line 143 connects to a related P1 amplifier 144 whose output is connected to the 3 terminal of a T3 print A trigger 145. From the normally closed contact R106*b* a line 146 connects to a related P1 amplifier 147 whose output is connected to the 3 terminal of a T3 print B trigger 148. The normally open contacts of R110*b* and R106*b* are connected to the lines 146 and 143, respectively.

In addition to the printing of numeric data from the storage device, the printer may be instructed at random by the calculator to print a special character or characters. This instruction is designated as a "special function" and when desired, the special function signal is applied to a terminal 149. This terminal is connected to a P1 amplifier 151 whose output connects to the 3 terminal of a T3 special function trigger 152. The "special function" may be used for intermittent carriage operations, such as, double space, overflow, and so forth.

The outputs of the print A and print B triggers 145 and 148 are each connected to a related CF2 cathode follower 153 and 154, respectively, each having an output line 155 and 156, respectively. Each line 155 and 156 leads to an element of separate 4 element diode switches 157 and 158, respectively. The outputs from these diode switches lead to a diode mix 159 having a conductor 161 connected to a P1 amplifier 162, Fig. 25*d*, whose output leads to the 3 terminal of a T1 "ready-to-print" trigger 163. The output at the 7 terminal of this last-named trigger is fed to a CF2 cathode follower 164 which in turn leads to one element of a 2 element "ready-to-print" diode switch 165. In this arrangement, all of the above triggers 145, 148, 152, Fig. 25*b*, and 163 Fig. 25*d*, are reset in their Off position.

With all triggers Off, the print A and B lines 155 and 156, Fig. 25*b*, leading, respectively, to cathode followers 153 and 154 are negative. This negative potential is applied by means of conductors 166 and 167 to a diode mix 168 leading to an IF inverter follower 169. The output of the inverter follower will be at a positive level due to an inversion within the unit and is directed over a conductor 171 to a terminal 172 called the "ready" line and signifies to the calculator that the printers are in operation and ready to receive an instruction.

Assuming the previously-mentioned condition where the print I signal connects to the print A trigger 145 and a print II signal to the print B trigger 148 and a print I instruction or signal is received to print in printer A, the print A trigger 145 is turned On and applies a positive potential to its related cathode follower 153 to raise the potential of the line 155. This conditions one element of the four element diode switch 157. However, the positive potential cannot operate this diode switch until other conditions are met.

At the time the line 155 goes positive, due to the print I in printer A instruction, this positive level is applied by means of the conductor 166 to the inverter follower 169 which changes plus to minus and in turn causes the ready line to go down or negative so that no other print instruction signal can be received.

At the same time the line 166 biases the grid of an associated PA2 power amplifier 173 to cause conduction from the 125 volt source along the line 174 to pick up relay R39 immediately and via its contacts *c* of relay R61P, Fig. 25*d*, at 345° of the printer cycle when contacts C1A close. The energization of relay R61P will via contacts R61*a* cause the energizing of relay R43, Fig. 25*j*, at 0° machine cycle time when cam contacts C30A close. This closes the normally open contact R43*c* in the A printer test circuit 138, Fig. 25*b*. It will be assumed the contact R38*c*, which responds to the bit count check is closed due to proper checking in the last printing cycle. Upon closure of the contacts R43*c* in the test circuit 138, a line 175 connected to the 75 volt source renders another diode in the switch 157 positive.

In order to insure the operation of but one printer, normally open contacts R106*d*, R107*c* and R109*d*, R110*c*, Fig. 25*b*, are series parallel connected. One side of each is connected to the grids of the related print B and A amplifiers 147 and 144 through conductors 176 and 177, respectively, and the other side is connected to a negative 50 volt supply by means of a conductor 178. At the time the print I in printer A instruction is received to turn trigger 145 On, the contacts 107*c* and 109*d* are closed and contacts R106*d* and R110*c* remain open. This is normal operation. However, if a second instruction should arrive over the print II line for printer B, the normally open contacts R106*d* and R110*c* are closed. This closure of all of the contacts applies a negative potential to the grids of both related amplifiers 144 and 147 over the lines 176 and 177 and blocks the print II instruction or operation from turning On of the print B trigger 148. Thus operation of only one printer at a time is assured. If the print B trigger 148 were On, the same operation would block the operation of the print A trigger 145.

At this time it is assumed the printers are operative; that is, all normal operating conditions as to voltage have been satisfied, and due to this condition, the relay R13, Fig. 25*m*, has been energized to transfer the contacts R13*b*, Fig. 25*b*, to supply a 40 volt potential from the line 137 through a resistor 179 to a terminal 181 which in turn is connected to the calculator (not shown). Should the printer not be operative, the normally closed contacts of R13*b* would remain closed and apply the 40 volt potential through a terminal 182 to the calculator to interrupt the delivery of the data in the storage device.

It is likewise assumed the previous bit count check was correct and that contacts R14*a*, for the relay R14, Fig. 25*m*, remain normal. This also supplies a 40-volt potential from the line 137 through a resistor 183 to the calculator through a terminal 184 to indicate a proper printer condition. However, if the bit count on the previous line of printed data was incorrect, the relay R14 is energized to transfer the contact R14*a* to apply the 40 volt potential to a terminal 185 to interrupt the delivery of the next line of data. Thus, the above represents two of the conditions which must be met before stored data is delivered to the translator 15.

With two of the elements of the four element diode switch 157, Fig. 25*b*, now positive, line 155 connected to one of the diodes of switch 157 and circuit 138, Fig. 25*d*, can be turned On, the remaining two diode elements in the selected switch must go positive before the "ready-to-print" trigger 163. One of the two remaining elements of this switch is connected to the 8 terminal of the special function trigger 152. With this trigger in Off position, the 8 terminal will be at a positive potential and the 7 terminal at a low or negative potential. Extending from the 8 terminal is a conductor 186 leading to a CF2 cathode follower 187 whose output is fed over a conductor 188 to a diode mix 189. The output from the diode mix leads to the grid of a CF1 cathod follower 191 whose output in turn is parallel connected to an element in each of the diode switches 157 and 158 by means of a conductor 192. In this instance, with no special function instruction or signal received from the calculator, the third element of the diode switch 157 is conditioned or rendered positive.

The remaining element of each diode switch 157 and 158 are parallel connected by means of a conductor 193 and lead to the cathode side of a CF1 cathode follower 194. The opposite side or grid of this cathode follower is connected through a 100 micro-microfarad condenser 195 to a conductor 196 which in turn is electrically tied to the decimal 9 line of the translator 15 between the 9 line trigger T4–9 and its related CF2 cathode follower 75, Fig. 25*a*. With this trigger Off, the output is negative and it can be readily seen that even if the other three elements of either diode switch 157 and 158, Fig. 25*b*, are positive, the "ready-to-print" signal can not be transmitted to the trigger 163, Fig. 25*d*, until the emitters 21 or 22, Fig. 25*a*, are mechanically rotated by their respective printers to the 9 machine digit cycle point position and the cam contact C131A is closed. When the emitter moves to its 9 digit cycle print position at 6° machine cycle time and the trigger T4–9 is turned On, the 9 line goes positive and this value through the line 196 charges the condenser 195, Fig. 25*b*, which in turn delivers a differentiated positive pulse to the related cathode follower 194 to apply a positive value to the fourth element of the diode switch 157. It is to be noted this pulse occurs at the beginning of 9 digit cycle point time only.

When the above conditions have been met, the output of the four element diode switch 157 conducts through the diode mix 159, line 161 and amplifier 162 and turns On the "ready-to-print" trigger 163, Fig. 25*d*. Therefore, the four conditions necessary for the turning On of the "ready-to-print" trigger are: (1) print A trigger 145 On, Fig. 25*a*, (2) carriage, print and bit count relay circuits 138 normal (3) special function circuits correct and (4) the selected printer at the beginning of 9 digit cycle point time.

As the 9 cycle point pulse occurs and the "ready-to-print" trigger 163, Fig. 25*d*, turns On, the 7 terminal of this trigger goes positive and its related cathode follower 164 applies a positive potential to the two element "ready-to-print" diode switch 165 and a three element diode shift pulse switch 197.

At the time the decimal 9 line goes positive and operates the diode switch 157, Fig. 25*b*, the positive potential is also transmitted by one of the conductors 77 in the translator to the diode mix 76, Fig. 25*a*, from the mix over a conductor 198, Fig. 25*c*, having in series therewith a CF1 cathode follower 199, Fig. 25*d*. The output of this cathode follower is fed over a line 201 to the other element of the "ready-to-print" diode switch 165 and the second element of the three diode shift pulse diode switch 197.

The positive pulse leaving the "ready-to-print" diode switch 165 upon coincidence is directed over a line 202 to the grid or input side of a P2 amplifier 203 to cause the same to conduct. With this tube conducting, the line 115 goes negative, Figs. 25*d*, 25*f* and 25*e*, and applies a negative potential to the 3 terminal of the first word trigger T1–1, Fig. 25*e*, to turn the same from Off to On position and thereby apply a positive potential to the first word switch 85 in the first word row to condition the same for the reception of information pulses from the translator.

The other terminal 9 of the power amplifier 203 goes positive and this positive potential is divided, one line of which conducts through a resistor 204 and is connected to a CF1 cathode follower 205 whose positive output is applied along the line 109 to condition one element of the two diode switch 108, Fig. 25*f*, disposed in the first vertical column of gas tubes GT3. However, this positive value can not energize the related thyratrons until the trigger T2–1 of the vertical ring 86 is turned On to apply plus to the other element of the diode switch 108.

The terminal 9 of the amplifier 203, Fig. 25*d*, also has connected thereto a conductor 206 including a CF2 cathode follower 207 whose output is fed over a line 208 to a terminal 209 which in turn is connected to the calculator. As the last-mentioned line goes positive, this provides the digit cycle point pulse or row signal which is directed to the calculator to signify that at this time the printer is now in condition to receive the data in the storage device. Upon the reception of this signal, the calculator is operated to supply the seven groups of seventeen shift pulses, each pulse representing an ordered position for each word, to the shift pulse terminal 96. At the same time the stored data is transmitted over the binary 1—2—4—8 lines, Fig. 25*c*, in synchronism with the shift pulses along with the gate pulses, the latter being supplied to the diode switch 83 from the terminal 113, Fig. 25*e*. During this interval the calculator is interlocked with the printer so that calculations to not take place.

As the three element shift pulse diode switch 197, Fig. 25*d*, is rendered conductive upon the reception of the first shift pulse, the output therefrom is directed to the grid of a PA1 power amplifier 210, over a line 211, whose output in turn provides a negative pulse along the shift pulse line 97 to turn the normally On bit count trigger T2–BC Off, Fig. 25*f*. Such action applies a negative pulse to the first column trigger T2–1 to turn the same to its On position and apply a positive level potential to the second element of the already conditioned diode switch 108 to apply a positive voltage to the control grids of the first column of thyratrons GT3, Fig. 25*e*, in the manner previously described. Each shift pulse causes shifting of the vertical drive ring 86 in the matrix 24 one column. Figs. 4*a* and 4*b*, show the time relationship between shift pulses and digit cycle point pulses.

After each digit of each word of the line transmitted to the translator has been scanned for the 9's, the seventh word trigger T3–7, Fig. 25*e*, is turned Off and the bit count trigger T2–BC, Fig. 25*f*, is turned On by the seventeenth shift pulse of the seventh word. Further operation of the matrix 24 is terminated until the amplifier 203, Fig. 25*d*, is again pulsed at the beginning of the next or 8 machine digit cycle point.

Each time the seventh row trigger T3–7, Fig. 25*e*, is turned Off, the terminal 8 provides a positive potential over the line 124, Figs. 25*e*, 25*f* and 25*d*, to the condenser 125, Fig. 25*d*, which in turn applies a pulse to the related cathode follower 126 whose output leads to a two element diode switch 212. However, this switch is ineffective because its other element is at a negative level.

At the end of the active 9 digit cycle point time which involves 8.9 milliseconds, the trigger T4–9, Fig. 25*a*, is turned Off by a positive pulse delivered from the cam contact C129A over the line 78 and in so doing drops the positive potential along the lines 196, 77 and 201 to open the diode switches 157, Fig. 25*b*, 165 and 197, Fig. 25*d*, respectively. This action drops the potential of the line 202, feeding the amplifier 203, to raise the potential of the line 115 directed to the first word trigger T1–1, Fig. 25*e* and drops the potential at the digit cycle point terminal 209, Fig. 25*d*, to prevent the transmission of the data from the calculator. The open word ring 88, Fig. 25*e*, then waits for the next digit cycle point start which comes at the beginning of 8 machine digit cycle point time. Each active cycle point is 8.9 milliseconds long and from the end of each active cycle point to the beginning of the next active cycle point there is a 7.6 millisecond dwell. This involves a total of 16.5 milliseconds. Since only 1.008 milliseconds is required to transmit the entire line of data from the storage device at the active cycle point time, the calculator is free to operate the remaining 15.492 milliseconds between machine digit cycle points.

It is to be noted that as the emitter 21, Fig. 25*a*, moves to its 9 position and the 9 line goes positive, the timing condenser 195, Fig. 25*b*, only applies a positive pulse of short duration, 1 to 2 micro-seconds, after which the diode switches 157 or 158 are rendered nonconductive because of the negative potential applied to the line 193. However, due to the fact the "ready-to-print" trigger 163, Fig. 25*d*, is turned On, a positive potential is maintained on its related diodes at the switches 165 and 197 throughout the entire machine digit cycle point operation.

As the emitter 21, Fig. 25*a*, moves to its 8 position, the associated trigger T4–8 is turned On and the decimal 8 line is raised in potential. This increase in potential is simultaneously fed from the diode mix 76 over the lines 198 and 201 in a similar manner to condition the diode switches 165 and 197, Fig. 25*d*, as previously described. The output of the diode switch 165 again drives the power amplifier 203 to turn the first word trigger T1–1 On, Fig. 25*e*, by means of the line 115 and sends a digit cycle point signal to the calculator at the terminal 209, Fig. 25*d*, to signify the printer is again ready to receive the same information or data. The operation of the unit is identical for the 8 digit cycle point position, however, at this time the 8's are removed from each word and the triggers are reset in the same manner.

The operation from 8 to 0 machine digit cycle points is identical to that previously described and at 0 digit cycle point time the operation is initiated in an identical manner. However, when the seventeenth shift pulse of the seventh word operates to turn the bit count trigger T2–BC, Fig. 25*f*, On and word ring T3–7, Fig. 25*e*, Off, the positive potential conducted over the line 124, Figs. 25*e*, 25*f* and 25*d*, to the condenser 125, Fig. 25*d*, provides the sharp positive going charge to the cathode follower 126 which conducts to one element of the diode switch 212 and now cooperates with a positive potential conducted over a conductor 213, Fig. 25*a*, secured to the now positive decimal 0 line to conduct from the diode switch 212, Fig. 25*d*. As this diode switch begins to conduct, it is fed to the grid of a PA1 power amplifier 214 whose negative output is directed over a conductor 215 connected to the No. 6 terminal of the triggers 145, 148, 152 and 163, Figs. 25*b* and 25*d*, respectively, to turn those which are On to their Off position. This action signifies the end of the data receiving operation and removes the positive pulses to all the diode switches to render them nonconductive.

In the example given, as the print A trigger 145, Fig. 25*b*, turns Off, the lines 155 and 166 go negative and the latter acting through the inverter follower 169 applies a positive potential to the "ready" terminal 172, signifying that the printer is now ready to receive its next instruction to print in either printer A or printer B. While the "ready line" is positive, it does not indicate that a printer is ready to receive data. It only indicates to the calculator that the printers are ready to receive a print instruction. At the time all of the triggers are reset, more than half of the printing cycle and the bit count test is yet to come.

At the end of 0 machine digit cycle point time, the open word ring 88, Fig. 25*e*, is tested for incomplete scan through the cam contacts C144A or B, Fig. 25*f*, thyratrons 133, contact R71*m* and the diode mix 131 at 155–170° machine cycle time in the manner previously described.

In the event that the printer operation should be interrupted for any reason during the cycle of operation or an incomplete scan has been detected, and it is necessary to resend the data to the printer, a trigger reset circuit 216, Fig. 25*f*, is provided. This trigger reset circuit includes a line 217 connected to the No. 4 terminal of all triggers in the unit, with the exception of the bit count trigger T2–BC, Fig. 25*f*, which is connected at the 5 terminal. During normal operation, the relay RPSI, Fig. 25*l*, is energized and this transfers the contacts RPSI*a* and RPSI*b*, Fig. 25*f*, so that a negative 100 volts is normally applied to the reset line 217 by means of the transferred contacts at RPSI*a* and a conductor 218. In case of an error, interruption or malfunction or the like, the relay RPSI is de-energized and the contacts RPSI*b* move to their normally closed position. In so doing, the normally closed contacts apply a positive 150 volts to the reset line 217 through a conductor 219 which is now connected in series with the conductor 218. When this contact transfer occurs, regardless of which triggers are turned On, they all will be turned Off, except the bit count trigger T2–BC which will be turned On, if Off.

When the bit count trigger T2–BC is in its On condition, the output at the 7 terminal reduces the potential at the grid of the tube 101 and cathode follower 118. Thus a positive potential is transmitted over the conductor 119 to a second conductor 221 leading to a diode mix 222, Fig. 25*c*. This diode mix in turn is connected to the binary **16*b* and 17*b* lines and provides a parallel positive potential to these lines at all times, except when the bit count trigger is turned Off. This latter function is a means for insuring that these lines in the translator 15** will be positive during the time the bit count, if any, is transmitted.

Fig. 4 shows the time relationship between shift pulses and gate pulses. The control grid of each gas tube is pulsed at a definite time during each word under the control of the shift pulses and is approximately 8 microseconds in duration. The shield grid is pulsed only at such time as the digit on the data lines corresponds to the printer digit time.

The print magnet operating gas tubes in the matrix 24, Figs. 25*e* and 25*g*, as the name implies, are used to energize the print magnets 861, Fig. 25*i*. The 125 volt D.C. plate voltage of these gas tubes is gated by the master circuit breakers MCA or MCB, Fig. 25*e*, which apply plate voltage only during the machine digit cycle point time. This arrangement prevents the firing of the gas tubes at any time other than at digit cycle points and also provides for the cutting off of the tubes after they have been fired.

Control panel plugging 223, Fig. 25*i*, comprising a plurality of matrix exit hubs 230 and a plurality of oppositely disposed print magnet entry hubs 232 connected by suitable plug wires 233 places a selected print magnet 861 in a cathode circuit of a related gas tube. The printing of any digit requires two pulses to the print magnet. The first pulse is supplied by the gas tube at the digit cycle point time over the parallel lines 127 and the second pulse which is called the N (numeric) pulse is supplied by cam contact C145A in conjunction with control panel plugging. A more detailed explanation of printing will be hereinafter described.

*Special function*

Returning to the print instruction circuitry, Fig. 25*b*, in the previous description, it was assumed the print I instruction in printer A had turned the print A trigger 145 On and that no special function signal was received at the terminal 149. Assuming now that the same printer instruction is received, however, it is desired to print a special character or characters or the like or cause some carriage operation. The line 155 is positive and the printer test circuit 138 is completed in the same manner as previously described to condition the two elements of the four element diode switch 157. However, the third element, representing the special function is rendered positive in a different manner.

For special function operation, the terminal 149 receives the positive special function impulse from the calculator, simultaneously with the print A instruction, and directs the same to its associated amplifier 151 whereat it is inverted and applied to the 3 terminal of the special function trigger 152 to turn the same On. This drops the positive output on the line 186 at the 8 terminal to drop the potential on the line 192 leading to the special function diodes in the switches 157 and 158, and raises the potential at the 7 terminal which is fed to the grid of a related CF2 cathode follower 224. The output from this cathode follower fires a PA2 power amplifier 225 through a conductor 226 and in so doing, picks up a special function relay R41 by completing the 125 volt circuit from the line 174.

When the special function relay R41 operates, it energizes a relay R42, Fig. 25*d*, from the 40 volt source. Therefore, relays 41 and 42 are both special function relays and they serve the following purposes:

Contacts R41*a*, Fig. 25*d*, turn on a special function light 227;
Contacts R41*b* pick up relay R42;
Contacts R42*a* pick up relay R34 on print A cycles upon closure of switch C1A because contact R39*c* was closed by the print A instruction;
Contacts R42*b* pick up relay R35 on print B cycles upon closure of switch C1B because contact R102*g* is closed on a print B instruction;
Contacts R34*a*, Fig. 25*i*, pick up relay R36;
Contacts R35*a*, Fig. 25*j*, pick up relay R37;
Contacts R36*d*, Fig. 25*b*, close a circuit in the special function print A test;
Contacts R37*d* close a circuit in the special function print B test;
Contacts R36*c*, Fig. 25*i*, special function A control panel hub 228;
Contacts R37*c*, Fig. 25*j*, special function B control panel hub 229.

The special function control panel hubs emit a continuous impulse all during the printing cycle and this pulse may be used for the operation of a plurality of selectors 231, Fig. 25*i*, only two of which are shown, for the purpose of selective printing in preselected ordered positions, if desired, or may be plugged directly to carriage control hubs.

As previously mentioned, with a print A or print B instruction applied to the print instruction terminals 141 or 142, respectively, Fig. 25*b*, the resultant operation picks either relay R36, Fig. 25*i*, or R37, Fig. 25*j*. When picked, these relays close either parallel contacts R36*d* or R37*d*, Fig. 25*b*, respectively, which are connected at one side to a positive 75 volt source by the conductor 175 and to the diode mix 189 at the other. The positive output of this mix is directed to the cathode follower 191 whose output in turn applies a positive potential over the conductor 192 to the third element in each of the diode switches 157 and 158, respectively. The fourth element in each switch is rendered positive when the printer reaches its 9 machine digit cycle point, which initiates operation as previously described.

From the above, it can be seen the special function circuit requires the receiving of a printer A or B instruction along with the special function instruction. A special function instruction by itself has no meaning to the printers and will not result in printer operation.

*Printing mechanism*

Referring first to the print magnet operating gas tube matrix 24, Figs. 25*e* and 25*g*, it was previously mentioned that with printer A in operation, the transfer contacts R74*a* and all others at each tube are normal and that when the first tube was fired, it conducted through the 9 terminal and normally closed contact R74*a* over the line 127 in the A cable 130 to the No. 2 terminal of control plugging 223 for a bank or array 234 of 120 print magnets 861 in print A, Fig. 25*i*. Since all magnets and control circuitry therefor are identical, only eight of the 120 magnets are shown.

Each gas tube in the matrix 24, Figs. 25*e* and 25*g*, is wired in a similar manner and includes a similar transfer contact and a conductor for connecting each tube to a related exit terminal 230, Fig. 25*i*, at the print magnet array 232. For the purposes of this description and to provide proper transfer of gas tube contacts for printer B operation, a plurality of relays are utilized, Fig. 25*d*. These relays include R74, R77, R80, R83, R86, R89, R92, R96, R99 and R102, and they are all normal for printer A operation. While the points of these relays are not shown, it is to be understood the cathode side of each gas tube is provided with a normally closed and a normally open transfer contact. Also, for the purpose of this description, it will be assumed that the first ordered position of the first gas tube in the matrix 24, Fig. 25*e*, is wired by the conductor 127 to the second print magnet 861, Fig. 25*i*, which is the No. 2 terminal at the control plugging 223, as shown in broken lines 233. Thus, a complete line of information, in the absence of a special function direction, will start at the second ordered position and print a total of seven words with sixteen ordered positions each and each word is separated by a blank ordered position corresponding to the bit count position. This will correspond to the timed spacing of the ordered position for the words as shown in Figs. 3*a* and 3*b*. It is to be understood, however, that the control panel terminals 230 can be wired in any suitable manner by the plug wires 233 to energize any desired magnet or group of magnets in any described order.

For the present, it will be assumed that when the No. 1 print magnet gas tube in the matrix is fired, Fig. 25*e*, it conducts through the normally closed contact R74*a* and conductor 127 to the related exit hub 230 at No. 2 plug terminal at the control panel 223, Fig. 25*i*, across the plug wire 233 through print magnet entry hub 232, the normally closed contact R147*b*, the related No. 2 print magnet 861 to a normally closed zero print control transfer switch 235 and a 0 control contact R112*b* to a ground connection 236. The operation of the latter three contacts will be described later.

When this conduction occurs, the related print magnet will be energized to initiate operation of a type wheel 860 in printing mechanism 237, Fig. 28*a*, in a predetermined manner. Energization of the print magnet will continue until the master circuit breaker MCA or MCB, Fig. 25*e*, opens the plate circuit of the fired thyratrons at the end of the machine digit cycle point.

The present machine is provided with a printing mechanism which is adapted to print numeric data or information and a minus sign in selected ordered positions upon the energization of its related magnet at "1" machine digit cycle point time. The printing mechanism utilized is similar in construction and operation to that shown and described in E. J. Rabenda et al. Patent 2,518,063, dated August 8, 1950, and assigned to the assignee of the present invention. However, in this embodiment a slightly different pulsing arrangement for the magnets is provided and a total of 120 ordered positions or type wheels 860 are utilized, corresponding to the number of gas tubes in the print matrix 24, Figs. 25*e* and 25*g*, plus the number of ordered positions required for proper spacing of the words.

There will now be described the analyzer mechanism at the print mechanism which converts the digit representations transmitted under control of the matrix 24 to select digit type to print the desired information.

Cams 800A, 800B, 800C and 800D, Fig. 28*b*, are driven by driving means to be subsequently described one revolution for each cycle of operation of the machine. It will be noted that these cams differ in their cam contours and the particular cam portion which is effective in each point of the operating cycle is shown in the timing diagram of Fig. 30. Each of the cams is provided with cam heights which are identified by three dotted circles associated with the cam 800A, which circles are of three different diameters and represent the heights of the cam contours as Low, Medium and High. The corresponding designation is shown in the timing diagram of Fig. 30 for such cams to identify the particular cam portion effective in each point of the operating cycle. The cams 800A, 800B, 800C and 800D may for convenience in construction be extended longitudinally to provide fluted cam rods having the configuration and outline to cooperate with a plurality of orders or type spaces.

Each cam 800 cooperates with a related releasing and blocking member 810. The reason that the member 810 is called a releasing member is that when elevated a predetermined distance by the Medium or High cam portion of the related cam 800, it will release the operating link 863 for movement but when in its normal lower position (due to the Low cam portion) it will block the link 863 against movement. Each member 810 is slideably mounted in a slot 801 of a guide block 802 and is further guided by a rod 804 which receives a guide slot 803 of the related member 810. Also pivoted on a rod 805 carried by the block 802 is a latch pawl 806. Interposed between the pawl 806 and the associated member 810 is a compression spring 807, the spring 807 functioning to urge the member 810 downwardly so as to always press against and contact with the cam contour of the related cam 800. Each member 810 is provided with a shoulder 808 cooperating with a lug 809 formed as an integral part of the link 863.

The link 863, referring to Fig. 28*a*, is slideably mounted in guide slots formed in a support plate 811 to support the link 863 at one end and guide its movement and referring to Fig. 28*b* the other end of the link 863 is dependently hung by arm 813, which arm has a cam follower extension 818. A compression spring 814, fitting in a spring support and guide block for arm 813 urges the link 863 to the left and when such spring is effective for action under control of a cam 825, it serves as the source of mechanical impulse transmitted to link 863 at a differential time to rock a clutch release arm 867 to engage a clutch 868 to initiate rotation of a type wheel 860.

Recalling now that each cam 800 has cam contours of three different heights, it should be observed that when member 810 is at a position determined by the Low portion of the cam 800 the shoulder 808 abuts lug 809 to block the link 863 from movement to the left, urged by compression of the spring 814. In attempting to do so, lug 809 will bear against the shoulder 808 and urge the member 810 clockwise, which movement is restrained by the cooperation of an upstanding hooked portion 812 of member 810 against the latching end of the pawl 806. Assuming now that a cam has been rotated so that the Medium cam portion of the cam contour has raised the member 810, such difference in cam height with respect to the Low cam height will elevate shoulder 808 slightly further above the related lug 809 and by the continued cooperation of the hooked extension 812 of the member 810 with the extremity of the pawl 806, clockwise movement of the pawl 810 will still be restrained.

Assuming now that the High cam portion has positioned the member 810 to its maximum height, the shoulder 808 will be still further above the lug 809 and the member 810 is now in such position that the compression spring 807 will be effective to rock the member 810 clockwise so that the hooked extension 812 will catch over the latch end of pawl 806, provided that at this time the pawl 806 is rocked counterclockwise due to the transmission of an impulse to the magnet 861 at the time the member 810 is in its highest position. If the pawl 806 is not rocked slightly counterclockwise, no latching of the member 810 will take place. Summarizing, whenever the High portion of a cam has elevated a member 810 to the highest position such member will be latched if the related pawl 806 is concurrently rocked to latching position. If there is no rocking of the pawl 806 at this time, member 810 will not be latched and will be subsequently free to move up and down in accordance with the successive cam contour as the related cam 800 rotates.

The above description has been confined to the operation of the parts under control of the cam 800A but it should be noted that identical operations are effected under control of the remaining cams 800B, 800C and 800D. For this reason, the description of operation need not be repeated for duplicate parts.

For the purpose of rocking the pawls 806 to latch those members 810 which are at their highest position, it will be seen that referring to Fig. 28*b* each translator control magnet 861 when energized attracts an armature 815 and rocks the same so as to shift a related connected link 816 to the left. Extending from each link 816 are four integral extensions 817, each of which cooperates with the related pawl 806. The result of this construction is that the impulse directed to the magnet 861 will shift the link 816 and rock the four pawls 806 concurrently but only that pawl 806 is effective for latching the related member 810 if the associated member 810 has been elevated to its highest position. Therefore, one or more of the pawls 806 may be rocked idly at the same time without latching the related members 810.

To prevent the armature 815 from sticking to the core of the magnet 861 due to residual magnetism, it is desirable to provide means to positively restore the link 816 and armature 815 to normal by mechanical means timed with the rotation of the cams 800. To this end there is provided a magnet knock-off cam 820, Fig. 28*a*, notched as shown. A follower arm 821 of a clutch release arm 824 cooperating with the cam 820 has a depending arm 822 urged by a spring 823 against an upstanding finger of the link 816. At the time the magnet 861 is energized, it will be observed that follower arm 821 cooperates with a notch **820*a* of the cam 820. Thereafter, such arm cooperates with the following cam portion 820*b* to rock arm 821, link 816 and armature 815, restoring the armature 815** to normal if it should remain attracted to the core under the above circumstances.

Referring now to Fig. 30, it is obvious that at the time the impulses 9 through 1 are directed to the magnets 861, one of the cams 800 will have its High portion in cooperation with one or more of the latching members 810. For example, at the time the 5 impulse is directed to the magnets the High portion of cams 800C and D will be effective. At the time the 3 impulse is directed, only cam 800B will have a High portion effective at this time. For all of the electrical impulses 9 through 1 this condition may be represented by the following table:

| Impulses: | Members 810 latched |
|---|---|
| 9 | 810A and C. |
| 8 | 810A. |
| 7 | 810B, C and D. |
| 6 | 810B and C. |
| 5 | 810C and D. |
| 4 | 810B and D. |
| 3 | 810B. |
| 2 | 810C. |
| 1 | 810A. |

It is obvious from the above table that members 810 are latched singly or in predetermined combinations, according to the code so that at the termination of the transmissions of the electrical impulse all or some of the members 810 will be latched, and others will not be latched and therefore free to be positioned according to the contour of their cams during their subsequent rotation. It is explained that once a member 810 is latched, it is not free to thereafter move upwardly and downwardly in accordance with the subsequent cam contour of the related cam, but remaining unlatched members 810 can do so.

Movement of the operating link 863 to the left during the time that the impulse is transmitted, which movement might be permitted if all of the four members 810 for this order may be either latched or elevated so as to be above the lugs 809, is restrained by a cam porition 825*a* of cam 825 (Fig. 28*b*). This cam, through driving means to be subsequently explained, is driven synchronously with the cams 800 and 820 and cooperates with the follower extension 818 of arm 813. As shown in the timing diagram, during the transmission of 9 through 3 impulses, the High portion 825*a* of cam 825 will restrain movement of the operating link 863 to the left.

After latching of members 810 in predetermined combinations, the contour of the cams 800A, 800B, 800C and 800D which are thereafter effective will determine the time in the operating cycle that the operating link 863 will be moved to the left in a manner now to be described in detail:

After one or more members 810 are latched in combination according to the impulses transmitted as indicated in the preceding table, the further rotation of the cams 800A, 800B, 800C and 800D will raise and lower the remaining unlatched members 810 according to the cam contours of the respective cams, but during said further rotation of the cams the link 863 will be restrained against movement by one or more of such unlatched members until a point is reached in the operating cycle when the cams related to the unlatched members concurrently present cam operations of Medium or High height to the unlatched members. It will be recalled that since the latched members 810 are so positioned that they do not restrain the movement of the link 863 under the influence of the spring 814 and further the elevation of any unlatched member by a cam portion of Medium height will also unlock the link 863, it is obvious that when both of these conditions exist for four of the members 810, the link 863 is then free to move under the influence of the spring 814 and cam 825. This will be made clear by reference to a particular example.

If for example, the 9 impulse is transmitted under control of a fired gas tube at 9 digit cycle point time, members 810A and 810C are latched due to the High cam portions of their respective cams 800A and 800C and such latching of member 810A and 810C is completed at about 15° of the operating cycle (see Fig. 30). At this time, the members 810A and 810C are latched in the highest position so that they unlock the operating link 863 at such positions. However, cams 800B and 800D in their subsequent rotation continue to lower and raise the related unlatched members 810B and 810D and such unlatched members will restrain the operating link 863 from movement until about 135° of the operating cycle, at which time cam 800B through its Medium high cam portion and 800D through its High cam portion shift related latching members 810 to unlock the link 863. At this time cam follower extension 818 of the arm 813 will cooperate with the notch 825*b* designated 9 in both Fig. 28*b* and the timing diagram of Fig. 30. Operating link 863 is now unlocked at four points and the movement of the link to the left is effected at about 135° by spring 814. The link will now operate the clutch release arm 867 and therefore engage a type selecting clutch to be described to initiate the rotation of the printing wheel 860 to select the numeral type 9.

Referring now to Fig. 28*b*, when the operating link 863 is moved to the left to effect the engagement of the type selecting clutch the cam follower extension 818 is in the bottom of the notch 825*b* of the cam disc 825 and further rotation of the cam 825 in a clockwise direction will, through the following inclined cam portion 825*c*, cooperate with the cam follower extension 818 to positively restore the operating link 863 to the right without, however, causing the unlatching of any latched member 810. At about 305° an extra High cam portion 825*d* will shift link 863 to the right beyond the normal position, and in so doing for those members 810 which have been latched, lug 809 will engage the shoulder 823 of the respective member 810 to rock the same counterclockwise to unlatching position, spring 807 being compressed during this operation to rock pawl 806 to normal position. With respect to any unlatched member 810, movement of the link 863 to the right at this time may also effect movement of such members 810 but the operation of such is ineffective.

While the operation of the machine has been described in connection with the manner of engaging the type wheel clutch when the 9 impulse is transmitted, to select the 9 type, the same principle of operation for effecting the above results is involved for other impulses at different cycle point times as is evident from the following table:

| Readout Digit Representation | Members 810 Latched | Machine Cycle, Degrees Latched | Cams 800 at Medium Cam Position | Machine Cycle, Degrees at Which Release Occurs |
|---|---|---|---|---|
| 9 | 810A, 810C | 15 | 800B, 800D | 135 |
| 8 | 810A | 30 | 800B, 800C, 800D | 150 |
| 7 | 810B, 810C, 810D | 45 | 800A | 165 |
| 6 | 810B, 810C | 60 | 800A, 800D | 180 |
| 5 | 810C, 810D | 75 | 800A, 800B | 195 |
| 4 | 810B, 810D | 90 | 800A, 800C | 210 |
| 3 | 810B | 105 | 800A, 800C, 800D | 225 |
| 2 | 810C | 120 | 800A, 800B, 800D | 240 |
| 1 | 810D | 135 | 800A, 800B, 800C | 255 |

It will be recognized from this table and Fig. 30 that the concurrent position of cams 800 at a Medium height cam portion for those cams which have not previously latched members 810 will determine the time the mechanical impulse is transmitted. Also, that from the machine cycle degrees where latching of the cams occurs to their release provides a 150° machine cycle delay.

The mechanical impulse transmitted to link 863 causes the engagement of the selector clutch to rotate the printing wheel 860 to a selected digit position. However, due to the lag in the system, the clutch is not engaged, and the type wheel does not begin to rotate until 15° later. This is clearly shown in timing chart, Fig. 30. When the selector clutch is engaged, it is driven by a shaft 839, rotated by means to be later described.

For each printing order there is pivoted on a rod 866 a triple arm member consisting of arms 864, 865 and the clutch release arm 867.

Shaft 839 has secured thereto a tube 868 which is fluted transversely along its periphery to provide clutch notches 869. Tube 868 constitutes the driving clutch member. Encircling the clutch tube 868 is a plurality of gears 870, there being one gear for each order of the printing mechanism. For mounting the gears 870 on the clutch tube 868 each gear has integral therewith a flange 872. To provide for the lateral spacing between the gears 870, the gears are guided by guide slots 871 formed in guide blocks 873 and 874. By such spacing members the gears 870 are separated to allow independent rotation and to also locate a clutch pawl 876 which is pivoted on the related gear to cooperate with the clutch release arm 867. The clutch release arm 867 normally holds the clutch pawl 876 in such position that its tooth 877 is out of engagement with any of the clutch notches 869 of the clutch tube 868. When the clutch release arm 867 is rocked as a result of the actuation of the operating link 863 at a differential time, the clutch is engaged because a spring 878 attached to the clutch pawl 876 will rock the latter in order that the clutch tooth 877 will engage a clutch notch 869 determined by the differential time the operating link 863 is actuated. The above described clutch is the printing type selecting clutch and causes the differential rotation of the printing wheel 860, since the gear 870 and the printing teeth of the type carrying wheel 860 are in mesh.

If, as previously described, the operating link 863 was shifted at about 135° as a result of the 9 digit impulse, the clutch release arm 867 would be rocked at this time and pawl 876 would be released and rocked by spring 878 so that clutch tooth 877 engages a clutch notch 869, and printing wheel 860 will thereafter continue to rotate to such position as to present the numeral "9" to the printing line. The differential time at which the operating link 863 is actuated determines the extent of counterclockwise rotation of the printing wheel 860 from a rest position necessary to select a numeral type. After the predetermined extent of rotation of the printing wheel 860 has been effected and the printing impression has been effected in a manner to be later described, with the type selecting clutch still engaged, the printing wheel 860 will continue to rotate until the free end of the clutch pawl 876 strikes the clutch release arm 867 which, in the meantime, has been brought to its normal position, by means of a compression spring 879, Fig. 28*a*. When such disengagement is effected, the printing wheel 860 is at the normal position shown in Fig. 28*a*.

Each printing wheel 860 is carried by an arm 881 loosely pivoted upon a rod 882 and provided with a rearwardly extending follower extension 884 operated by a cam projection 883 of a cam disc 885 which constitutes a driven member of a printing clutch.

A shaft 838 rotates a clutch tube 886, fixed thereto and likewise encircling the clutch tube 886 is the driven clutch disc 885 upon which is pivotally mounted a clutch pawl 887. Clutch disc 885 and parts carried thereby are guided similarly to gear 870. Associated with the clutch pawl 887 is a clutch release arm 888. When the clutch engagement is effected between the clutch pawl 887 and one of the clutch notches of the clutch tube 886 at "N" impulse time occuring at 187° machine cycle time, the disc 885 will be rotated in a clockwise direction, whereby the cam projection 883 will cooperate with the follower extension 884 to rock arm 881 about the rod 882 against the action of the return spring 889. The engagement of the clutch is effected when the printing control magnet 861 for each order is again energized for numeral printing by an "N" impulse at the next machine cycle. This "N" pulse occurs simultaneously for all print magnets and operates to initiate operation of the respective clutches which have not been previously released at O, X or R machine cycle time.

When the printing clutch engagement has been effected, each cam 885 will coperate with the related follower extension 884 to rock the associated printing arm 881 to force the printing wheel 860 against the usual inking ribbon and platen 890 around which platen is positioned the paper strip 891 to be imprinted. As each arm 881 is rocked against the action of the spring 889, the printing wheel 860 is being rotated counterclockwise but since the printing wheel is now rolling over the gear 870 this rolling action will cause an equal and simultaneous rotation in a clockwise direction. Both of these opposite rotations will, in effect, cause the printing wheel to be substantially im-mobile with respect to its rotation when it moves to the right to strike the platen 890, the type striking the platen squarely and firmly to cause a legible impression.

After the printing operation, when cam extension 883 of the cam disc 885 passes by the follower extension 884, spring 889 will now be effective to return the type wheel carrying arm 881 to normal position and the extension 884 now bears against the circular peripheral edge of the cam disc 885.

After the printing operation, since the type selecting clutch is still engaged, the printing wheel 860 continues to rotate as previously stated until the clutch pawl 876 strikes the clutch release arm 867 which, in the meantime, has been positioned to normal, thereby disengaging the type selecting clutch when the printing wheels are at normal position.

The printing clutch continues its engagement for a complete rotation of the cam 885 and the clutch disengagement is effected by the engagement of the clutch pawl 887 with the clutch release arm 888.

As the free end of the clutch pawl 876 strikes the clutch arm 867 there is a tendency to cause the gear 870 to rebound counterclockwise. This action is prevented by the cooperation of a spring-pressed detent 896 with a shoulder 897 of a plate 898 secured to each gear 870. When the normal position of the clutch is obtained, the detent 896 will engage the shoulder 897 to prevent such rebound and retain the clutch parts in their normal position.

A somewhat similar rebound preventing mechanism is also provided for the printing clutch which consists of a spring-pressed detent 891 cooperating with the shoulder 899 of the cam disc 885.

Upon the transmission of said "N" impulse, by a circuit to be described, the second energization of the magnet 861 again attracts its armature 815 and shifts link 816. The latter thereupon rocks clutch release arm 824 to unlatch the clutch release arm 888 of the printing clutch. At this time a Low portion **820*c*** (see Fig. 28*a*) of the cam 820 cooperates with the cam follower extension 821 so as not to restrain the rocking of clutch release arm 824. When the clutch release arm 888 is unlatched, a depending extension 827 moves in a clearance portion 826 of said arm 824. Cam disc 885 will now rotate counterclockwise and the cam extension 883 will strike the follower extension 884 at the time the selected numeral type is at the printing line to effect the printing impression.

It is undesirable to have the clutch release arm 888 release whenever link 816 is rocked the first time to rock arm 824 to engage the printing wheel clutch and during this time a high portion **837*a* of cam 837 cooperates with arm 888 to block it against movement to release the printing clutch. When the "N" pulse is transmitted as will be later described, the Low portion 837*b* of the cam will cooperate with clutch release arm 888 to permit its rocking to engage the printing clutch. After this, the cam rise 837*c* of cam 837 will function to positively retract the clutch release arm 888 to normal position to cause disengagement of the clutch release pawl 887 after a complete revolution of the printing clutch. At the termination of the operating cycle, a cam rise 820*d* of cam 820 functions to rock the clutch release arm 824 clockwise to again position it beneath the extension 827 of the clutch release arm 888**, which previously has been elevated to the position shown in Fig. 1*a*. The cam rise **820*d* also shifts link 816 to restore armature 815 to normal if it should stick to the core of magnet 861**.

The printing of a minus (—) sign at selected ordered positions will be described in the print magnet setup section.

*Gear drive for printing mechanism*

In Fig. 29 reference numeral 838 designates the printing impression drive shaft which is driven at a uniform speed of rotation for each cycle of the operation of the machine. The drive shaft 822 has secured thereto a gear 940 which drives a gear 941 secured to the printing impression drive shaft 838 to rotate the latter at a uniform speed of rotation of one and a half revolutions for each revolution of drive shaft 822.

Shaft 839 represents the type selecting drive shaft which rotates 2½ revolutions for each operating cycle. The shaft 839 is driven at times with a uniform speed of rotation synchronous with the drive shaft, but at other times the speed of rotation given to shaft 839 is decreased or increased with respect to drive shaft 838, in order to select the desired alphabet type of a selected group of alphabet type. This means to effect the variable drive of shaft 839 is disclosed in full details in Patent No. 2,439,445, issued to H. S. Beattie, and since the alphabet printing is of no concern here it need not be described to understand the present invention. With such variable speed drive, the shaft 839 will rotate the type wheel at a decreased speed to present the selected numeral type to the platen at about 330° of the cycle at which time the previously clutched printing cam 885 will have its cam projection 883 in position to strike the projection 884 to impress the selected numeral type against the platen 890.

The machine includes a driving means driven by the shaft 822 for rotating the cams 800A, 800B, 800C and 800D, 820, 825, 837 and 887 in synchronous relationship and such cams are driven one complete revolution for each operating cycle.

The driving means for driving cams 800A, 800B, 800C and 800D will now be described. Secured to shaft 822 is a gear 1040, Fig. 29, which through a gear 1041 drives a gear 1042 secured to the drive shaft 1043 for the cam 800D. Shaft 822 is extended to directly drive the cam 800C. Gear 1040 through a gear 1044 drives a gear 1045 secured to the drive shaft 1046 for cam 800B. Gear 1045, through an idler gear 1047, drives a gear 1048 secured to the drive shaft 1049 for the cam 800A. By such driving means, the cams 800A, 800B, 800C and 800D are driven synchronously. Gear 1044 has rotatable therewith a gear 1050 which, through an idler gear 1051, drives a gear 1052 attached to the shaft 1053 to which the cam 825 is secured. Gear 1050 also meshes with a gear 1054 secured to a shaft 1055 to which shaft the cam 820 is secured. Also, to drive shaft 838, there is secured a gear 1056 which meshes with a larger gear 1057 secured to the shaft 858 to which the shaft the cam 837 is secured. Thus, through the intergearing last described, the operating cams 820, 825 and 837 are driven synchronously with the operating cams 800A, 800B, 800C and 800D.

*Carriage and platen*

Any suitable mechanism and control therefor may be provided to drive the platen 890 over which the paper 891 is fed. One such example is shown in Mills et al. Patent 2,531,885, dated November 28, 1950, and assigned to the assignee of the present invention.

*Print magnet setup*

Referring to Fig. 25*i*, the group of 120 print magnets 234 are, for the purpose of this embodiment, wired at their entry hubs 232 by plug wires 233 to the exit hubs 230 of the print magnet gas tubes in the identical arrangement as shown in Figs. 3*a* and 3*b*, word for word and order position for order position. Referring to the latter two figures, it will be noted that the first order position of each word represents a bit count and that a shift pulse separation is provided between each word. Since the bit count pulse is directed to the bit count thyratrons 91 and 92, Figs. 25*g* and 25*h*, which operate related relays, the No. 1 print magnet, Fig. 25*i*, is not wired to the gas tube matrix. The same arrangement would apply for the Nos. 18, 35, 52, 69, 86, and 103 print magnets because they respectively represent the bit count positions in each of the other words. Thus, upon the operation of the "N" print signal or pulse, these ordered positions, in the absence of a special function signal, will not be operated to cause movement of the related type wheels 860 to the platen 890, Fig. 28*a*.

Since only eight of the magnets 861, Fig. 25*i*, and circuitry therefor are shown, these merely represent a portion of the ordered positions of the first word. However, it is to be understood the other six words in the line will be arranged and wired in an identical manner.

In each word, Figs. 3*a* and 3*b*, the first ordered position represents the bit count and the second and third ordered positions represent index values which are used to indicate a location or position in the problem for the word associated therewith. These index values are given numeric characters and are wired to the second and third print magnets, respectively, Fig. 25*i*, by means of the plug wires 233 at the control panel. The fourth ordered position of each word is labeled Sign, and carries either a one or zero numeric value. The zero represents a plus (+) value and the one represents a minus (—) value. Since the plus sign is a zero, it will be printed by the printer after the magnets are pulsed at "N" time, however, the minus sign (—) is given a numeric value and this value is included in the bit count for the word and is transmitted therewith.

In order to selectively cause the printing of minus (—) signs at selected order or type positions on the paper by the type wheels, a group of fourteen minus signs pick and a similar group of hold coils 238 and 239, respectively, are provided, Fig. 25*i*. Since all coils are identical, only four of each and their associated contacts are shown. In this arrangement the No. 4 hub of the matrix exit hub 230 at the control panel is connected by means of a plug wire conductor 241 to the No. 1 minus sign entry terminal which leads to a minus sign pick coil R181P in the group 238 and the associated print magnet entry terminal 232 is connected by means of a plug wire conductor 242 to the No. 1 minus sign exit terminal which is connected in series with a normally open contact **R181*b*** for reasons to be hereinafter explained.

The remaining magnets Nos. 5 through 17 of the first word, with only Nos. 5 through 8 shown, are directly connected to the matrix exit hubs 230 by the related plug wires 233 to receive the numeric data delivered from the storage device as previously described. The print magnets for the other six words in the line would be wired in the same manner. However, it is to be understood the above arrangement is given by way of example only and that any number of plug-wire interconnections may be provided along with minus sign printing and special function indications.

In order to provide an example for a special function indication, the No 1 print magnet which is not connected in the thyratron matrix circuit has its entry terminal connected by means of a plug wire conductor 243 to the normally open side of contact R64*b*, located in the group of special function contacts 231. The operating point of this relay includes a plug wire conductor 244 which in turn is connected to the matrix exit hub for the No. 2 print magnet, for reasons to be hereinafter described.

As shown and as previously mentioned, when the special function signal is received by the printer at the terminal 149, Fig. 25*b*, the relay R36, Fig. 25*i*, is picked during the interval the cam contact C21A is closed;

345–320° machine cycle time, and this provides for energization of the relay R64 by means of a plug wire conductor 245 extending from the special function hub 228. Thus, it can be seen that when the special function signal is received and the relay R64 is energized, the contacts R64*b* are transferred and held by contact R64*a*, and in so doing wire the No. 1 print magnet to the No. 2 print magnet. With this arrangement, any impulse received at the No. 2 print magnet hub is paralleled to the first print magnet to cause printing of a duplicate value at this position on the paper 891. This indication may be supplied at any suitable or predetermined time interval. Here again the special function wiring arrangement is by way of example only, and it is to be understood the special function signal may not be used in the manner indicated but involves changes in the carriage control which is only incidentally included in this description.

Associated with each print magnet circuit is a zero relay coil R112, Fig. 25*j*, which is energized by the cam contacts C29A when closed at zero machine cycle time, 135–150°. When energized, this coil simultaneously transfers its associated relay contacts R112*a* through *n*, Fig. 25*i*, one of which is disposed in each print magnet circuit. In addition, a group of "N" relay contacts R147*a* through *n*, one each in each print circuit is operated by a relay coil R147 which is under the control of a cam contact C28A, Fig. 25*j*, timed to close at "N" machine time, 180–195° to transfer all of the associated relay contacts. Also connected in the print magnet circuits leading to the normally open points of each of the R147 contacts are "N" hubs 246, Fig. 25*i*, plug wired to oppositely disposed hubs to parallel connect the "N" hubs by means of a conductor 247 leading to a cam contact C145A which is also closed at "N" time along with the cam contact C28A, Fig. 25*j*. When cam contact C145A, Fig. 25*i*, closes, all contacts transferred by relay R147 and which are wired to the hubs 246, energize the wired print magnets 861 to release the clutch arms 887, Fig. 28*a*, for all ordered positions to provide for the printing of the numeric values transmitted from the calculator or a symbol, if desired. The exception to this is that the clutch 887 may be previously released at O, X or R time, Fig. 30, which will cause printing of a different value under certain conditions. Selenium rectifiers are connected across each print magnet, Fig. 25*i*, to prevent firing of the related gas tubes from the cathode side and to suppress a large negative inductive pulse which might cause a condition known as "cross talk."

During printer operation, the gas tubes in the matrix 24, Figs. 25*e* and 25*g*, are fired upon the coincidence of positive values at their control and shield grids, as described, in their timed digit cycle point relation. At 9 digit cycle point time the gas tubes representing the 9's conduct over their respective lines to energize the related print magnets 861, Fig. 25*i*, which in turn set up their respective analyzer mechanisms, Fig. 28*b*, as previously described, however, the type wheels 860 associated with these magnets are retained in their normal position. At the next digit cycle point, the gas tubes representing the 8's conduct to their respective magnets in a similar manner to set up their respective analyzers. The operations for all digit cycle points is similar or identical for all print magnets to the 0 digit cycle point position, with the exception of the No. 4 print magnet and others at 1 machine digit cycle point which are wired for sign printing.

In the print position reserved for sign printing, a minus (—) sign only is printed. For plus figures the position is left blank. If a potential is transmitted at 1 machine cycle point time to the sign position, this pulse is directed over the plug wire conductor 241 to the relay coil R181P, Fig. 25*i*. Energization of this or any coil in this group is possible because the cam contact C25A associated therewith is closed at 1 machine cycle point time to complete the coil circuit to the ground connection 236. When energized, coil R181P closes contact R181*b* and it is held closed by the hold coil R181H at the contact R181*a*. The hold coil circuit for the sign relays is conditioned by the cam contact C26A at 120–300° machine cycle time. Thus, with a pulse at any of the sign positions at 1 machine time the associated contacts are closed and are held closed by the associated hold relay. While the contact R181*b* is maintained closed, the No. 4 print magnet is not energized at this time because a cam contact C27A, which is made for 157–165° machine time, connected to the 40 volt supply and in series with the contact R181*b* is in its open circuit position. A minus (—) sign is physically located in such a manner on the type wheel 860 that an "X" impulse at 157–165° will cause the printing of "—". The contacts of relay R181 provide a circuit for this pulse from cam C27A and by plug wire to the proper sign position.

At 0 cycle point time, the zero relay coil R112, Fig. 25*j*, is picked to transfer all of its associated contacts in the magnet circuits to test for 0's and insure the printing of 0's at all points where they are desired, if no other data has been previously received, except that for the minus sign positions. This wiring is accomplished by plug wires 248, Fig. 25*i*, connected to control panel hubs 249.

As each magnet is pulsed for the first time by the print thyratrons, the clutch release arm 824, Fig. 28*a*, is rotated counterclockwise and in so doing releases a spring-pressed lever 250 whose outer end moves to transfer the associated zero print control contact 235, see also Fig. 25*i*. This contact transfer indicates that this particular print magnet has already been pulsed and bypasses any further pulses around the R112 contacts to ground over a conductor 251 prior to energization of the zero relay R112, Fig. 25*j*.

At "N" machine cycle time, which occurs at 180–195° machine cycle point time, the "N" relay R147 is picked by the cam contact C28A and transfers all the "N" relay contacts in the print magnet circuits, Fig. 25*i*, to connect the same through the control panel hubs 246 to the conductor 247 leading to the cam contacts C145A. This contact is connected to the 40 volt line and at 187° machine cycle time energizes all of the print magnets connected to the conductor 247 to release the clutches 887, Fig. 28*a*, to initiate the described numeric printing operation.

In this particular printer setup, the exception to the printing of identical numeric values in identical ordered positions delivered by the calculator is the minus sign value which was bypassed to the coil R181, Fig. 25*i*. As mentioned, upon the reception of the 1 impulse at the No. 4 matrix exit hub 230, the contact R181*b* was closed and held closed by its hold coil R181H. At 157–165° machine cycle time, representing "X" time, the cam contact C27A connected to the 40 volt line is closed and this represents a delay of approximately 60 machine cycle degrees from the time the 1 pulse was received. In addition, this represents a time interval of 30 machine degrees ahead of the "N" pulse supplied to the "N" relay coil R147, Fig. 25*j*. When the minus sign pulse is supplied to the associated print magnet, Fig. 25*i*, at 157°, it actuates its associated clutch to initiate rotation of the related print cam 885, Fig. 28*a*, prior to the rotation of the other print cams released at "N" machine time. This actually results in printing of the minus sign on the type wheel prior to the time the numeric 0 value on the wheel approaches the platen for printing.

As described, as the print wheel operation is initiated by the code cams in proper timed sequences, 150 machine cycle degrees after receiving the first impulse, the selected numeric value for each type wheel 860 approaches the platen in proper order and upon the delivery of the "N" pulse at 187° machine cycle time all of the magnets are energized simultaneously. This releases the clutches 887 to initiate rotation of the cam projection 883 on the cam discs 885 to cause printing of the selected numeric data when the cam 883 strikes the projection 884 on the print wheel arms 881.

The operation of the printer after receiving a special function signal would be the same as standard operation, however, in this instance, when the No. 2 print magnet, Fig. 25*i*, is energized, the same potential will energize the No. 1 print magnet through the special function selectors 231 to result in duplicate printing in that position as previously described. In this embodiment, the special function type wheels are not connected in the bit count circuit.

While the above description has been applied to printer A, the same identical arrangement is duplicated for printer B, therefore, the corresponding elements have been shown in block form in Fig. 25*j* with a B suffix and a further description of these elements is not deemed necessary. It is to be understood that when the contacts R74*a*, Fig. 25*e*, and others at each gas tube cathode circuit are transferred, the conduction is over associated transfer conductors 252 and B cable 253 to the B printer 234B, Fig. 25*j*, in an identical manner.

*Printer bit count generator and comparing*

Since it is desirable to insure that the data printed by the selected printer A or B agrees with the data transmitted by the calculator, the bit count comparing means 28 previously referred to is provided.

Referring now to Figs. 25*n* through 25*r*, there is shown a group of bit count relays 261 which are picked up according to the binary bit count of a digit or numeric value and sign and other control circuitry 262, Fig. 25*n*, to provide a means for generating a bit count for each ordered position of the printer wired in the circuit.

As mentioned in discussing Figs. 3*a* and 3*b*, each line of information is divided into seven words with seventeen ordered positions for each word and a bit count remainder is provided at position 1 in each word. Since the line is divided into seven words each with a separate bit count, there must be provided seven different groups of checking or bit count comparing means. Only word 1 of the bit count comparing means 28 is shown in detail and will be described. The remaining circuitry for words 2 to 7 is identical in construction and operation, therefore, they are shown in box form as items 263 to 268, inclusive, Fig. 25*m*.

In order to operate this checking means, several conditions must be met, one is that a circuit under the control of each print wheel must be completed and a decimal to binary bit count generating arrangement operated in timed sequence with the type wheel cycle points gates the pulses from the print wheel circuits at predetermined intervals to the proper bit count relays.

Referring first to the lower right-hand side of Fig. 28*a*, each detent or latch arm 896, whose upper end carries a hook to engage the shoulder 897 on the rotatable plate plate 898 carried by each type wheel gear 870, is also provided with an outwardly projecting arm or extension 269 having a contact engaging abutment end 271 disposed adjacent a normally open echo or print wheel contact 272. As shown in outline in Figs. 25*m* to 25*q*, there is one such contact for each ordered position, that is, 120 separate contacts. From Fig. 28*a* it will be obvious that as the operating link 863 is released and moves downwardly to the left, it engages the arm 864 and pivots the same at 866 to release the clutch arm 867 whereby the clutch pawl 876 engages a tooth in the clutch tube 868. When this occurs, the related type wheel gear 870 is rotated and in so doing, the surface 670 on the latch plate 898 rocks the contact engaging end 271 of the arm 896 in a clockwise direction to close the normally open contacts 272, see also Figs. 25*n* through 25*q*. It should be noted the closure of these contacts in their individual circuits will occur whenever type wheel gear movement occurs from 9 to 1 selector shaft cycle point time, Fig. 30. Also, these print wheel contacts 272 do not differentiate between selector shaft cycle points, but merely complete a circuit to indicate motion at some time interval. The bit count value for each numeric value is determined by switching to be described later.

Each print wheel contact 272 has one terminal connected to a separate print wheel exit hub 273, Figs. 25*n* to 25*q*, at the control panel. The opposite side or terminal of each contact is parallel connected by means of a conductor 274 leading to a cam contact C153A, Fig. 25*n*, connected to the 40 volt supply. This last-mentioned cam contact cyclically makes and breaks, in timed relation with the selector shaft clutch digit position release, and such movement, due to the analyzers 800A, B, C and D, occurs after a 150° machine cycle delay.

While not completely shown in the drawings, it is assumed each of the 120 print wheel contacts 272 has its exit hub 273 connected by a plug wire 275 to a corresponding bit count generating entry hub 276 in a manner identical to the plug wiring at the print magnet entry hubs 232, Fig. 25*i*, which in turn is identical to the serial position of the numeric data stored in the calculator. Thus, as shown, the No. 2 print wheel contact is wired to the No. 1 bit count generating entry hub 276, Fig. 25*n*, of word 1 by means of its related plug wire 275 with the others connected in a serial order to and including the No. 17 print wheel contact, Fig. 25*q*, which is connected to the No. 16 entry hub by means of similar plug wires.

The other ordered positions, Fig. 25*m*, are likewise connected in the same manner, that is, No. 18 print wheel contact is connected to the first ordered position for word 2, No. 35 contact to the first ordered position of word 3, No. 52 contact to word 4, No. 69 contact to word 5, No. 86 contact to word 6 and No. 103 contact to word 7. Thus each print wheel contact is included in a selected word. However, it is to be understood the particular wiring could be varied within each word as determined by the plug wiring. The particular printing arrangement is given by way of example only.

Each of the bit count generating entry hubs 276 includes a conductor 277 leading to a pair of parallel normally open gating contacts R658*a* through R658*p* and R661*a* through R661*p*, Figs. 25*n* to 25*q*. The contacts of relay R658 provide 1 bit gating and the contacts of relay R661 provide 2 bit gating. Extending from the operating point of each 1 bit gating contact is a conductor 278 leading to a related 1 bit relay pick coil which is adapted, when energized, to transfer a plurality of related 1 bit contact points in the bit count generating circuit 261. Likewise, a conductor 279 extending from the operating point of each 2 bit contact in the R661 relay leads to a related 2 bit relay pick coil which is adapted, when energized, to transfer a plurality of related 2 bit contacts in the same bit count generating circuit.

With printer A in operation, the parallel gating contacts for each bit count generating entry are closed at definite selector or print wheel digit cycle point times by means of the relay coils R658 and R661, Fig. 25*k*, which are series parallel connected to cam operated contacts C7A through C12A, inclusive. By referring to this latter figure, it can be seen the relay coil R658 for the related contacts, R658*a* through *p*, is connected to the 40 volt supply by a line 280 extending through the cam contacts C7A, C8A and C9A and the relay coil R661 for the contacts R661*a* through *p* is operated over a line 290 by cam contacts C10A, C11A and C12A. The first-mentioned cams are timed to energize the coil R658 and close all the related 1 bit contacts in the conductors 278, Figs. 25*n* to 25*q*, at 8, 7, 4, 2 and 1 selector shaft cycle point time, Fig. 31, while the latter-mentioned cam contacts are timed to energize the coil R661, Fig. 25*k*, and close all the related 2 bit contacts in the conductors 279 at 9, 7, 6, 5 and 3 selector shaft cycle point time. Thus it can be seen that during machine operation the above contacts for the two relays are closed at different selector shaft cycle point times, with the exception of at seven time, at which time all contacts for both relays are closed.

With an arrangement of this type, a decimal to binary bit count code is provided by the gating action of the relays R658 and R661 which in turn generates a bit count for each word based on that previously discussed.

Each contact, Figs. 25*n* to 25*q*, of the relays R658 and R661 is independently connected to a separate bit count relay coil, which is effective to transfer and hold a plurality of related contacts forming a portion of the bit count network circuit. By referring to the drawings for a specific example, if relay coil R288P, Fig. 25*o*, is picked it will actuate or transfer a group of 1 bit contact points R288*b*, *c*, *d* and *e* in the bit count circuit, and if relay coil R289P is picked, it will transfer a group of 2 bit contacts R289*b*, *c*, *d*, *e* and *f* in the 2 bit count circuit. This pair of groups of contacts, as well as all other pairs, are interconnected at various contact points and to other identical groups to provide the modulus 4 checking to be hereinafter described. With the exception of the bit count contacts in the first ordered position of each word, all of the other relays are identical in wiring, both internally and externally, therefore, for simplicity only the circuitry for one, where feasible, will be described.

Referring to the No. 2 bit count entry hub, Fig. 25*n*, the conductor 277 leads to the pair of contacts R658*b* and R661*b*. In this arrangement, the contact R658*b* is in the 1 bit line 278 and the contact R661*b* is in the 2 bit line 279. Thus, at 8, 7, 4, 2 and 1 selector shaft or print wheel time, contact R658*b* is closed upon energization of coil R658 by cam contacts C7A, C8A and C9A, Fig. 25*k*. This represents a 1 bit for these numeric values. At 9, 7, 6, 5 and 3 selector shaft cycle time, the contact R661*b*, Fig. 25*n*, is closed upon energization of coil R661 by cam contacts C10A, C11A or C12A, Fig. 25*k*. This represents a 2 bit value for the numeric values. From the above, it will be noted that at 7 selector shaft cycle time both contacts R658*b* and R661*b* are closed and this represents a bit count of 3.

Extending from the contact R658*b*, Fig. 25*n*, the conductor 278 leads to a 1 bit pick coil R273P, and from the contact R661*b*, the conductor 279 leads to a second or 2 bit pick coil R274P, both of which, as well as all similar coils, are connected to ground through a conductor 281. The pick coil R273P, when energized, transfers a group of four contacts R273*b* to R273*e*, inclusive, and the pick coil R274P transfers a group of five contacts R274*b* to R274*f*, inclusive.

The above contact points are connected in the following manner to provide four parallel lines 282, 283, 284 and 285 representing remainder lines based on a modulus 4 having 0, 1, 2 and 3 bit count values, respectively. As shown, a conductor 286 parallel connects the first ordered position of each word at the operating point of the zero line 282 to cam contacts C5A or C5B through transfer contact R744*a*. The normal zero bit count line 282, starting from the operating point of contact R271*b* is connected in series with all of the operating points of the *b* contacts by means of the normally closed *b* points and this zero line 282 is divided to terminate at normally closed bit count comparing contact R321*b* and normally open bit count comparing contact R322*c* at the right-hand side of Fig. 25*r*. These latter two contacts are in the bit count comparing circuit 28 for word 1 and are capable of being transferred by firing of the related bit count thyratrons 91 and 92, Fig. 25*g*, respectively.

The 1 bit line 283 begins at the normally open contact R272*b*, Fig. 25*n*, extends parallel to the 0 bit line 282 in series through all of the *c* operating points and normally closed *c* contacts of the bit count contacts and is divided to terminate at the normally open bit count comparing contacts R321*b* and R322*d*, Fig. 25*r*.

The 2 bit line 284 begins at the normally open contact R271*b*, Fig. 25*n*, connects through the operating point and normally closed contact R272*c* and in series with all the *d* operating points at the normally closed *d* contacts and is divided to terminate at the normally closed bit count comparing contacts R321*c* and R322*c*, Fig. 25*r*.

The 3 bit line 285 begins at the normally open contact R272*c*, Fig. 25*n*, and extends in series through all of the *e* operating points and normally closed *e* contacts and is divided to terminate at the normally open bit count comparing contact R321*c* and normally closed bit count comparing contact R322*d*, Fig. 25*r*.

The two bit contact groups each include an *f* contact which has its operating point connected through a conductor 287 back to the normally open *e* contact of the same order position, and the normally closed side of each *f* contact is directly connected to the 0 bit line 282. The normally open *f* contacts are each connected by a conductor 288 to the *d* operating point of the transfer contact in the 1 bit relay group of the next ordered position to the right.

The contacts of each 1 bit group are interconnected. Taking one 1 bit contact group as an example, the normally open contact of relay R273*b* is connected to the normally closed contact of R273*c* at the 1 bit line, the normally open contact of R273*c* is in turn connected to the normally closed contact of R273*d* in the 2 bit line, its normally open *d* contact is connected to the normally closed contact of R273*e* in the 3 bit line and its normally open *e* contact is in turn connected by the conductor 287 to the operating point of contact R274*f* in the next group of relays, which represent the 2 bit group for the same ordered position. Thus, the contacts R273*b*, *c*, *d* and *e* are each connected from their normally open contacts to the bit count line of the next higher value. In this manner, if the contacts are transferred, the test pulse arriving at this group of contacts is automatically transferred to the next higher bit count line. For example, at transfer, if the 0 bit line 282 is conducting to this group, the circuit is completed to the 1 bit line 283; if the 1 bit line 283 is conducting, the circuit is completed to the 2 bit line 284; if the 2 bit line conducts, it is completed to the 3 bit line 285; and if the 3 bit line is conducting, the transferred contact R273*e* completes the circuit to the zero line 282 at the normally closed contact R274*f*.

The group of contacts in each 2 bit group are jump or cross-connected. For example, normally open contact R274*b* in the zero line 282 is directly connected to the parallel extending 2 bit line 284; the normally open contact R274*c* in the 1 bit line 283 is directly connected to the parallel extending 3 bit line 285; normally open contact R274*d* in the 2 bit line 284 is connected to the parallel extending zero line 282; normally open contact R274*e* in the 3 bit line is connected to the parallel extending 1 bit line 283; and normally open contact R274*f* is connected over the conductor 288 to the 2 bit line 284 leading to the next ordered position.

Thus, it can be seen that when the 2 bit relay R274P is energized, all the related contacts *e* through *f* are transferred and in so doing connect the checking circuit to advance any completed bit count line by 2. For example, if the net bit count of the preceding ordered position is 0, the transfer of the R274*b* through *f* contacts completes a circuit from the transferred contacts R274*b* to the 2 bit line 284; if a 1 bit count, it connects the transferred contact R274*c* to the 3 bit line 385; if a 2 bit count, the transferred contact R274*d* is connected to the 0 bit line 282; and if a 3 bit count, the transferred contact R274*e* connects the 1 bit line 283.

Should both relays R273 and R274 be picked simultaneously, indicating a decimal 7 value or 3 bit count, both groups of related contacts are closed to provide a bit count advance of 3. In the example, if the net bit count of the preceding ordered position is 0, the transfer of the R273 and R274 contacts completes the bit count circuit from the transferred contact R273*b* over the 1 bit line 283 to the operating point of contact R274*c* and through the transferred point directly to the 3 bit line 285; if a 1 bit count, the circuit is completed from the 1 bit line 283 over the transferred contact R273*c* to the 2 bit line 284 across this line to the operating point of contact R274*d* and transferred contact to the 0 line 282; if a 2 bit count, the circuit is completed from the 2 bit line 284 over the transferred contact R273*d* to the 3 bit line 285, across this line to the operating point of R274*e* and transferred contact to the 1 bit line 283; if a 3 bit count, the circuit is completed from the 3 bit line 285 over the transferred contact R273*e* to the conductor 287 leading to the operating point of contact R274*f*, across this transferred contact and over the conductor 288 to the 2 bit line 284 at the next ordered position to the right.

With respect to relays R271 and R272 disposed in the first ordered position of the first word, it is to be noted the order position in the checking circuit has been reversed, that is, a single contact R271*b* is connected in the zero line at its operating point and normally closed point. This represents the 2 bit circuit for this ordered position, and the normally open contact is connected to the 2 bit line 284. Thus, when transferred, this contact completes the circuit to the 2 bit line 284. The relay R272 includes a pair of transfer contacts R272*b* and R272*c*, contacts R272*b* being normally connected in series with the zero line 282 and when transferred connects to the 1 bit line 283. The contact R272C when normally closed is connected in series with the 2 bit line 284 and when transferred to the 3 bit line 285.

From the above it can be seen the groups of contacts for each ordered position in the bit count checking circuit are connected in cascade and cross-connected to provide bit count remainder checking or network circuits which are based on a modulus 4 to agree with the bit count modulus utilized in the calculator. This, as mentioned previously, involves the dropping of every bit count divisible by 4 and conducting the remainder to the bit count comparing relays over the proper bit count lines.

Since all of the remaining bit count checking relays and contacts for each ordered position are identical in construction, operation and wiring, a detail description of the others is not deemed necessary. Also, while only word 1 has been shown and described, it is to be understood the remaining words 2 to 7, items 263 to 268, respectively, Fig. 25*m*, are identical in construction and operation.

Since each ordered position includes a pair of relays, it is obvious the bit count generating or checking circuit for one word involves a total of thirty-two separate relays, half of which are picked on the 1 bit signal and the other half are picked on a 2 bit signal. In addition, each group of checking relays for each word includes two more relays wired for 1 bit operation. These two relays, for word 1, comprise pick coils R318P and R319P, Fig. 25*r*, each of which is directly connected to a minus sign entry hub 291 by a separate conductor 292. These hubs provide the means for entering the minus sign value of 1 bit to the bit count circuit.

As described, the pulse indicating a minus sign and directed to the No. 4 print magnet is bypassed at 1 machine digit cycle time to the minus sign entry relay R181P, Fig. 25*i*, by the control panel plugging, thus the No. 4 print wheel is not rotated at the proper time to close its related print wheel contact 292 for proper picking of R276P, Fig. 25*n*. Under these conditions, the pair of relays in the No. 4 position in each word stay normal thus indicating a 0 bit count. However, since the minus sign was included in the calculator bit count as a numeric value of one, this sign must be converted and included as a 1 bit in the printer bit count checking circuit. To accomplish this, a plurality of minus sign exit hubs 293 are provided, as shown in the upper right-hand side of Fig. 25*r*. These minus sign exit hubs 293 are connected by plug wires 294 to the bit count minus sign entry hubs 291 in each word as required. In this embodiment, fourteen separate minus sign exit hubs are utilized in order that two minus sign values can be applied to each word, if desired. Since these exit hubs are identical, only two positions, 1 and 14, are shown. Each exit hub is connected to a normally open contact R181*c* through R194*c* which is operated by a related relay in the group of sign relays and the opposite sides are paralleled by means of a conductor 295 to a cam contact C20A.

Assuming the conditions previously set up, when the minus sign entry relay R181, Fig. 25*i*, is picked, this closes the contact R181*c*, Fig. 25*r*, leading to the No. 1 minus sign check exit hub 293 which in turn is plug wired to the bit count checking circuit at the hub 291. At 275–287° machine cycle time, the cam contact C20A closes and during this interval if any of the minus sign relays are closed, for example R181*c*, a pulse is directly applied to the pick coil R318P to transfer its related contacts, R318*b* through *e*, to raise the bit count checking circuit by 1 bit value. This is the value assigned by the calculator to a minus sign. Thus, this compensates for the 0 bit count value applied to the No. 4 ordered position bit count generating relays R276 and R277 due to the bypassing of the 1 pulse at the No. 4 print magnet 861, Fig. 25*i*, at 1 machine cycle time.

As mentioned, the 0, 1, 2 and 3 bit lines are connected to the bit count comparing contacts R321*b*, R321*c*, R322*c*, and R322*d*, Fig. 25*r*. The operating points of these contacts in turn are directed to the contacts R321*d* and R322*b* in the following manner: Operating point of R321*b* is connected to the normally closed contact R322*b*; operating point of R321*c* is connected to the normally open contact of R322*b*; operating point of R322*c* is connected to normally open contact R321*d*; and the operating point of R322*d* is connected to normally closed contact R321*d*. The operating point of R322*b* connects to the normally open contact R323*a* and the operating point of R321*d* connects to the normally closed contact R323*a*, whose operating point in turn is connected by means of a conductor 296 to a bit count check relay pick coil R324P. In the example shown for word 1, the relay pick coils R321P and R322P, Fig. 25*g*, are connected in series with the bit count gas tubes 91 and 92 disposed in the first word line and are energized in accordance with the bit count transmitted from the calculator.

The hold coils H for all the bit count generating contacts for each word, as well as those for all the bit count comparing contacts are assembled in a group 297, Fig. 25*k*. These holds coils each include a related "*a*" contact as listed to provide the holding means when energized by their respective pick coils. These hold coils all have one side commoned to a conductor 298 leading to ground and the other side of each "*a*" contact is paralleled to a conductor 299 connected to the operating point of a transfer contact R742*b*. For printer A operation, the last-named contact is normally closed and is connected in series with a print A cycle contact R43*d* leading to a cam contact C16A. This cam contact is closed from 105–315° machine cycle time and provides the means for completing the circuit for any of the hold relays H when its respective "*a*" contact is closed by its related pick coil P, Figs. 25*g* and 25*h*.

For the purpose of reducing the total number in this array of hold coils, Fig. 25*k*, only the first hold coil of each word is shown, that is, coil R271H is the first relay of the first word. While not shown, all of the remaining thirty-five hold coils for the bit count generating circuit of word 1 shown in Figs. 25*n* to 25*r* would be included in this array. The hold coil R36H represents the first bit count generating hold coil of the second word, R381H the first coil of the third word, R436H the first coil of the fourth word, R491H the first coil of the fifth word, R546H the first coil of the sixth word and R601H the first coil of the seventh word.

As for the fourteen calculator bit count comparing hold relays required, only one of the two required for each word is shown. For example if both coils R321P and R322P, Fig. 25*g*, pick, it will close its contact R322*a*, Fig. 25*k*, to energize the hold coil R322H in the group 297 of hold coils as well as an identical hold coil in the same group, not shown, for the coil R321P. The remaining hold coils in this column are the calculator bit count comparing hold coils for the remaining words in the order given, that is, R377H represents word 2 and R652H represents the calculator bit count comparing hold coil for word 7. When transmitted, each word picks its respective calculator bit count coils, as described for word 1.

In Figs. 25*m* and 25*r*, at the lower right-hand side of each word is a bit count check relay pick coil. The coil R324P, Fig. 25*r*, is connected to the exit of the bit count checking circuit for word 1, R325P, Fig. 25*m*, to word 2, R379P to word 3, R380P to word 4, R434P to word 5, R435P to word 6 and R489P to word 7. The hold coils H for each of these words is shown in Fig. 25l. Since the hold coils for each word operates in an identical manner, the following description will be confined to operation in word 1 only.

Assuming the previously discussed operating conditions wherein the data is transmitted to the A printer in the order given in Figs. 3*a* and 3*b*. As mentioned, these binary values are transmitted to the translator 15, Fig. 25*c*, changed to decimal values at the proper machine digit cycle time and conducted to the appropriate gas tube in the matrix 24, Fig. 25*e*, which in turn conducts, when fired, to operate its related print magnet 861, Fig. 25*i*, to set up the code rods 800A, B, C or D in the printing mechanism 237, Fig. 28*b*.

After a machine cycle delay of 150°, the appropriate print wheels, Fig. 28*a*, are released by their respective selector clutches to initiate the printing operation. Also, as mentioned, the print wheel 860 for each ordered position begins its rotation at the selected digit cycle point time, that is, the ordered position printing the 9 will begin rotating at 150° machine cycle time, the 8 at 165° or 15° later and so on to the 0 digit cycle time.

In the numeric example given for word 1, Fig. 3*a*, it is noted the seventh and sixteenth positions are to print numeral 9, thus the type wheel rotation for these two positions is initiated at 150° machine cycle time, Fig. 30. As these type wheels begin to rotate, Fig. 28*a*, due to engagement of the related selector shaft clutch 868, the two echo or print wheel contacts 272 are momentarily closed. Upon closure of these contacts, the cam contact C153A, Fig. 25*n*, is also closed at 9 selector shaft contact time, Fig. 30, to complete a circuit from this cam contact through the conductor 274, Fig. 25*n*, the two parallel closed print wheel contacts 272 and through their respective exit hubs 273 and plug wires 275 to the related bit count entry hubs 276 at the sixth and sixteenth ordered position for word 1, over their conductors 277 to the gating contacts R658*f* and *o* and R661*f* and *o*, Figs. 25*o* and 25*q*, respectively.

As mentioned, the cam controlled contacts C7A through C12A, Fig. 25*k*, for the gating relays R658 and R661 are closed in a predetermined manner to gate the pulse either as a 1, 2 or 3 bit value and the determination of this value depends upon the timed closure of these contacts. In this particular instance, at 9 selector shaft time the relay coil R661 is energized, thus all of the related contacts *a* through *p*, Figs. 25*n* through 25*q*, will be closed and thus gate for a 2 bit value. With the R661 relay points closed, the related conductors 279 energize coils R286P, Fig. 25*o*, and R313P, Fig. 25*q*, to transfer all of their related contacts *b* through *f* from their normal position. This transfer of contacts represents a 2 bit value in the bit count circuit at the related positions. The 1 bit relays for these ordered positions remain normal throughout the remainder of the cycle and hus have no effect on the bit count. Both of the groups of transferred 2 bit contacts are held by their related hold coils H at their "*a*" contacts, not shown, and would be included in the hold group 297, Fig. 25*k*. Holding of any closed "*a*" contact in this group is provided by closure of the cam contact C16A at 105–315° machine cycle time, which completes the hold circuit over the conductor 299.

At the next or 8 digit cycle point time, the 8 in order position 2 in the word, Fig. 3*a*, is transmitted in an identical manner and upon rotation of the related print wheel 860, Fig. 28*a*, the related print wheel contact 272 for this ordered position is temporarily closed in an identical manner. This directs a pulse to the No. 1 check entry hub, Fig. 25*n*, and is gated to the pick coil R272P over the conductor 278 as the contact R658*a* is closed upon energization of the relay coil R658, Fig. 25*k*, by the closure of cam contact C7A at 8 selector shaft time. The closure of the R278 relay represents a 1 bit value and thus the 8 having a 1 bit count, results in the transfer of the R272 contacts *b* and *c*, Fig. 25*n*, in the bit count circuit. Upon closure, these contacts are held in their transferred position by the related hold coil, Fig. 25*k*, as previously described for the 9 position.

As the digit 7, shown in ordered positions 8 and 15 of the example given, Fig. 3*a*, are transmitted from the calculator and type wheel motion is initiated at the proper time, both of the gating relay coils R658 and R661, Fig. 25*n*, are energized and all of their related contacts are closed. With both gating relays closed, the pulse transmitted to the seventh and fourteenth ordered position of word 1 picks the coils R288P and R289P, Fig. 25*o*, and R309P and R310P, Fig. 25*q*. This transfers both pairs of bit count contacts in both ordered positions to set up a 3 bit value upon closure of their respective hold coils as previously described.

The remaining numeric values 6 through 1 have their bit count contacts set up in an identical manner as described for the 9 and 8 values.

At 2 digit cycle point time when the entire line of data is again delivered to the translator 15, Fig. 25*c*, the bit count value of 2, which is a 3's complement of the 1 bit count, is transmitted as the first data from the calculator in the form of a pulse. This pulse fires the 2 bit count gas tube 92, Fig. 25*g*, which in turn energizes pick coil R322P to transfer its related contacts R322*b*, *c* and *d* at the bit count comparing end of the cascaded bit count relays, Fig. 25*r*. At the time of contact transfer the associated hold coil R322H disposed in the group 297, Fig. 25*k*, is also energized. Thus, as relay contacts R322*b*, *c* and *d* transfer, a calculator bit count checking circuit is established to test whether the data to be subsequently printed agrees with that transmitted. Since a numeric 0 has a zero bit count, the bit count contacts in the ordered position representing a "0" will remain normal. At 275–287° machine cycle time a circuit is completed by cam C20A to enter any minus sign in the word as a 1 bit value, Fig. 25*r*.

After all data is transmitted to the printer and prior to the printing operation, the cam contact C5A, Fig. 25*n*, is closed at 285–310° machine cycle time and applies a bit count check or test pulse through the printer A cycle, contact R61*b* the normally closed contact R744*a* and over the conductor 286 to the operating point of contact R271*b* on the "0" line 282, which represents the first ordered position for word 1. This line 286 also applies the same pulse to the other words at the same location, Fig. 25*m*.

In the word 1, set forth in the example shown in Fig. 3*a*, the various numeric values for the ordered position for this word have been diagrammatically set forth in the following manner to describe the operation of the bit count checking circuit. At the time of receiving the check pulse upon closure of cam contacts C5A, Fig. 25n, the 1 and 2 bit contacts for word 1 have been set up and those involving 1, 2 or 3 bit values have been transferred while the others involving 0 bit values remain normal.

Under this particular set up, the relays and associated contacts R272, R273, R276, R279, Fig. 25n, R282, R285, R288, R291, Fig. 25o, R294, R297, R300, R303, Fig. 25p, R306, R309, R312, R315, Fig. 25q, R318 and R319, Fig. 25r, represent 1 bit values and the relays and associated contacts of R271, R274, R277, R280, Fig. 25n, R283, R286, R289, R292, Fig. 25o, R295, R298, R301, R304, Fig. 25p, R307, R310, R313 and R316, Fig. 25q, represent 2 bit values.

Thus, with the setup as given at bit count check time, the test circuit to the comparing contacts of relays R321 and R322, Fig. 25r, is completed from the line 286, Fig. 25n, normal conctact R271b, transferred contact 272b to the 1 bit line 283, normal contact R273c and transferred contact R274c to 3 bit line 285, across normal contacts R276e and R277e to transferred contact R279e which leads over the conductor 287 to the normal contact R280f back to the 0 bit line 282, extends along this line through normal contacts R282b, R283b, R285b, Fig. 25o, and is transferred at R286b to the 2 bit line 284. From this point, the circuit continues through the transferred contact R288d to the 3 bit line and over transferred contact R289e back to normal contact R291c and transferred contact R292c, which leads to normal contact R294e, Fig. 25p, in the 3 bit line 285. From this point, the circuit continues through transferred contact R295e across the conductor 283 to the transferred contact R297c which connects to the 2 bit line 284, through normal contact R298d and transferred contact R300d and normal contact R301e to normal contact R303e. Continuing on the 3 bit line 285, the circuit extends through the transferred contact R304e, via line 283 to the normal contact R306c, Fig. 25q, and transferred contact R307c at the 1 bit line. From this point the circuit is jumped to the transferred contact R309e which leads over the conductor 287 to transferred contact R310f. The conductor 288 from this point is directed to the normal contact R312d in the 2 bit line 284 and extends over the transferred contact R313d to the normal contacts R315d and R316d in the 0 bit line. From this point via line 282 the circuit is completed through the transferred contact R318b, Fig. 25r, indicating the minus sign bit count and over the normal contact R319c which is in the 1 bit line 283. Comparison of this line may take place at contacts R321b or R322d, depending on the comparing relays picked.

Thus, it can be seen that with any combination of numeric values, a checking network is provided which will cast out all bit count values divisible by 4 and return the circuit to the 0 bit line based on a modulus 4 and direct any remainder over the appropriate bit count line. However, it is to be understood the particular checking network shown may be readily modified by increasing or decreasing the number of relay contacts to provide different modulus values. In fact, with the proper number of relays a modulus may be readily set up to handle numeric values rather than bit count values.

In the numeric example given for word 1, the actual bit count remainder, based on the modulus 4, is a 1 and this provides a pulse at the exit side of the 1 bit line 283. With the contacts R322b, c and d transferred, it can be seen this pulse is directed through the transferred contact R322d and the normally closed contact R321d which in turn is directed to the normally closed contact R323a over the conductor 296 to pick the relay coil R324P. As this coil picks, it transfers its contacts R324a and b, Fig. 25l, whose latter normally open point along with similar open points, is connected to the normally open contact R323d of a manual check stop relay by means of a conductor 301. The operating point of the contact R324b, as well as all the other checking contacts for the other six words, is connected to a conductor 302 leading to the operating point of a transfer contact R761b, whose normally closed side is connected to a cam contact C4A, and whose normally open side leads to a cam contact C4B. Both cam contacts close at 295–305° machine cycle time to complete a bit count test hold circuit.

If the bit counts transmitted from the calculator agree with the actual bit count remainders generated in the printer, all of the checking contacts in the column starting with contact R324b transfer and as cam contact C4A closes at 295–305° machine cycle time an open circuit at the normally open contact R323d is presented. Thus, the check stop contact R14a, Fig. 25b, remains in its normal position, this signifies a correct bit count and the printer operation is permitted to continue.

Assuming a correct bit count comparison in words 2 to 6 and if in word 1, for example, an error develops due to improper setting of the bit count contacts or improper movement of the type wheels, the test circuit through the word 1 bit count contacts will come out on on of the other bit count lines, rather than the 1 bit line 283. However, with comparing contacts R322b, c and d, Fig. 25r, transferred only the 1 bit line can complete the comparing circuit, therefore, the check pulse supplied over the conductor 286 prior to the printing operation can not get across or through the comparing contacts to the conductor 296. Thus, the relay coil R324P does not pick to transfer its contact R324b, Fig. 25l. Since these contacts remain in their normal positions when the error test circuit is closed, at 295° machine cycle time, at the cam contact C4A over the line 302, a potential or pulse is applied across the normally closed contacts R324b and conductor 303 leading to the normally closed contact R323d to pick coil R738P in a conductor 304. Energization of this coil closes contact R738b to supply a potential to the group 305 of bit count check hold coils. Thus all contacts in the checking group which were transferred are so held while the contact R324b stays normal.

At the same time that the coil R738P is energized, a conductor 306 secured to the conductor 304 directs the pulse through normally closed contacts R742a and R774e to pick the bit count error coil R773P. As this occurs, a circuit is completed to hold coil R773H over conductors 307, Fig. 25m, through a switch 323 and conductor 308 to hold contact R773b closed, Fig. 25l. As check stop relay coil R738P operates, contact R738a at hold coil R738H completes a circuit 309 from the conductor 308. Upon closure of this contact R738a, a circuit 310 extending from a terminal 311 on the ground side of contact R738a through normally closed contact R781d to relay RWE5 is completed. When energized, this coil transfers the contacts of a mercury relay WE5, Fig. 25k, to supply a 40 volt potential directly across a line 312 and the conductor 299 to all of the hold relays 297 in the bit count generating and comparing circuits so that the error may be quickly traced to the point of failure. Thus, the normal cam contact C16A for these hold coils is shunted. At the same time the circuit 310, Fig. 25l, is completed at contact R738a, a circuit to the control panel lights is completed from the terminal 311 over a conductor 313. Since contact R773b is held closed and contact R324c stays normal, in the operation given, the energization of the error lights 314 and 315, respectively, indicates the error as being in the A printer at word 1.

Upon energization of the printer A error coil R773, Fig. 25l, contacts R733d, Fig. 25m, close and in so doing complete a circuit from the conductor 308 through normally closed contact R781b to energize printer stop magnet R10 to stop the printer operation in any suitable manner, by opening the necessary print drive circuits, not shown.

As printer A bit count error coil R773P, Fig. 25l, picks and transfers its related contacts, its contact R773*c*, Fig. 25*m*, is also closed and in so doing completes a circuit from the conductor 307 tied to the 40 volt line to a conductor 316 which carries a printer check light 317 to energize the same. Extending from the conductor 316 ahead of the light 317 is a conductor 318 leading to the normally closed contact R781*a* whose opposite side is parallel connected by a line 319 to a pair of relay coils R14 and R38. These are the printer check stop and bit count check coils, respectively. Thus when coil R14 is energized, the contacts R14*a*, Fig. 25*b*, are transferred to interrupt further flow of data from the calculator and at the same time, the normally closed contacts R38*c* and R38*d* are opened at the print test circuits 138 and 139, respectively, to prevent the conditioning of the diode switches 157 and 158, respectively. This thus supplies a double check against the delivery of data from the calculator. This hold circuit is maintained in this position until the error has been corrected and the circuits reset as hereinafter described.

As mentioned previously, the actual bit count in the bit count checking network is compared with the complement bit count delivered from the calculator at the contacts for the bit count comparing relays R321 and R322, Fig. 25*r*. Under some conditions, it may be desirable to check the actual bit count and to modify the bit count network to a degree in case some of the contacts are not functioning properly. To accomplish this, a plurality of relay coils, only two of which are shown, R323 and R378, Fig. 25*l*, are plug wired at a hub 321 leading to the 40 volt supply. This manual plugging of the relays picks the coils, one for each word, to transfer its respective "*a*" contacts to invert the output of the bit count comparing circuitry and provide an actual bit count check. In the example given for word 1, as relay coil R323 picks, contacts R323*d* in the test check lines 301 and 303 are transferred and at the same time contacts R323*a*, Fig. 25*r*, are transferred to open the normal comparing circuit for the bit count complements. Thus, under these conditions, at the time the check pulse for the 1 bit is directed to the comparing relays if the bit count is correct, the relay coil 324 remains unpicked or de-energized and at print check time when cam contact C4A closes, Fig. 25*l*, the circuit is left open by the previous transfer of contact R323*d* and printer operation continues as previously described. However, if a bit count error is indicated, relay R324 is operated to transfer its contacts R324*b*, Fig. 25*l*, which completes the circuit to the check stop coil R738P at checking time to stop the printer operation in an identical manner. This manual plugging bit count test is primarily provided to change the bit count lines for testing over a different circuit in case of improper operation and provides an effective means to determine if the error developed actually occurred in the bit count checking circuits.

*Printer control and transfer contacts*

Assuming the ST1 and ST2 switches, Fig. 25*m*, are closed, relays R1 and R741 are energized. Energization of these relays closes contacts R1*a* and **R741*d* in a conductor 322 leading through parallel contacts R779*a*** and R780*a* to the paralleled printer operative relay coil R13 and its hold coil R780. When this occurs, the printer operative circuit is conditioned for operation. At the control panel, there is provided, in addition to the various signals or indicating lights, a printer check reset switch 323 and a print check suppress switch 324.

In order to condition the printer for the reception of data, the check reset switch 323 must be momentarily depressed. This opens the circuit to the conductor 308 to automatically release all of the hold coils in the checking circuit to return all the affected contacts to normal. As the hold coil R738, Fig. 25*l*, drops out, the check stop circuit 310 is de-energized and the mercury contacts WE5, Fig. 25*k*, are transferred out of the circuit to again place the related hold coils under the control of the cam contacts C16A or C16B. This action also connects the 40 volt line 307, Fig. 25*m*, to a conductor 325 leading to a pair of parallel relay coils R44 and R779 to energize the same. Upon energization, normally closed contact R44*b*, Fig. 25*l*, is opened to de-energize relay coil RPSI and such action permits contact RPSI*a*, Fig. 25*f*, in the negative 100 volt circuit to open and contact RPSI*b* in the positive 150 volt circuit to close to thus apply a positive 150 volt potential across the conductors 219, 218 and 217, respectively, the latter of which is connected to all of the triggers and resets them in their Off position, except the bit count trigger T2–BC which is reset On. This then conditions this portion of the printer for the reception of data. At the same time, the relay R779, Fig. 25*m*, closes contact R779*a* in the printer operative circuit to energize the parallel connected relays R13 and R780. When energized, relay R780 provides a holding circuit for relay R13 at its contact **R780*a* and R13 transfers the contact R13*b***, Fig. 25*b*, to signal the calculator the printer is now operative. However, various other circuits and conditions must be checked before the printer is ready to receive the data.

When the printer check reset contact or switch 323, Fig. 25*m*, is depressed resetting all of the triggers, relays and the like, all of the contacts are permitted to return to their normal operating positions for the reception of the next line of data to be delivered after the printer A and printer B selection has been made and the various related contacts are properly set up for the reception of the data.

Since the translator 15, Fig. 25*c*, the matrix 24, Figs. 25*e* and 25*g*, and the bit count circuitry 28, Figs. 25*n* to 25*r*, are common to both printers, provision must be made to prevent the acceptance of additional data from the calculator before the completion of a current printing operation.

Certain relays are common to both printers and must be conditioned before the specific relays are operative. This involves the printer operative relay R13, Fig. 25*m*, check stop relay R14, bit count check R38, incomplete scan relays R775 and R778, Fig. 25*f*, trigger reset relay RPSI, Fig. 25*l*, space suppress contacts **R26*c* and *d***, Fig. 25*j*, check stop relay R738, Fig. 25*l*, check reset relay R44, Fig. 25*m*, printer check reset relay R779, printer check suppress relay R781, hold relay R780, start relays R1 and R741, the related comparing relays R321, R322, Fig. 25*g*, and others listed for each word along with checking relays R324, Fig. 25*r*, and all similar relays in the bit count generating circuits.

The selection or setup of the individual printers is taken care of by the "print A" relays or the "print B" relays, according to which of the printers is operated. The print A cycle relay coils R61P, Fig. 25*d*, R61H and R43, Fig. 25*j*, pick up at the beginning of a cycle and hold until 330° of that cycle. Note that these relays can not pick up unless print A relay R39, Fig. 25*b*, is energized and contact R39*c*, Fig. 25*d*, is closed, contact R102*h* is normal and the cam contact C1A is closed at 345° machine cycle time. Relay coil R39 is picked up during the time the print A trigger 145, Fig. 25*b*, is On. Relay contact **R102*h* is a point of a print B relay R102**, Fig. 25*d*, which, when picked, prevents the energizing of the print A relay R61 until the completion of a print B cycle. As printer A selection is made and the relays R43, Fig. 25*j*, and R61, Fig. 25*d*, operate, this action closes contact R43*c*, Fig. 25*b*, in the checking circuit 138, closes contact R61*a* to provide the hold for the coil R61H, Fig. 27*j*, closes contacts **R61*j* and R61*h*** in the zero and "N" circuits, respectively, closes contacts R43*d*, Fig. 25*k*, in the conductor 299, leading to the bit count hold coils 297, closes contacts **R61*e***, Fig. 25*l*, in the conductor 302 for the checking relays and closes contacts **R61*b***, Fig. 25*n*, in the conductor 286 leading to the cam contact C5A for the bit count test pulse circuit.

Thus, when the above contacts have closed along with proper setting of the above-mentioned common relays and either relay R106 or R107, Fig. 25*b*, has been operated, the A printer is ready to receive the data when it reaches 9 machine digit cycle time. Operation of the B printer is prevented by means of the opening of contacts R61*f*, Fig. 25*b*, leading to the 40 volt supply through a resistor 335, to be described later. At the end of the printer A cycles, all of the above relays return to normal and open or close their respective circuits until the next instruction from the calculator is received.

During printer A operation, if an error in the bit count circuit develops and the circuit 306, Fig. 25*l*, is completed at contact R323*d*, the printer A bit count error relay R773P is picked through the closed contacts **R742*a*** and R774*e*. In addition to the contacts previously mentioned, a normally closed contact R773*e* in the parallel circuit leading to printer B bit count error relay R774P is opened. This contact R773*e* is used to prevent the energizing of the printer B bit count error relay R774P. This is necessary when a printer B operation has been programmed immediately after the printer A operation. If an error had occurred during the printer A operation, printer B circuits would be conditioned for printing and the resulting print B cycle would cause the print B relay R774P to pick up even though printing had been suspended upon the closure of contact R773*d*, Fig. 25*m*, which energizes the nonprint relay R10.

In order to provide for printer B operation, somewhat similar circuitry is used in the picking up of printer B relays. Turning On of the print B trigger 148, Fig. 25*b*, applies a positive potential over the line 167 to the grid of a power amplifier 330 which operates to pick up relay R40. The positive output of the print B trigger is also fed to the cathode follower 154 which conditions one element of the 4 element diode switch 158 over the conductor 156 and one element of a 2 element diode switch 336 over the conductor 167. The other element of this diode switch is normally under a negative 50 volt bias through a resistor element 337 to prevent operation and is conditioned to a positive level only when contact R61*f* is closed and this contact is closed only when printer A has completed its print cycle.

If printer B is to operate, the circuit is conditioned as mentioned above and at the end of printer A operation, the contact R61*f* returns to normally closed, which applies a positive potential to the second element of the diode switch 336 to cause the same to conduct. The output of this switch fires a PA2 power amplifier 338 which in turn picks up a coil RWE1 in a conductor 339 connected to the 125 volt conductor 174. Energization of this relay transfers the contacts in a mercury switch relay RWE1, Fig. 25*d*, connected to a conductor 340 leading to the 40 volt line and picks up a large number of parallel relays shown in the two columns starting with relay R71, over a conductor 341, which are called B transfer relays. These relay coils R71, R74, R77, R80, R83, R86, R89, R92, R96, R99, R102, R222, R223, R229, R742, R744 and R745 perform the function of transferring all the circuitry that is common for both machines from print A operation to print B operation.

An example for use of one such relay R71 is shown in Fig. 25*a*. Here the relay contacts **R71*a*** through *j* are used to transfer the input to the digit cycle point triggers T4–9 to T4–1, inclusive, from the printer A emitter 21 to the printer B emitter 22. Another example of print A and print B relays is the use of contact **R43*c*** and R208*b* in Fig. 25*b*. Contact **R43*c* prevents the turning On of the "ready-to-print" trigger 163**, Fig. 25*d*, until the print A relays are picked up. Contact **R208*b*** performs the same function for print B cycles.

In addition to the relays mentioned, as the relay RWE1, Fig. 25*d*, transfers all of the above-mentioned coils, the contact **R102*h* in the print A cycles opens to prevent printer A from operating. The contact R102*e***, Fig. 25*a*, transfers to connect the translator trigger reset line 78 to a reset cam operated in synchronism with a cam contact C129B, not shown, associated with the B emitter 22. At 345° machine cycle time, cam contacts C1B close to complete a circuit through now closed contacts R102*g* and R40*b* to pick coils R208P and R761P. These coils operate related contacts to close contact R208*b*, Fig. 25*b*, in the test B circuit 139, which is held by R208H, Fig. 25*d*, connected in the circuit controlled by the cam contact C139B. Contact **R71*m***, Fig. 25*f*, transfers to connect one of the grids of the print B incomplete scan gas tube 133 to the 40 volt supply and cut off the A incomplete scan gas tube. The picking of coil R35, Fig. 25*d*, closes contact **R35*a***, Fig. 25*j*, to energize coil R37 in the event a special function is indicated. An identical set of B unit printers 234B and associated minus sign entry, and zero coils and related cam contacts are provided which are under the control of B switches and are shown in box form in Fig. 25*j*. Since the elements are identical in construction and operation to the A printer, a further description is not deemed necessary.

At the time of transfer, the transfer contacts under control of coil R74 and others, Fig. 25*d*, are transferred at the gas tubes in the matrix 24, Figs. 25*e* and 25*g*, to connect the parallel lines 252 over the B cable 253 to set up the B print magnets 234B, Fig. 25*j*, in an identical manner. Along with this operation, contacts **R742*b*, R744*b* and R745*a***, Fig. 25*k*, are transferred to place the checking hold coils and bit count gating relays under the control of cam contacts C16B, C7B to C9B and C10B to C12B, respectively. The bit count test circuit is transferred to cam contact C4B at the contact **R761*b***, Fig. 25*l*, the bit count error hold circuit for printer B is transferred to relay R774P at contact **R742*a* and the contact R744*a***, Fig. 25*n*, transfers the bit count test pulse line 286 to the cam contact C5B. Thus it can be seen that when printer B is in operation, the various circuits to the common elements are transferred to the printer which has been selected to receive the printing instruction. The contact **R77*e***, Fig. 25*l*, in series with coil R773P is disposed in this circuit for the same reason as applied to the contact **R773*e* in the circuit to coil R774P.** This, as mentioned, prevents operation of the A bit count error relay if an error occurs in the B printer at the time the A printer has received an instruction to print.

Since the operation of the various elements, after proper transfer of contacts is identical to printer A operation, a further description is not deemed necessary. The only major difference is that as an incomplete scan or bit count error occurs, the relays R774 and R778, Fig. 25*l*, are used to energize the various hold circuits and to give an indication at the control panel that the error or incomplete scan occurred in the printer B rather than printer A.

As shown in Fig. 25*n*, the printer B controlling circuit 262B including the print B print wheel contacts R272B are under the control of a cam contact C153B operated in an identical manner as cam contact C153A and the exit hubs 344 for the B print wheel contacts are identical to the print A exit hubs. As shown, if the conductor 277 is provided with a pair of bit count generating entry hubs, the hub 276 is connected through the plug wire 275 to the print wheel exit hubs 273 in the described manner and the other bit count generating entry hub 345 is connected by means of a plug wire 346 to the B print wheel exit hub 344 in an identical manner. While only one plug wire 346 is shown connected to the second order position of word 1, it is to be understood the print B type wheel exit hubs 344 are connected to each word in a manner identical to that described for printer A. In addition, printer B is provided with a plurality of bit count minus sign exit hubs 293B, Fig. 25*r*, and the control pulses thereto are identical to that shown in the dotted block 347 shown for printer A. These sign exit hubs are connected to the bit count minus sign entry hubs 291 at the bit count generator in a manner identical to that for printer A. Thus, it can be readily seen transfer switching has been eliminated at this point because of the double entry hub construction at each word. Since only printer A or printer B is in operation, the direct plugging of the elements would result in no extraneous impulses because the print type wheel contacts 272 or 272B remain open when not connected in the printer operation.

*Bit count check suppress*

While the foregoing involves printer A or B operation and the stopping of the same if a bit count error develops, under some conditions it may be desirable to suppress the bit count checking. To accomplish this, the printer check suppress contact or switch 324, Fig. 25*m*, is depressed or transferred to its second position or terminal 327 and such action completes a circuit over a conductor 328 through a printer check suppress coil R781. Energization of this coil closes contact R781*e* in a conductor 329 leading to the test pulse conductor 286. The contact R781*e* is in series with a pair of parallel connected incomplete scan contacts R775*b* and R778*b* which are parallel connected to the conductor 325 leading to the check reset coil R44 and printer check reset coil R779. The energization of the relay 781 also opens normally closed contact R781*b* to open the circuit to the printer stop relay R10 to permit printing, opens contact R781*a* which is in series with the conductor 318 leading to the print check stop and bit count check relay coils R14 and R38, respectively, and opens contact R781*d*, Fig. 25*l*, in the relay WE5 circuit 310.

Thus it can be seen that even though a bit count error develops, and the various hold relays for indicating the error are operated, the printer continues operation because the check stop and bit count check relays R14 and R38, respectively, Fig. 25*m*, and the mercury switch WE5, Fig. 25*k*, remains de-energized due to the open contacts R781*a* and R781*d*, Figs. 25*m* and 25*l*, respectively.

However, if an incomplete scan is encountered, as previously mentioned, at any one of the word rows, one of the coils R775P or R778P, Fig. 25*f*, is energized, and either contact R775*b* or R778*b*, Fig. 25*m*, is closed and held at 155–170° machine cycle time. At 185° machine cycle time, a circuit is completed by the cam contact C5A, Fig. 25*n*, to energize the check reset relay R44 over conductors 286, 329 and 325, Fig. 25*m*, which in turn resets all of the triggers as described and in so doing interrupts the delivery of additional data by opening the various diode switches. At the same time contacts R775*a* or R778*a*, Fig. 25*l*, complete a hold circuit over the conductors 307, 308 and 331 and their respective hold coils R775H and R778H to energize an incompleted scan light 322 or 333 and the printer check light 317, Fig. 25*m*, is energized over the line 316 upon closure of contact R775*c* or R778*c*.

*Summary*

Assuming the power supply is operative and the previous bit count check was correct and a complete scan of the words in the word ring 88, Fig. 25*e*, was indicated. Under these conditions the relay coils R775 and R778, Fig. 25*f*, remain de-energized, the contact R13*b*, Fig. 25*b*, indicating a printer operative condition, remains transferred to apply a signal from the terminal 181 to indicate such a condition exists and the check stop contact R14*a* remains in its normal position, which also signals the calculator over the terminal 184 that the previous bit count check was correct.

Under these conditions, all triggers are turned Off, with the exception of bit count trigger T2–BC, Fig. 25*f*, which is reset On, and bit count contacts R38*c* and R38*d*, Fig. 25*b*, in checking circuits 138 and 139 are closed.

Assuming now that the print I and print II control plugs are wired as indicated, that is, a print I signal is directed to printer A and a print II signal to printer B, and that a print I signal is applied to the terminal 141, Fig. 25*b*. With the contact R110*b* normal, the pulse is applied over the conductor 143 to the amplifier 144 which in turn provides a negative pulse to the 3 terminal of print A trigger 145 to turn the same On. As this trigger turn On, its related cathode follower 153 applies a positive potential to the conductors 155 and 166, the former conditioning one element of the 4 element diode switch 157 and the latter applying a positive potential to the inverter follower 169 to provide a negative signal at the terminal 172 to signify that the print instruction has been received and to condition a switching mechanism to prevent the reception of a second print signal. This mechanism comprises operation of the contacts R106*d*, R107*c*, R109*d* and R110*c*, as previously described.

At the same time the conductor 166 energizes the grid of the power amplifier 173 to cause conduction. This in turn operates relay coil R39 to close the contact R39*c*, Fig. 25*d*, in the print A cycle unit and as contact C1A closes at 345–0° machine cycle time, the print A cycle coil R61P is energized and operates the relay R43, Fig. 25*j*, to close contact 43*c*, Fig. 25*b*, in the checking circuit 138. Upon closure of this last-named contact, a second element of the diode switch is rendered positive. In the absence of a special function signal at the terminal 149, a positive potential applied over the conductor 186 passes through the diode mix 189 and cathode follower 191 whose output over line 192 conditions the third element of the switch.

Since the printers are freely running, as the emitter 21, Fig. 25*a*, reaches 9 machine digit cycle point time, its related cam contact C131A closes to apply a positive potential over the decimal 9 line to turn the trigger T4–9 On. This positive potential extends to the diodes of this line and at the same time provides a positive potential over the conductor 196 to the condenser 195, Fig. 25*b*, to apply a rapidly rising positive pulse to the cathode follower 194 which conducts over the conductor 193 to condition the final element of the diode switch 157. The output from this switch continues through the diode mix 159 over the conductor 161 and power amplifier 162, Fig. 25*d*, to turn the "ready-to-print" trigger 163 On. As this trigger turns On, a positive potential is applied to one element of the digit point diode switch 165 and to the shift pulse diode switch 197.

As the positive potential was applied to the conductor 196 to condition the diode switch 157, Fig. 25*b*, a similar potential extending from the diode mix 76, Fig. 25*a*, applies the same positive potential over the conductors 198 and 201, Fig. 25*d*, to condition the digit diode switch 165 and another element of the shift pulse diode switch 197.

At this time, the switch 165 conducts over the line 202 to operate the amplifier 203. As this amplifier begins to conduct, the conductor 115 goes negative and in so doing turns trigger T1–1, Fig. 25*e*, of the word ring 88 On. At the same time the terminal 9 of the amplifier 203 goes positive to apply a positive potential over the line 109 to the diode switch 108, Fig. 25*f*, in the first column of the matrix 24 and also applies a positive potential over the line 206 to the digit cycle point terminal 209, Fig. 25*d*, which is connected to the calculator. As the terminal 209 applies a positive potential to the calculator, this indicates that the printer is in its proper cycle point position to receive the entire line of data serially.

Upon the reception of this signal, the calculator, at its first opportunity, transmits the entire line of data as set forth in Figs. 3*a* and 3*b* over the binary 1, 2, 4 and 8 lines 19, 18, 17 and 16, respectively, to the translator 15, Fig. 25*c*, parallel by bit, serial by digit. With the emitter 21, Fig. 25*a*, on decimal 9 line, this line is positive and any combination of 8 and 1 pulses arriving simultaneously on the lines 16 and 19, respectively, Fig. 25*c*, will condition the diode switch in this line to gate or cause conduction or apply a positive potential to the related amplifier 79. As the amplifier conducts, the line 23 goes negative which feeds to the power amplifier 81 whose output is connected to the cathode follower 82. Thus, a negative output on the line 23 adjacent the translator results in a positive output to the gate pulse diode switch 83, Fig. 25*e*. Along with the delivery of the line of data from the calculator, in the form of binary code, are a continuous series of 4 micro-second gate pulses which are applied to the terminal 113 to condition the other element of the diode switch 83 for conduction whenever a pulse representing a decimal digit is fed over the line 23.

Along with the delivery of the gate pulses to the terminal 113 are a series of inverted shift pulses which are applied at the terminal 96, Fig. 25*d*, and represent an ordered position for each word. In this example, the shift pulses are fed from the calculator in groups of seven words having seventeen shift pulses per word with a total of twelve micro-seconds delay between each word. These shift pulses condition the shift pulse diode switch 197 and feed through a conductor 211 to the power amplifier 210. The output of this power amplifier goes negative when the conductor 211 is positive to thus provide a negative shift pulse over the conductor 97 which is connected to the No. 6 terminal of all of the triggers in the closed vertical or fast ring 86, Figs. 25*f* and 25*h*.

The first shift pulse applied to the ring 86 turns the bit count trigger T2–BC Off, Fig. 25*f*, and in so doing applies a negative potential over the output conductor 116 to turn the trigger T2–1 On. As this trigger is turned On, the potential at the power amplifier 106 is increased to cause the cathode followers 107 to conduct which in turn applies a positive potential, through the conditioned diode switch 108, to all of the grids in the first column. As previously mentioned, when the amplifier 203, Fig. 25*d*, was energized the trigger T1–1, Fig. 25*e*, of the slow ring 88 was turned On to render the first word line positive. Thus, this line will conduct when a pulse is received at the line 23 to render the word switch 85 positive. As the word switch goes positive and coincidence occurs with the first word line, the output from the cathode followers 112 conditions one of the grids in each of the first word or row of gas tubes, including the first word bit count grids in the gas tubes 91 and 92.

If the first ordered position of the first word were a 9, the GT3 cathode tube is fired because both grids are positive which permits the tube to conduct. As this tube conducts, a circuit is completed through the normally closed contact R74*a* over the line 127 leading to the matrix exit hubs 230 at the control panel, Fig. 25*i*. These hubs are plug wired to the print entry hubs 232 which are each in series with a print magnet 861.

Upon the application of each shift pulse, the trigger in the fast ring 86, Figs 25*f* and 25*h*, which is On is turned Off and turning Off of this trigger provides a negative going value at the next succeeding trigger to the next order to the right to turn the same On which results in conduction of the next vertical column of gas tubes.

At the end of the seventeenth shift pulse, the trigger T3–16 is turned Off and the related power amplifier connected to the last column of gas tubes applies a negative potential over the conductor 117 to turn the bit count trigger T2–BC On, Fig. 25*f*. As the bit count trigger is turned On, the positive potential applied to the related power amplifier 101 goes negative and its positive output drives the cathode follower 118 whose output in turn is fed over the line 119 to the input of the power amplifier 121. The negative going output from this power amplifier is fed over the line 122 to the 6 terminal of trigger T1–1, Fig. 25*e*, to turn the same Off. As this trigger is turned Off, a negative potential extending over the line 123 turns trigger T1–2 On. Thus word line 2 is now conditioned for the reception of any data.

During this interval, the first group of seventeen shift pulses were delivered and as the next group of seventeen shift pulses for word 2 arrive, the fast ring 86, Figs. 25*f* and 25*h*, is stepped along in an identical manner and at the end of the seventeenth pulse, the second word trigger T1–2 in the slow ring 88, Fig. 25*e*, is turned Off and in so doing turns On the third word trigger T1–3. Thus, during the transfer when each word line is turned On in the slow ring, the shift pulse ring 86 makes one complete cycle and in doing this provides the means for stepping along the word ring 88.

Under these conditions, all decimal 9's in each word are removed and due to timing of the fast ring 86 by the shift pulses, which bear a denfiite relation to the ordered position of each numeric value, the related gas tube in the same ordered position is fired to set up its related print magnet in the exact ordered position, assuming the magnet entry hubs are wired in an identical manner.

At the end of the seventeenth shift pulse of the seventh word, the bit count trigger T2–BC, Fig. 25*f*, is turned On and this action turns Off trigger T3–7, Fig. 25*e*, and in so doing a positive potential is applied over the conductor 124 to condition one side of a reset diode switch 212, Fig. 25*d*.

Due to the fact the line 115 is still held negative by the amplifier 203, the first word trigger T1–1, Fig. 25*e*, can not be turned On and will thus remain Off until the first word trigger is again turned On by the cycle point pulse arriving at the next cycle point position. Thus, the matrix 24, Figs. 25*e* and 25*g*, has completed one complete cycle in which all 9's from all words have been removed.

As the emitter 21, Fig. 25*a*, leaves the decimal 9 line position, the diode switches 165 and 197, Fig. 25*d*, are biased negative over the lines 198 and 201 to prevent the arrival or passing of shift pulses. When the emitter 21, Fig. 25*a*, moves to its decimal 8 line position, the trigger T4–8 is turned On and the diode mix 76, Fig. 25*a*, again conducts over the lines 198 and 201 to condition the diode switches 165 and 197, Fig. 25*d*, to conduct in an identical manner. This action operates the amplifier 203 to again apply a negative going potential over the line 115 to turn the first word trigger T1–1 On, Fig. 25*e*, and at the same time apply a positive digit cycle point potential to the terminal 209, Fig. 25*d*, directed to the calculator. This latter signal signifies the printer is at its next or decimal 8 cycle point position and that the calculator can now transmit the same entire line of data to the translator 15, Fig. 25*c*. During this interval, the 8 line is positive while the other lines are negative, thus only pulses representing a binary 8 are removed or gated from the group of words and transmitted to the matrix to fire the proper gas tubes where coincidence of the positive values occurs between the two grids. All 8's in the binary 9 code are separated from the true 8's by means of the inverter P1 in the line 19*b*, Fig. 25*c*, as previously described under the translator operation.

The translator and matrix operation and timing is identical for all decimal positions; however, at 3, 2 and 1 digit cycle point time, the bit count trigger T2–BC, Fig. 25*f*, which conditions one grid on each bit count gas tube over the conductor 104 is in a position to cause firing of either the 1, 2 or both bit count gas tubes should the bit count value be either a 1, 2 or 3 bit.

After the entire line of information has been fed to the translator a total of ten times and all of the gas tubes fire to set up the proper numeric values in the printer, the trigger T3–7, Fig. 25*e*, is turned Off. The turning Off of the seventh word trigger T3–7 at the last shift pulse applies a positive going potential to the cathode follower 126, Fig. 25*d*, leading to the diode switch 212. This switch is now positive due to the positive potential applied over the line 213 extending to the decimal 0 digit cycle point line, Fig. 25*a*. As this switch goes positive, the power amplifier 214, Fig. 25*d*, provides a negative pulse over the line 215 to turn the "ready-to-print" trigger 163 and print A trigger 145 Off, Fig. 25*b*. This completes the cycle and signifies to the calculator by a positive potential applied by the inverter follower 169 that all of the information has been received and that the printers are now ready to receive the next instruction. However, although the printers are ready to receive the instruction, there is still the printing and checking to be done and the calculator will be restrained from sending this information, even though a selection has been made, until the selected printer reaches its 9 decimal cycle point position as previously described.

After the print A trigger 145 is turned Off, the word lines, Fig. 25*e*, are checked for incomplete scan by means of the lines 129 and diode mix 131, Fig. 25*f*, whose output, if positive, cooperates with a positive potential applied over the contacts R71*m*, depeding upon which printer is operating, to fire a related gas tube to energize one of the coils R775 or R778. These coils in turn close contacts R775*d* or R778*d*, Fig. 25*m*, to pick a nonprinted magnet R10 to stop printer operation in any suitable manner. At the same time contacts R775*b* or R778*b* operate to ignite one of the error lights 332 or 333, Fig. 25*l*, and closes contacts R775*c*, or R778*c*, Fig. 25*m*, to energize coil R44 which results in resetting of all the triggers by opening the circuit to coil RPSI, Fig. 25*l*. This is accomplished by applying a 150 volt positive pulse to the trigger reset line 217 at the contact RPSI*b*, Fig. 25*f*. Also coil R38, Fig. 25*m*, is picked to open the contacts R38*c* and *d*, Fig. 25*b*, in the print test circuit. If all of the word triggers were turned Off, the incomplete scan circuit has no effect on the printing operation.

The pulse supplied to the print magnets 861, Fig. 25*i*, from the related thyratrons set up the analyzing mechanism 800, Fig. 28*b*, in the printing mechanism 237 and at "N" time a second pulse applied from cam contacts C28A, Fig. 25*j*, energizes relay coil R147 to transfer its related contacts in the print magnet circuits, Fig. 25*i*, and at 187–195° machine cycle time the contact C145A closes to apply a second pulse over the conductor 247 to the magnets which pulse is effective to release the clutches 887, Fig. 28*a*, to initiate rotation of the print cams 883 to cause printing of the proper numeric data.

As each print magnet is pulsed the first time, the analyzer mechanism 800 causes at 150° machine cycle delay and upon release at the proper digit cycle time, the print wheel gears 870 close their respective print wheel contacts 272 to transmit pulses over exit hubs 272, Fig. 25*n*, upon closure of cam contact C153A. Each type wheel contact 272 feeds to a related conductor 277 having a pair of gating contacts operated in timed relation by relays R658 and R661 under the control of cam contacts C7A through C12A, Fig. 25*k*. The action of the gating relays determines whether the pulse received from the print wheel contacts is a 1 or 2 bit value. If a 1 bit value, as determined by operation of the contacts, a group of 1 bit contacts in the bit count circuit are transferred, Figs. 25*n* to 25*r*, if a 2 bit value, the other group in the same ordered position is transferred or if a 3 bit value, both groups of contacts are transferred. Thus as each type wheel rotation is initiated 150° after receiving the first pulse from the gas tube matrix, the bit count for the numeric value is generated in a checking network based on a modulus 4, that is, all bit count divisible by 4 are cast out and only the remainder is conducted to the group of bit count comparing contacts R321*b*, *c* and *d* and R322*b*, *c* and *d*, Fig. 25*r*.

Should a minus sign be transmitted from the calculator as a numeric value in the No. 4 ordered position, at 1 machine cycle point time, the gas tube fired indicating a 1 numeric value conducts over the plug wire 241, Fig. 25*i*, to a minus sign entry hub in the group 233 and the print magnet in this ordered position is bypassed momentarily. At 157–165° machine cycle time the cam contact C27A closes and applies a pulse to the fourth ordered position print magnet. This initiates rotation of the print cam 883, Fig. 28*a*, prior to the "N" pulse transmitted to the remaining magnets, Fig. 25*i*. At 275–287° machine cycle time, the closed contact R181*c*, Fig. 25*r*, permits a pulse to be transmitted from the minus sign bit count exit hub 293 to the minus sign bit count entry hub 291 over the plug wire 294. This picks relay R318 to transfer its related contacts and thus add a 1 bit count to the checking network to compensate for the 1 bit value established by the calculator for the minus sign.

Referring back to the bit count gas tubes 91 and 92, Figs. 25*g* and 25*h*, these tubes were fired at their proper times and in so doing picked related bit count comparing coils which were held by related hold coils in the hold coil group 297, Fig. 25*k*. As the bit count comparing coils are energized, the appropriate bit count contacts R321*b*, *c* and *d*, Fig. 25*r*, in the example given, are transferred to thus establish a bit count comparing means for the bit count generated by the print wheels. At 285–310° machine cycle time, the cam contact C5A, Fig. 25*n*, closes and applies a pulse over the line 286 to all of the bit count circuitry and if the generated bit count agrees with the bit count transmitted by the calculator, the circuit is completed to pick all of the checking relays, for example, R324 for word 1, Fig. 25*r*, and at bit count test time when cam contact C4A, Fig. 25*l*, closes at 295–305° machine cycle time, the circuit at contact R323*d* remains open. This indicates a proper bit count pick.

If, however, a bit count error develops, the test pulse can not get through the comparing contacts R321*b*, *c* and *d*, Fig. 25*r*. Thus, coil R324 remains deenergized. At test time, the pulse from the cam contact C4A, Fig. 25*l*, passes through the conductor 302, normal contacts R324*b* and over the conductor 303 and normally closed contact R323*d* to energize check stop coil R738P and at the same time conducts over the line 306 to the bit count error coil relay R773P to energize its respective hold coil at the contact R773*a*. Upon energization of this coil, the printer A error light 314 is ignited and the particular word in which the error occurs is also ignited by means of the normally closed contact R324*c*.

At the same time the coil R738H is energized and provides a holding circuit which energizes relay RWE5 in the circuit 310 which transfers contacts in a mercury relay WE5, Fig. 25*k*, to hold all of the picked coils in the checking circuit in their respective positions at the time of the error. This enables the determination of the particular location of the error. As relay R773 is energized, its contact R773*d*, Fig. 25*m*, is also closed to complete a circuit to a nonprint magnet relay R10 to prevent the printing operation.

Since the printing operation is stopped, to restart the cycle it is necessary to depress the print check reset switch 323 which applies a potential to reset coil R44 and R779 to reset all the triggers and at the same time mometarily open the hold circuit 308 to deenergize all of the coils to permit the same to return to their normal positions.

In order to operate the printer without checking the numeric values, the switch 324, Fig. 25*m*, is depressed to energize a printer check suppress coil R781, which opens the circuit 318 to the printer check stop and bit count check coils R14 and R38 to shunt this portion of the circuit. Under these conditions, printer operation will continue without bit count checking unless an incomplete scan occurs in the word ring, at which time the incomplete scan is indicated at the respective lights 332 or 333, Fig. 25*l*, and at the same time applies a pulse to the reset coils R44, Fig. 25*m*, to reset all of the triggers. This prevents further printer operation until the machine reaches its proper machine cycle time.

For printer B operation, a print II signal directed to the print B trigger 148, Fig. 25*b*, causes its related lines 156 and 167 to conduct. This provides the ready signal to the calculator at the ready terminal 172 and at the same time operates the power amplifier 330 to energize relay coil R40 and the line 167 conducts through the diode switch 336 to the power amplifier 337 to energize relay RWE1. This transfers its contacts RWE1, Fig. 25*d*, and energizes all of the paralleled transfer coils in the line 341. This transfer of contacts sets up a transfer to the printer B for all common elements or circuitry. The operation for printer B is identical to that in printer A except that in this case the B cam contacts and other necessary printer B equipment is brought into operation.

Under either printer A or printer B operation, a special function signal can be received. This special function, if desired, may be any suitable type and upon the reception of this signal over the terminal 149, Fig. 25*b*, appropriate relays R34 and R35 and R42, Fig. 25*d*, are energized, depending on which printer is operating. In this case the diodes in the switches 157 and 158, Fig. 25*b*, are conditioned through contacts R36*d* or R37*d* depending upon printer A and printer B operation. The special function contacts R34*a*, Fig. 25*i*, and R35*a*, Fig. 25*j*, operate special function relays R36 and R37, respectively, to feed a signal to the special function hubs 228 or 229, respectively. A plug wire 245, Fig. 25*i*, connects the hub 228 to the co-selector hub 231 to energize relays R64 and others to cause bypassing of printing pulses at the print magnets to cause special printing conditions.

From the foregoing, it can be seen that an improved means has been provided for receiving data in binary coded decimal from a calculator or storage device which is capable of translating this data to decimal values and to operate related print magnets in accordance with the values received. Also, a simplified relay bit count generating means has been provided to determine the bit count of each numeric value to be printed which in turn is checked against the bit count of the words transmitted from the calculator. In addition, there has been provided interlocking control means which prevents the reception of data from the calculator until the printing mechanism is in condition to receive the data and to stop the printing operation and the entry of further data in the event an error or other malfunction develops in the printer.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A bit count generating and comparing circuit based on a modulo 4 to provide a bit count remainder based on said modulo 4, comprising a plurality of order type members operative to print digits at predetermined timed intervals with machine digit cycle point operation, means transmitting instructions for operating said type members along with the bit count remainder of the data to be printed, a circuit for each order type member, switch means in said circuits and operative upon movement of an order type for closing its related circuit, a plurality of pairs of gating contacts closed and opened in a predetermined timed relation to the machine digit cycle point operation to gate the closed circuit at each order as a 1, 2, or 3 bit value for the digit to be printed, a plurality of pairs of relays, each connected to one of said pairs of gating contacts, a plurality of contacts for each relay, a plurality of parallel bit count lines, means for interconnecting said contacts in said bit count lines in accordance with the predetermined modulo 4 to provide a bit count remainder storage circuit, and means for comparing the bit count remainder with a bit count transmitted with the data.

2. A bit count generating circuit having an entry and an exit end for numeric data producing congruences modulo 4 to provide a bit count remainder based on said modulo 4, comprising four parallel bit count lines having 0, 1, 2, and 3 bit count values, a plurality of pairs of relays each relay of said pair, respectively, having 1 and 2 bit values, said relays each having a normally closed contact in each of said bit count lines to complete a remainder circuit therethrough over the same line, said 1 bit relays each having normally open contacts which when closed transfer the remainder circuit to the next higher bit count line, said 2 bit relays each having a normally open contact which when closed advances the bit count value by 2, means for energizing said relays in accordance with predetermined bit count values established for the numeric data, a conductor connected to the normally open contact of each 1 bit relay in the 3 bit line to connect the same to the 0 bit line, a normally open contact in each 2 bit relay to transfer the bit count remainder to a bit count line of lower value, and means for applying a potential to the entry end of said bit count generating circuit to energize the exit end over the bit count line representing the bit count remainder.

3. The combination as claimed in claim 2 wherein said last-named means includes a cyclically operable circuit breaker for applying the test potential which extends over normal or transferred contacts of said relays to complete the circuit over one of the bit count remainder lines, and means for comparing the generated bit count for the numeric data with a bit count of the same data transmitted from a remote source.

4. The combination claimed in claim 2 including a plurality of type members having digits 9–0, one for each pair of 1 and 2 bit count relays, means for selectively operating said type members, a separate type circuit for each type member, switch means closed upon movement of said type members for directing a pulse to said one pair of relays, and means operative in timed relation to movement of said type members for gating the pulse to said bit count relays in accordance with the bit count value established for each digit.

5. In a bit count checking relay circuit, the combination of a cyclically operable printer having a plurality of type members with digits 9–0, means for selectively actuating said type members at digit cycle timed intervals to print digit values, a switch associated with each type member and adapted to be closed when said member is shifted from its normal position, a pair of contacts associated with each switch to provide bit count gating contacts, means for selectively operating said contacts, one of each pair of contacts being closed at 1, 2, 4, 7, and 8 digit cycle time and the other of said contacts being closed at 3, 5, 6, 7 and 9 digit cycle time, a bit count relay having normal and transfer contacts for each gating contact, said bit count relay contacts being series connected in cascade to provide 0, 1, 2, and 3 bit count remainder lines extending therethrough over the normally closed contacts, said cascade connections being so arranged that for any combination of bit count values at said relay contacts exceeding a 4 bit count, the 4's are divided out of the checking circuit and any remainder is directed over one of said bit count remainder lines, means for applying a test pulse to the checking circuit to energize the bit count remainder line equivalent to the bit count value of the numeric data to be printed, and means connected to said last-named line and operated by a bit count transmitted from a remote source of the same data to compare the printer bit count.

6. The combination as claimed in claim 5, including means for interrupting the printing operation if the generated and the transmitted bit counts disagree.

7. A bit count comparing circuit based on a modulo 4 to provide a bit count remainder, comprising four parallel bit count remainder lines having 0, 1, 2, and 3 bit count values, a plurality of pairs of relays each relay of said pair respectively having 1 and 2 bit count values, said relays each having normally closed contacts in said bit count remainder lines to complete a circuit therethrough over said lines, said 1 bit relays each having normally open contacts which when closed transfer the comparing circuit to the next higher line, said 2 bit relays each having normally open contacts which when closed advance the bit count value by 2, a conductor connected to the normally open contact of each 1 bit relay in the 3 bit count remainder line to connect the same to the 0 bit line through a closed contact in its related 2 bit contact, normally open contacts in the 2 bit relay to transfer the bit count remainder circuit to a bit count line of a lower or higher order, a printer including printing means having a plurality of type ordered positions in which numeric digits 9–0 are to be printed, means for selectively operating said printing means at each ordered position, a circuit for each ordered position, means for completing said circuit after each ordered position has received a print instruction, gating means including a pair of separately operable contacts for each type position, means for selectively closing said contacts in a predetermined time relation to complete said circuit to said bit count relays to provide a 1, 2, or 3 bit value for each numeric value to be printed, means for providing a test pulse to said remainder lines after actuation of said bit count relays, said circuit being completed over a single remainder line, a bit count comparing means connected in said bit count remainder circuits, means for energizing said bit count comparing means in accordance with the bit count value of the numeric digits transmitted to said printer, and means for permitting printer operation to continue if the generated bit count at the ordered type positions and the transmitted bit count agree.

8. The combination as claimed in claim 7, including means responsive to a disagreement of the generated and transmitted bit counts for interrupting printer operation.

9. A bit count checking circuit for determining whether a multi-digit word expressed in binary code and the indicator of said word in decimal form are in accord, comprising means for translating the binary values to equivalent numeric decimal values, a printer including a plurality of ordered type positions, means for setting up said type positions in accordance with said translated numeric values, switch means for completing a circuit as each numeric value is set up for printing, intermittently operated gating means for establishing a bit count value for each numeric value, a pair of bit count relays, each having a plurality of normally closed and open contacts for each ordered position, one of said relays being assigned a 1 bit value and the other of said relays being assigned a 2 bit value, a bit count remainder circuit based on a modulo 4 including four parallel bit count lines having 0, 1, 2, and 3 bit count remainder values and having a contact of each relay therein, said normally closed contacts in each line being operative to complete a circuit therethrough over the same lines, said contacts, when transferred, providing a transfer of the bit count generating circuit to a higher or lower order at the next ordered position, said 1 bit relay having its open contact in the 3 bit count line connected to the 0 bit count line through the contact in said 2 bit relay, said 2 bit relay having its open contacts in said 0, 1, 2, and 3 bit lines connected to the 2, 3, 0, and 1 bit lines, respectively, leading to the next ordered position, bit count comparing means including comparing relays and contacts therefor, said relays being operated by a bit count signal transmitted with the binary word for transferring related bit count comparing contacts disposed at one end of said bit count lines to complete the proper bit count remainder circuit, means for providing a test pulse to the bit count lines to establish one bit count remainder line for comparison at said comparing contacts with the transmitted bit count, and relay operated means for permitting continued printer operation if the bit counts agree at said comparing contacts.

10. The combination as claimed in claim 9, including relay operated means for interrupting the printer operation if the generated and transmitted bit counts disagree at said comparing contacts.

11. The combination as claimed in claim 10, including means for holding all energized relays in their active positions at the time of bit count disagreement.

12. The combination as claimed in claim 11, including a switch, and means for resetting all relays to normal operating positions for restarting the printer operation after a bit count disagreement upon actuation of said switch.

13. A bit count checking circuit for determining whether a multi-digit word having ordered positions and a sign indicated as a numeric value in one of the ordered positions transmitted from a remote location is in accord with a generated bit count of that word, comprising means for translating the transmitted values to equivalent numeric decimal values, a printer including a plurality of ordered type positions, means for setting up said type positions in accordance with the transmitted numeric values, means for separating a numeric value indicating a sign directed to a preselected ordered position and for delaying operation at the same, switch means for completing a circuit as each numeric value is set up for printing, intermittently operated gating means for establishing a bit count value for each numeric value, a pair of bit count relays, each having a plurality of normally closed and open contacts for each ordered position, one of said relays being assigned a 1 bit count value and the other of said relays being assigned a 2 bit count value, a bit count generating circuit based on a modulo 4 including four parallel lines having 0, 1, 2, and 3 bit count remainder values and having a contact for each relay therein, said normally closed contact in each line being operative to complete a circuit therethrough over the same lines, said contacts when transferred providing a transfer of the bit count remainder circuit to a higher or lower value at the next ordered position, bit count comparing means including comparing relays and contacts therefor, said relays being operated by a bit count signal transmitted with the word for transferring a plurality of related bit count comparing contacts disposed at one end of said bit count lines to complete the proper bit count remainder circuit, means including a plurality of bit count contacts for entering a bit count equivalent for the ordered position of the sign prior to the checking operation, and means for providing a test pulse to the bit count lines to establish one bit count remainder line for comparison at said comparing contacts with the transmitted bit count.

14. A bit count comparing circuit for determining whether a complement bit count of a multi-digit word having ordered positions transmitted from a remote location is in accord with a generated bit count of that word at the point of reception, comprising a plurality of bit count remainder lines, a plurality of relays associated with the ordered positions, a plurality of groups of related relay contacts connected in said bit count remainder lines to develop a bit count remainder based on a predetermined modulus, means for energizing said relays in accordance with a bit count determined by the numeric values at each ordered position in the word, a plurality of bit count comparing relays having contacts disposed in said bit count remainder lines, means for energizing said bit count comparing relays in accordance with the bit count complement of the transmitted word to permit completion of a circuit through certain of said comparing relay contacts and one of said bit count remainder lines, and means for indicating a correct bit count comparison when the complement bit count and the generated bit count agree.

15. A bit count comparing circuit for determining whether a bit count of a multi-digit word having ordered positions and a sign indicated as a numeric value in an ordered position transmitted from a remote location is in accord with a generated bit count of that word at the point of reception, comprising a printer including a plurality of type ordered positions, means for selectively setting each ordered position in response to the data transmitted, means for delaying the set up of the ordered position indicating a sign for the data, a plurality of bit count remainder lines, a plurality of relays associated with the ordered positions, a plurality of groups of related relay contacts connected in said bit count remainder lines to develop a bit count remainder based on a predetermined modulus, means operated upon selection of each ordered position for energizing the related relays in accordance with a bit count determined by the numeric values at each ordered position in the word, means including a plurality of bit count contacts for entering a bit count equivalent for the sign ordered position, a plurality of bit count comparing relays having contacts disposed in said bit count remainder lines, means for energizing said relays in accordance with the bit count and the sign of the transmitted word to permit completion of the circuit through one of said bit count remainder lines, and means for indicating a correct bit count comparison when the transmitted and the generated bit count remainders agree.

16. A bit count circuit for a printer having a plurality of type ordered positions for printing a line of numeric data and a numeric sign for the data at a preselected ordered position, comprising means for selectively setting up the data to be printed at each ordered position, means for bypassing the numeric sign value at the preselected ordered position to delay the operation at that ordered position, a plurality of bit count remainder lines, a plurality of relays associated with the ordered positions, a plurality of groups of related relay contacts connected in said bit count remainder lines to develop a bit count remainder based on a predetermined modulus, means operated upon operation of each ordered position for energizing said relays in accordance with a bit count determined by the numeric values at each ordered position in the word, means including a plurality of bit count contacts for entering a bit count equivalent for the sign ordered position, a plurality of bit count comparing relays having contacts disposed in said bit count remainder lines, and means for energizing said relays in accordance with the bit count of the transmitted word to permit completion of a bit count remainder circuit through one of said bit count remainder lines.

17. A bit count comparing circuit for determining whether a complement bit count of a multi-digit word having ordered positions transmitted from a remote location is in accord with a generated bit count of that word at the point of reception, comprising a plurality of bit count remainder lines, a plurality of relays having groups of relay contacts connected in said bit count remainder lines to generate a bit count remainder based on a predetermined modulus, means for energizing said relays in accordance with a bit count determined by the numeric values at each ordered position in the word, a plurality of bit count comparing relays having contacts disposed in said bit count remainder lines, means for energizing said bit count comparing relays in accordance with the bit count complement of the transmitted word to permit completion of a circuit through certain of said comparing relay contacts and one of said bit count remainder lines, means for indicating a correct bit count comparison when the complement bit count and the generated bit count agree and means for inverting energization of the bit count comparing relays to provide an actual bit count comparison and a checking circuit over different bit count remainder lines.

References Cited in the file of this patent

UNITED STATES PATENTS

| | | |
|---|---|---|
| 2,425,549 | Luhn | Aug. 12, 1947 |
| 2,604,262 | Phelps et al. | July 22, 1952 |
| 2,615,624 | Brand et al. | Oct. 28, 1952 |
| 2,634,052 | Bloch | Apr. 7, 1953 |